United States Patent
Choi et al.

(10) Patent No.: US 11,276,234 B2
(45) Date of Patent: Mar. 15, 2022

(54) AR MOBILITY AND METHOD OF CONTROLLING AR MOBILITY

(71) Applicant: LG ELECTRONICS INC., Seoul (KR)

(72) Inventors: Sunghwan Choi, Seoul (KR); Byeongjun Choi, Seoul (KR); Yeonsoo Kim, Seoul (KR); Dukyung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 127 days.

(21) Appl. No.: 16/708,204

(22) Filed: Dec. 9, 2019

(65) Prior Publication Data

US 2021/0125411 A1    Apr. 29, 2021

(30) Foreign Application Priority Data

Oct. 24, 2019  (KR) ........................ 10-2019-0132771

(51) Int. Cl.
*G06T 19/00* (2011.01)
*G06T 7/70* (2017.01)
(Continued)

(52) U.S. Cl.
CPC ........ *G06T 19/006* (2013.01); *G02B 27/0101* (2013.01); *G02B 27/0179* (2013.01); *G06F 3/013* (2013.01); *G06F 3/1423* (2013.01); *G06T 7/70* (2017.01); *B60K 35/00* (2013.01); *B60K 2370/166* (2019.05); *B60K 2370/176* (2019.05);
(Continued)

(58) Field of Classification Search
None
See application file for complete search history.

(56) References Cited

U.S. PATENT DOCUMENTS

| 10,242,457 | B1 * | 3/2019 | Sibley | G09G 3/003 |
| 2014/0368534 | A1 * | 12/2014 | Salter | G06F 3/011 |
| | | | | 345/619 |
| 2018/0137373 | A1 * | 5/2018 | Rasmusson, Jr | B62D 15/0285 |

OTHER PUBLICATIONS

Author: Wiegand et al.; Title: InCarAR: A Design Space Towards 3D Augmented Reality Applications in Vehicles; pp. 13; Date: Sep. 21-25, 2019; Source: https://www.medien.ifi.lmu.de/pubdb/publications/pub/hollaender2019AutoUI-3/hollaender2019AutoUI-3.pdf (Year: 2019).*

* cited by examiner

*Primary Examiner* — Jwalant Amin
(74) *Attorney, Agent, or Firm* — Lee Hong Degerman Kang & Waimey

(57) ABSTRACT

A method of controlling augmented reality (AR) mobility according to embodiments may include generating, by a camera, image data by photographing one or more users, extracting information about the one or more users from the image data, calculating a reference point for projection of an AR object based on the location information about the users, and displaying the AR object on a display based on the calculated reference point. An apparatus for controlling AR mobility according to embodiments may include a camera configured to generate image data by photographing one or more users, a controller configured to extract information about the one or more users from the image data, a calibrator configured to calculate a reference point for projection of an AR object based on the location information about the users, and a display configured to display the AR object on a display based on the calculated reference point.

18 Claims, 38 Drawing Sheets

(51) Int. Cl.
  *G06F 3/14* (2006.01)
  *G02B 27/01* (2006.01)
  *G06F 3/01* (2006.01)
  H04N 5/232 (2006.01)
  G01S 19/13 (2010.01)
  B60R 11/04 (2006.01)
  B60R 1/00 (2022.01)
  B60K 35/00 (2006.01)

(52) U.S. Cl.
  CPC .... *B60K 2370/177* (2019.05); *B60K 2370/73* (2019.05); *B60K 2370/92* (2019.05); *B60R 1/00* (2013.01); *B60R 11/04* (2013.01); *B60R 2300/102* (2013.01); *G01S 19/13* (2013.01); *G02B 2027/0138* (2013.01); *G02B 2027/0187* (2013.01); *G06T 2207/20081* (2013.01); *G06T 2207/20084* (2013.01); *G06T 2207/30196* (2013.01); *G06T 2207/30268* (2013.01); *H04N 5/23238* (2013.01)

FIG. 5
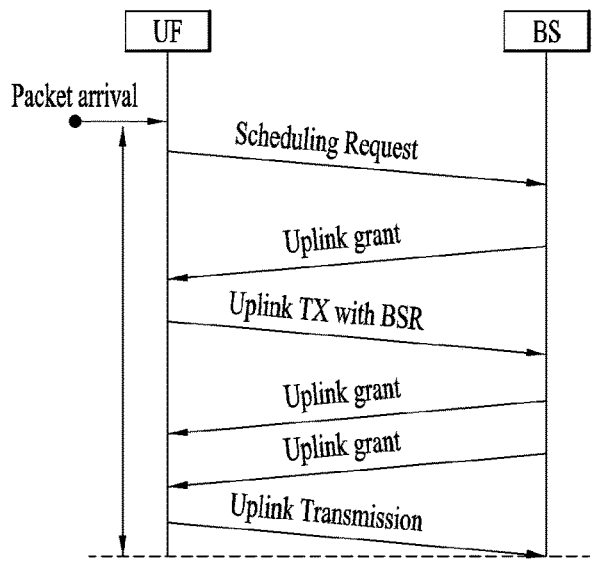
Fig. Uplink TX prcedure with grant
(a)
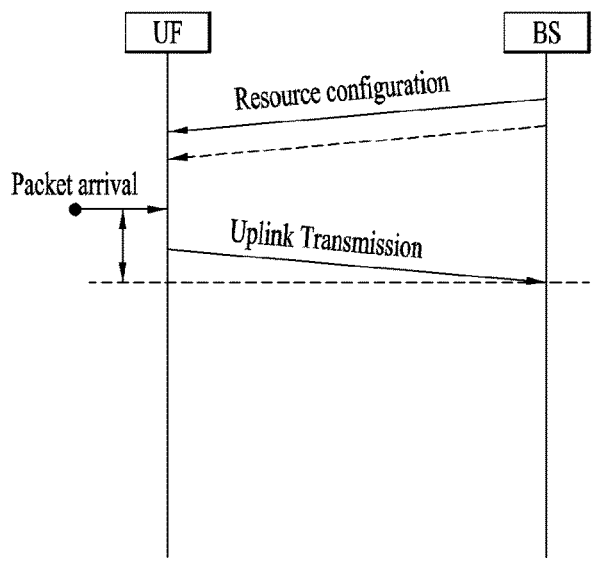
Fig. Uplink TX prcedure without grant
(b)

FIG. 24
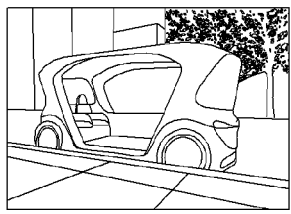
Concept of Mobility Shuttle
(a)
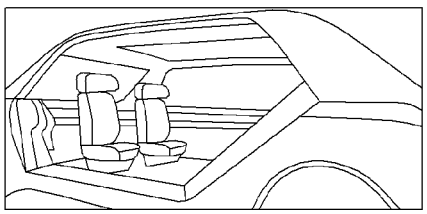
Multi-Display HMI
(b)
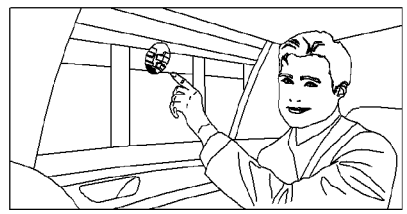
Side Window Entertainment
(c)
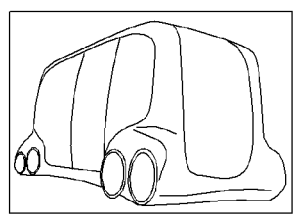 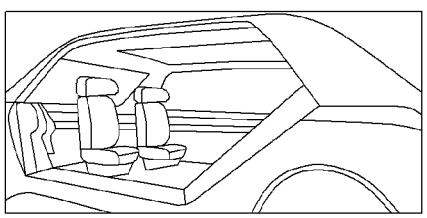 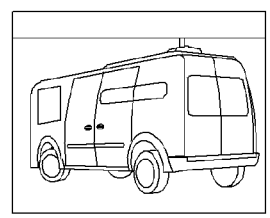
(d)

FIG. 27
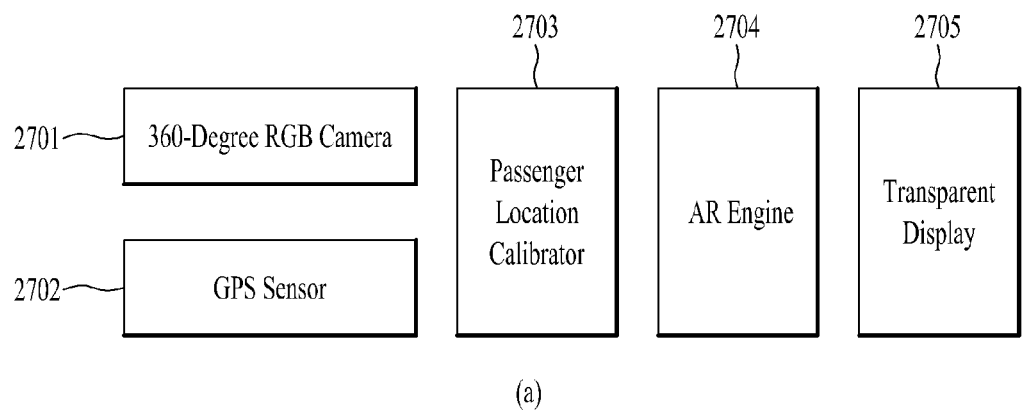
(a)
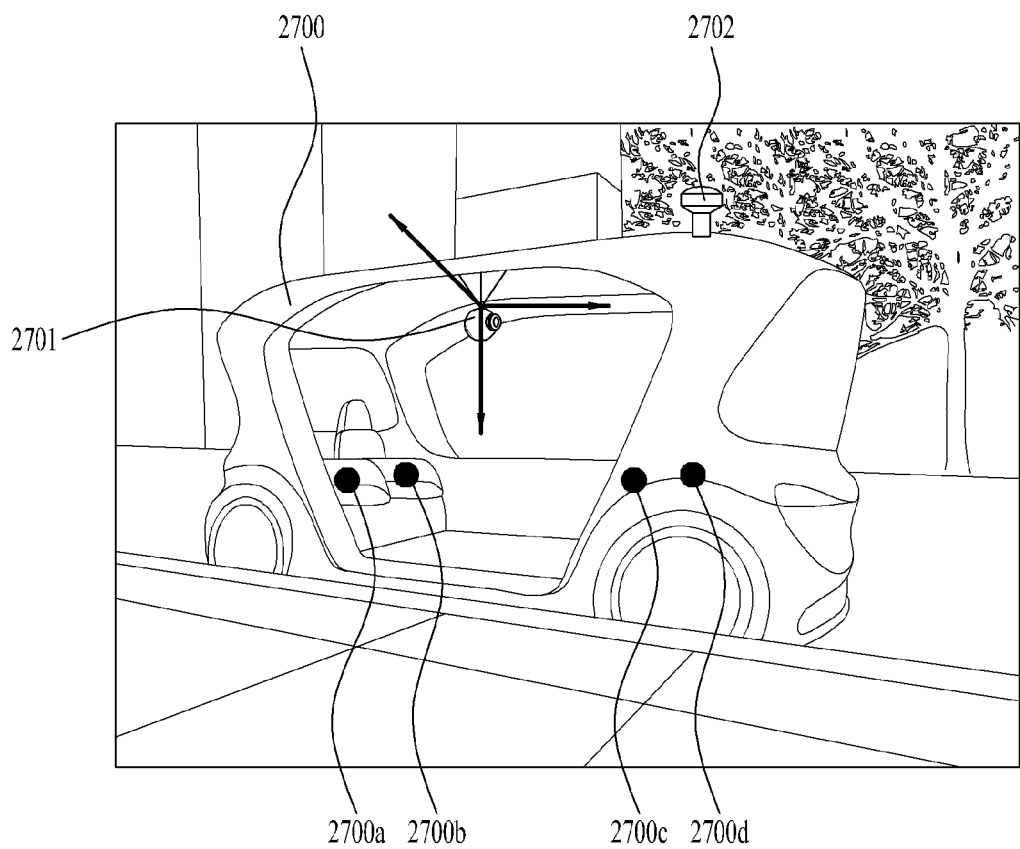
(b)

(a) All Passengers Face Front    (b) All Passengers Face Side    (c) Passengers Face Front or Rear FIG. 33
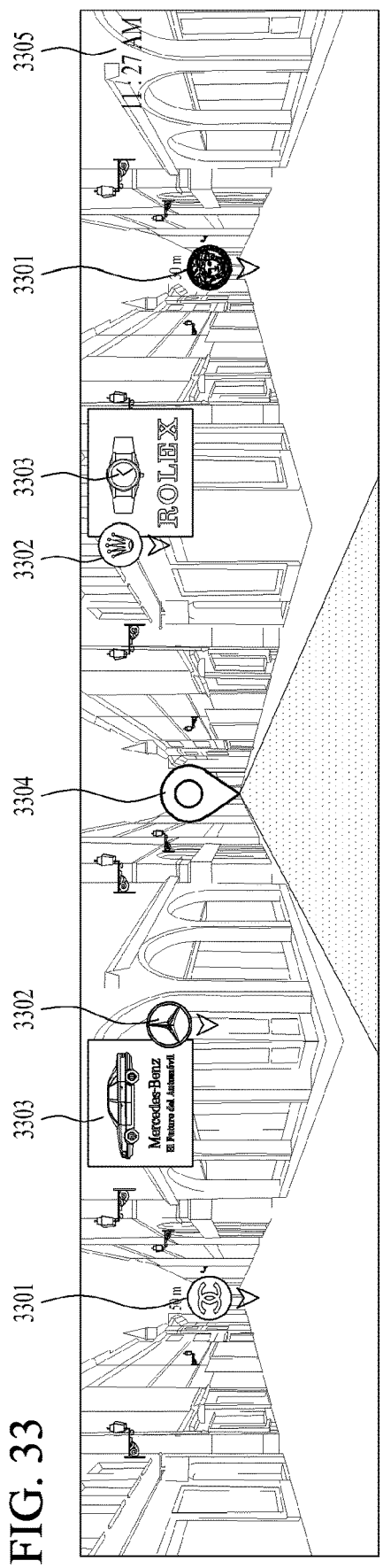
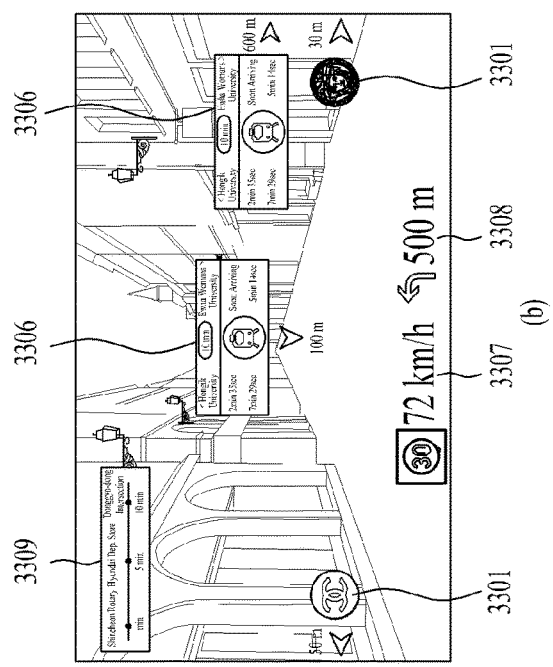

FIG. 34
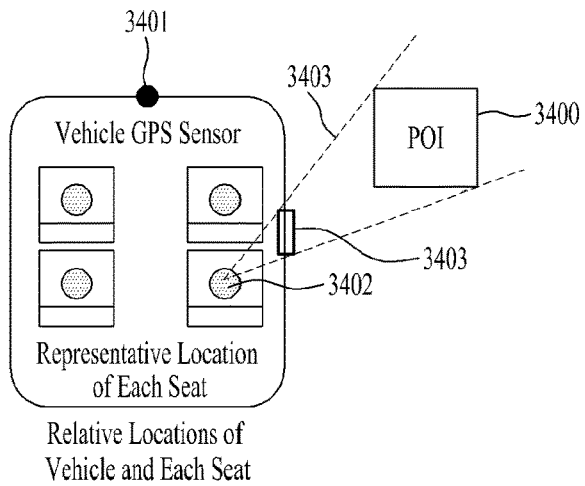
Relative Locations of
Vehicle and Each Seat
(a)
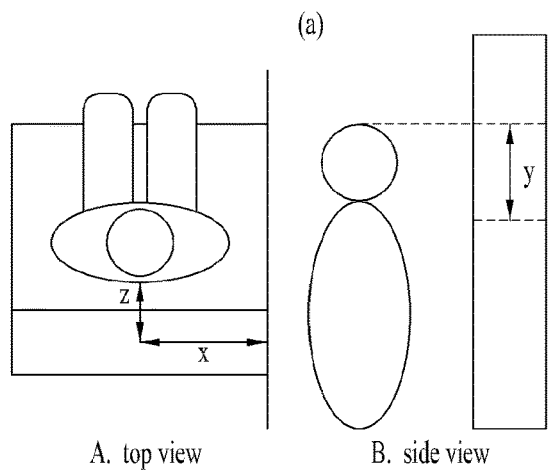
A. top view   B. side view
Measure Relative Locations
of Vehicle and Each Seat
(b)
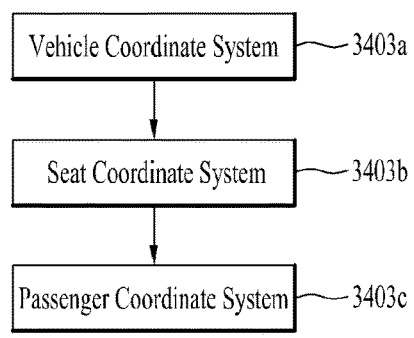
Coordinate System
Transformation
(c)

AR MOBILITY AND METHOD OF CONTROLLING AR MOBILITY

CROSS-REFERENCE TO RELATED APPLICATION

Pursuant to 35 U.S.C. § 119(a), this application claims the benefit of earlier filing date and right of priority to Korean Patent Application No. 10-2019-0132771, filed on Oct. 24, 2019, the contents of which are hereby incorporated by reference herein in its entirety.

BACKGROUND

Field

The present disclosure relates to an extended reality (XR) device for providing augmented reality (AR) mode and virtual reality (VR) mode and a method of controlling the same. More particularly, the present disclosure is applicable to all of the technical fields of 5th generation (5G) communication, robots, self-driving, and artificial intelligence (AI).

Discussion of the Related Art

VR(Virtual Reality) technology is to provide CG (Computer Graphic) video data for an object or background of real world. AR (Augmented Reality) technology is to provide CG video data made by virtual data on real object video data. MR (Mixed) technology is a computer graphic technology to provide a combination of the real world and virtual objects. VR, AR and MR refer to XR (extended reality) technology.

Mobility services are evolving into a form of driverless vehicles capable of transporting a large number of passengers. A driverless vehicle-type mobility device is equipped with transparent displays (multi-displays) mounted on front/rear and left/right windows. With the development of 5G communication technology, services based on the Internet of Things (IoT) or augmented reality (AR) technology are being developed.

SUMMARY OF THE DISCLOSURE

Regarding mobility, there is an increasing need for differentiated Human Machine Interface (HMI) services in a multi-display environment for passengers. In other words, augmented reality (AR) or virtual reality (VR) technology is being used to provide differentiated HMI services.

However, when an AR object is displayed on a transparent display of mobility, and a plurality of passengers within the mobility is on board, the AR mobility may not match an external object. In other words, because both the positions and the viewing directions (gazes) of the passengers are random, the AR object may not match an external object in view of the passengers when there are many passengers (or when all passengers crowd around the front side or rear side).

In addition, there may be passengers looking forward, passengers looking one side, passengers looking backward, seated passengers, standing passengers, and the like. In this case, it may be difficult to match the AR graphic displayed on the transparent display at each position with reality.

Therefore, when the mobility control device performs AR gaze matching (and/or calibration) based on a specific passenger, other passengers may undergo an error in matching between an AR object and an object present outside.

In addition, different AR content may expected by each passenger. Thus, there may be a need for a display that may be shared by all passengers present in mobility and an independent display that may be controlled by each passenger.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

Accordingly, in order to address the above-mentioned issues, an AR mobility control method and an AR mobility control apparatus according to embodiments are proposed.

According to embodiments, a method of controlling augmented reality (AR) mobility may include generating, by a camera, image data by photographing one or more users, extracting information about the one or more users from the image data, wherein the information about the one or more users may include location information about the users, calculating a reference point for projection of an AR object based on the location information about the users, and displaying the AR object on a display based on the calculated reference point.

Herein, the AR object may indicate information related to an object present outside the AR mobility, wherein the AR object may be displayed in a first area of the display or a second area of the display based on the reference point, wherein the first area may be an area where the object is projected onto the display, and the second area may be an area for displaying information related to the first area.

In addition, the camera may be a 360-degree camera, wherein the reference point may be a representative value determined based on coordinate values for the one or more users included in the location information about the users.

Herein, the information about the one or more users may further include gaze direction information about the one or more users, and the control method may further include grouping the one or more users into at least one group according to the gaze direction information about the one or more users before the calculating of the reference point, wherein the reference point may be determined based on the location information about at least one user included in a first group of the group.

In addition, the display may display an exclusive object indicating information related to a first user of the one or more users based on information about a location of the first user.

Specifically, information about a location of a first user is determined based on at least one of calculating a location of the AR mobility based on a vehicle coordinate system, calculating a location of a seat in the AR mobility based on a seat coordinate system, or calculating the location of the first user present on the seat based on a passenger coordinate system.

Additionally, a first object indicating information about a distance from the AR mobility to an object, a second object indicating information about a moving speed of the AR mobility, a third object indicating information about a destination of the AR mobility, and a fourth object indicating a map, a fifth object indicating information related to an object located within a predetermined distance from the AR mobility, a sixth object indicating news information, and a seventh object indicating a current time may be further displayed, wherein the display may be a transparent display.

The control method may further include generating location information about the AR mobility by a global positioning system (GPS) sensor, transmitting, by a communicator, the location information about the AR mobility to a server, and receiving, by the communicator, information indicated by the first to fifth objects generated according to the location information from the server.

Accordingly, in the AR mobility control method, the gaze direction information may be one of a forward direction, a rearward direction, a leftward direction, and a rightward direction, wherein the users may include a first user and a second user, the first and second users having the same gaze direction information, wherein the display may be used as a display corresponding to the gaze direction information about the first user and the second user among a front display, rear display, left display, and right display of the AR mobility, wherein the reference point may be determined based on information about a location of the first user and information about a location of the second user, wherein the AR object may be displayed in an area of a first display based on the reference point, the object being projected on the display.

Additionally, the AR object may include information related to self-driving of the AR mobility.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 5 illustrates an example of UL transmission according to an uplink grant;

FIG. 24 illustrates an AR mobility device and an internal structure of AR mobility according to embodiments;

FIG. 27 illustrates an AR mobility control device (or AR mobility device) according to embodiments;

FIG. 33 illustrates objects displayed on a display of an AR mobility control device (or an AR mobility device) according to embodiments;

FIG. 34 illustrates a procedure of displaying an AR object for an object on a display by an AR mobility control device according to embodiments;

DETAILED DESCRIPTION OF THE DISCLOSURE

Figure 1:
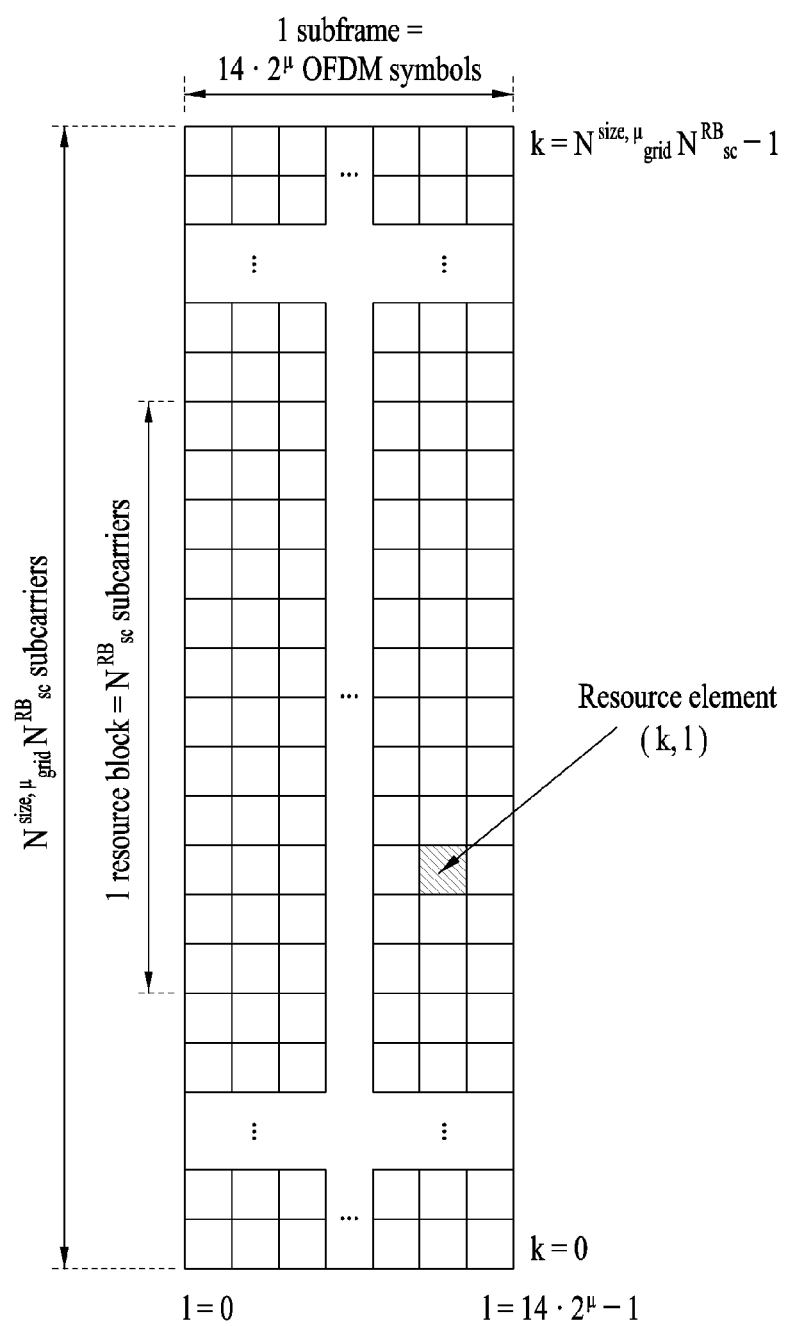
FIG. 1 illustrates a mapped resource grid of physical signals/channels in a 3GPP based system.

Reference will now be made in detail to embodiments of the present disclosure, examples of which are illustrated in the accompanying drawings. Wherever possible, the same reference numbers will be used throughout the drawings to refer to the same or like parts, and a redundant description will be avoided. The terms "module" and "unit" are interchangeably used only for easiness of description and thus they should not be considered as having distinctive meanings or roles. Further, a detailed description of well-known technology will not be given in describing embodiments of the present disclosure lest it should obscure the subject matter of the embodiments. The attached drawings are provided to help the understanding of the embodiments of the present disclosure, not limiting the scope of the present disclosure. It is to be understood that the present disclosure covers various modifications, equivalents, and/or alternatives falling within the scope and spirit of the present disclosure.

The following embodiments of the present disclosure are intended to embody the present disclosure, not limiting the scope of the present disclosure. What could easily be derived from the detailed description of the present disclosure and the embodiments by a person skilled in the art is interpreted as falling within the scope of the present disclosure.

The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Introduction

In the disclosure, downlink (DL) refers to communication from a base station (BS) to a user equipment (UE), and uplink (UL) refers to communication from the UE to the BS. On DL, a transmitter may be a part of the BS and a receiver may be a part of the UE, whereas on UL, a transmitter may be a part of the UE and a receiver may be a part of the BS. A UE may be referred to as a first communication device, and a BS may be referred to as a second communication device in the present disclosure. The term BS may be replaced with fixed station, Node B, evolved Node B (eNB), next generation Node B (gNB), base transceiver system (BTS), access point (AP), network or $5^{th}$ generation (5G) network node, artificial intelligence (AI) system, road side unit (RSU), robot, augmented reality/virtual reality (AR/VR) system, and so on. The term UE may be replaced with terminal, mobile station (MS), user terminal (UT), mobile subscriber station (MSS), subscriber station (SS), advanced mobile station (AMS), wireless terminal (WT), device-to-device (D2D) device, vehicle, robot, AI device (or module), AR/VR device (or module), and so on.

The following technology may be used in various wireless access systems including code division multiple access (CDMA), frequency division multiple access (FDMA), time division multiple access (TDMA), orthogonal frequency division multiple access (OFDMA), and single carrier FDMA (SC-FDMA).

For the convenience of description, the present disclosure is described in the context of a $3^{rd}$ generation partnership project (3GPP) communication system (e.g., long term evolution-advanced (LTE-A) and new radio or new radio access technology (NR)), which should not be construed as limiting the present disclosure. For reference, 3GPP LTE is part of evolved universal mobile telecommunications system (E-UMTS) using evolved UMTS terrestrial radio access (E-UTRA), and LTE-A/LTE-A pro is an evolution of 3GPP LTE. 3GPP NR is an evolution of 3GPP/LTE-A/LTE-A pro.

In the present disclosure, a node refers to a fixed point capable of transmitting/receiving wireless signals by communicating with a UE. Various types of BSs may be used as nodes irrespective of their names. For example, any of a BS, an NB, an eNB, a pico-cell eNB (PeNB), a home eNB (HeNB), a relay, and a repeater may be a node. At least one antenna is installed in one node. The antenna may refer to a physical antenna, an antenna port, a virtual antenna, or an antenna group. A node is also referred to as a point.

In the present disclosure, a cell may refer to a certain geographical area or radio resources, in which one or more nodes provide a communication service. A "cell" as a geographical area may be understood as coverage in which a service may be provided in a carrier, while a "cell" as radio resources is associated with the size of a frequency configured in the carrier, that is, a bandwidth (BW). Because a range in which a node may transmit a valid signal, that is, DL coverage and a range in which the node may receive a valid signal from a UE, that is, UL coverage depend on a carrier carrying the signals, and thus the coverage of the node is associated with the "cell" coverage of radio resources used by the node. Accordingly, the term "cell" may mean the service overage of a node, radio resources, or a range in which a signal reaches with a valid strength in the radio resources, under circumstances.

In the present disclosure, communication with a specific cell may amount to communication with a BS or node that provides a communication service to the specific cell. Further, a DL/UL signal of a specific cell means a DL/UL signal from/to a BS or node that provides a communication service to the specific cell. Particularly, a cell that provides a UL/DL communication service to a UE is called a serving cell for the UE. Further, the channel state/quality of a specific cell refers to the channel state/quality of a channel or a communication link established between a UE and a BS or node that provides a communication service to the specific cell.

A "cell" associated with radio resources may be defined as a combination of DL resources and UL resources, that is, a combination of a DL component carrier (CC) and a UL CC. A cell may be configured with DL resources alone or both DL resources and UL resources in combination. When carrier aggregation (CA) is supported, linkage between the carrier frequency of DL resources (or a DL CC) and the carrier frequency of UL resources (or a UL CC) may be indicated by system information transmitted in a corresponding cell. A carrier frequency may be identical to or different from the center frequency of each cell or CC. Hereinbelow, a cell operating in a primary frequency is referred to as a primary cell (Pcell) or PCC, and a cell operating in a secondary frequency is referred to as a secondary cell (Scell) or SCC. The Scell may be configured after a UE and a BS perform a radio resource control (RRC) connection establishment procedure and thus an RRC connection is established between the UE and the BS, that is, the UE is RRC_CONNECTED. The RRC connection may mean a path in which the RRC of the UE may exchange RRC messages with the RRC of the BS. The Scell may be configured to provide additional radio resources to the UE. The Scell and the Pcell may form a set of serving cells for the UE according to the capabilities of the UE. Only one serving cell configured with a Pcell exists for an RRC_CONNECTED UE which is not configured with CA or does not support CA.

A cell supports a unique radio access technology (RAT). For example, LTE RAT-based transmission/reception is performed in an LTE cell, and 5G RAT-based transmission/reception is performed in a 5G cell.

CA aggregates a plurality of carriers each having a smaller system BW than a target BW to support broadband.

CA differs from OFDMA in that DL or UL communication is conducted in a plurality of carrier frequencies each forming a system BW (or channel BW) in the former, and DL or UL communication is conducted by loading a basic frequency band divided into a plurality of orthogonal subcarriers in one carrier frequency in the latter. In OFDMA or orthogonal frequency division multiplexing (OFDM), for example, one frequency band having a certain system BW is divided into a plurality of subcarriers with a predetermined subcarrier spacing, information/data is mapped to the plurality of subcarriers, and the frequency band in which the information/data has been mapped is transmitted in a carrier frequency of the frequency band through frequency upconversion. In wireless CA, frequency bands each having a system BW and a carrier frequency may be used simultaneously for communication, and each frequency band used in CA may be divided into a plurality of subcarriers with a predetermined subcarrier spacing.

The 3GPP communication standards define DL physical channels corresponding to resource elements (REs) conveying information originated from upper layers of the physical layer (e.g., the medium access control (MAC) layer, the radio link control (RLC) layer, the packet data convergence protocol (PDCP) layer, the radio resource control (RRC) layer, the service data adaptation protocol (SDAP) layer, and the non-access stratum (NAS) layer), and DL physical signals corresponding to REs which are used in the physical layer but do not deliver information originated from the upper layers. For example, physical downlink shared channel (PDSCH), physical broadcast channel (PBCH), physical multicast channel (PMCH), physical control format indicator channel (PCFICH), and physical downlink control channel (PDCCH) are defined as DL physical channels, and a reference signal (RS) and a synchronization signal are defined as DL physical signals. An RS, also called a pilot is a signal in a predefined special waveform known to both a BS and a UE. For example, cell specific RS (CRS), UE-specific RS (UE-RS), positioning RS (PRS), channel state information RS (CSI-RS), and demodulation RS (DMRS) are defined as DL RSs. The 3GPP communication standards also define UL physical channels corresponding to REs conveying information originated from upper layers, and UL physical signals corresponding to REs which are used in the physical layer but do not carry information originated from the upper layers. For example, physical uplink shared channel (PUSCH), physical uplink control channel (PUCCH), and physical random access channel (PRACH) are defined as UL physical channels, and DMRS for a UL control/data signal and sounding reference signal (SRS) used for UL channel measurement are defined.

In the present disclosure, physical shared channels (e.g., PUSCH and PDSCH) are used to deliver information originated from the upper layers of the physical layer (e.g., the MAC layer, the RLC layer, the PDCP layer, the RRC layer, the SDAP layer, and the NAS layer).

In the present disclosure, an RS is a signal in a predefined special waveform known to both a BS and a UE. In a 3GPP communication system, for example, the CRS being a cell common RS, the UE-RS for demodulation of a physical channel of a specific UE, the CSI-RS used to measure/estimate a DL channel state, and the DMRS used to demodulate a physical channel are defined as DL RSs, and the DMRS used for demodulation of a UL control/data signal and the SRS used for UL channel state measurement/estimation are defined as UL RSs.

In the present disclosure, a transport block (TB) is payload for the physical layer. For example, data provided to the physical layer by an upper layer or the MAC layer is basically referred to as a TB. A UE which is a device including an AR/VR module (i.e., an AR/VR device) may transmit a TB including AR/VR data to a wireless communication network (e.g., a 5G network) on a PUSCH. Further, the UE may receive a TB including AR/VR data of the 5G network or a TB including a response to AR/VR data transmitted by the UE from the wireless communication network.

In the present disclosure, hybrid automatic repeat and request (HARQ) is a kind of error control technique. An HARQ acknowledgement (HARQ-ACK) transmitted on DL is used for error control of UL data, and a HARQ-ACK transmitted on UL is used for error control of DL data. A transmitter performing an HARQ operation awaits reception of an ACK after transmitting data (e.g., a TB or a codeword). A receiver performing an HARQ operation transmits an ACK only when data has been successfully received, and a negative ACK (NACK) when the received data has an error. Upon receipt of the ACK, the transmitter may transmit (new) data, and upon receipt of the NACK, the transmitter may retransmit the data.

In the present disclosure, CSI generically refers to information representing the quality of a radio channel (or link) established between a UE and an antenna port. The CSI may include at least one of a channel quality indicator (CQI), a precoding matrix indicator (PMI), a CSI-RS resource indicator (CRI), a synchronization signal block resource indicator (SSBRI), a layer indicator (LI), a rank indicator (RI), or a reference signal received power (RSRP).

In the present disclosure, frequency division multiplexing (FDM) is transmission/reception of signals/channels/users in different frequency resources, and time division multiplexing (TDM) is transmission/reception of signals/channels/users in different time resources.

In the present disclosure, frequency division duplex (FDD) is a communication scheme in which UL communication is performed in a UL carrier, and DL communication is performed in a DL carrier linked to the UL carrier, whereas time division duplex (TDD) is a communication scheme in which UL communication and DL communication are performed in time division in the same carrier. In the present disclosure, half-duplex is a scheme in which a communication device operates on UL or UL only in one frequency at one time point, and on DL or UL in another frequency at another time point. For example, when the communication device operates in half-duplex, the communication device communicates in UL and DL frequencies, wherein the communication device performs a UL transmission in the UL frequency for a predetermined time, and retunes to the DL frequency and performs a DL reception in the DL frequency for another predetermined time, in time division, without simultaneously using the UL and DL frequencies.

FIG. 1 is a diagram illustrating an exemplary resource grid to which physical signals/channels are mapped in a 3GPP system.

Referring to FIG. 1, for each subcarrier spacing configuration and carrier, a resource grid of $N^{size,\mu}_{grid} * N^{RB}_{sc}$ subcarriers $14 \cdot 2^{\mu}$ OFDM symbols is defined. Herein, $N^{size,\mu}_{grid}$ is indicated by RRC signaling from a BS, and $\mu$ represents a subcarrier spacing $\Delta f$ given by $\Delta f = 2^{\mu} * 15$ [kHz] where $\mu \in \{0, 1, 2, 3, 4\}$ in a 5G system.

$N^{size,\mu}_{grid}$ may be different between UL and DL as well as a subcarrier spacing configuration $\mu$. For the subcarrier spacing configuration $\mu$, an antenna port p, and a transmission direction (UL or DL), there is one resource grid. Each element of a resource grid for the subcarrier spacing configuration μ and the antenna port p is referred to as an RE, uniquely identified by an index pair (k,l) where k is a frequency-domain index and l is the position of a symbol in a relative time domain with respect to a reference point. A frequency unit used for mapping physical channels to REs, resource block (RB) is defined by 12 consecutive subcarriers ($N^{RB}_{sc}$=12) in the frequency domain. Considering that a UE may not support a wide BW supported by the 5G system at one time, the UE may be configured to operate in a part (referred to as a bandwidth part (BWP)) of the frequency BW of a cell.

For the background technology, terminology, and abbreviations used in the present disclosure, standard specifications published before the present disclosure may be referred to. For example, the following documents may be referred to.

3GPP LTE
3GPP TS 36.211: Physical channels and modulation
3GPP TS 36.212: Multiplexing and channel coding
3GPP TS 36.213: Physical layer procedures
3GPP TS 36.214: Physical layer; Measurements
3GPP TS 36.300: Overall description
3GPP TS 36.304: User Equipment (UE) procedures in idle mode
3GPP TS 36.314: Layer 2—Measurements
3GPP TS 36.321: Medium Access Control (MAC) protocol
3GPP TS 36.322: Radio Link Control (RLC) protocol
3GPP TS 36.323: Packet Data Convergence Protocol (PDCP)
3GPP TS 36.331: Radio Resource Control (RRC) protocol
3GPP TS 23.303: Proximity-based services (Prose); Stage 2
3GPP TS 23.285: Architecture enhancements for V2X services
3GPP TS 23.401: General Packet Radio Service (GPRS) enhancements for Evolved Universal Terrestrial Radio Access Network (E-UTRAN) access
3GPP TS 23.402: Architecture enhancements for non-3GPP accesses
3GPP TS 23.286: Application layer support for V2X services; Functional architecture and information flows
3GPP TS 24.301: Non-Access-Stratum (NAS) protocol for Evolved Packet System (EPS); Stage 3
3GPP TS 24.302: Access to the 3GPP Evolved Packet Core (EPC) via non-3GPP access networks; Stage 3
3GPP TS 24.334: Proximity-services (ProSe) User Equipment (UE) to ProSe function protocol aspects; Stage 3
3GPP TS 24.386: User Equipment (UE) to V2X control function; protocol aspects; Stage 3
3GPP NR (e.g. 5G)
3GPP TS 38.211: Physical channels and modulation
3GPP TS 38.212: Multiplexing and channel coding
3GPP TS 38.213: Physical layer procedures for control
3GPP TS 38.214: Physical layer procedures for data
3GPP TS 38.215: Physical layer measurements
3GPP TS 38.300: NR and NG-RAN Overall Description
3GPP TS 38.304: User Equipment (UE) procedures in idle mode and in RRC inactive state
3GPP TS 38.321: Medium Access Control (MAC) protocol
3GPP TS 38.322: Radio Link Control (RLC) protocol
3GPP TS 38.323: Packet Data Convergence Protocol (PDCP)
3GPP TS 38.331: Radio Resource Control (RRC) protocol
3GPP TS 37.324: Service Data Adaptation Protocol (SDAP)
3GPP TS 37.340: Multi-connectivity; Overall description
3GPP TS 23.287: Application layer support for V2X services; Functional architecture and information flows
3GPP TS 23.501: System Architecture for the 5G System
3GPP TS 23.502: Procedures for the 5G System
3GPP TS 23.503: Policy and Charging Control Framework for the 5G System; Stage 2
3GPP TS 24.501: Non-Access-Stratum (NAS) protocol for 5G System (5GS); Stage 3
3GPP TS 24.502: Access to the 3GPP 5G Core Network (SGCN) via non-3GPP access networks
3GPP TS 24.526: User Equipment (UE) policies for 5G System (5GS); Stage 3

Figure 2:
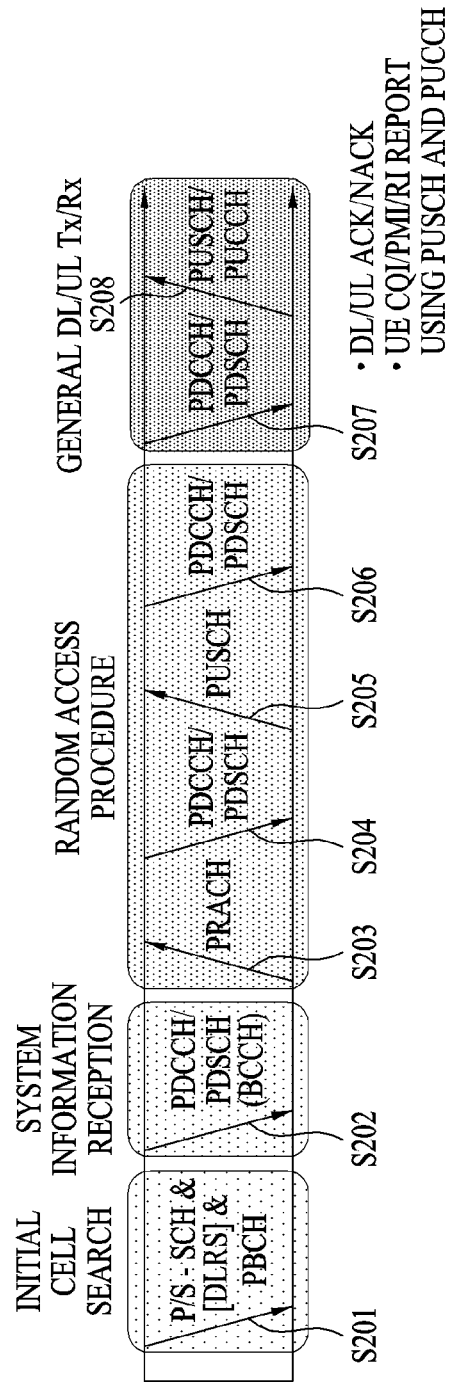
FIG. 2 is a diagram illustrating an example of a 3GPP signal transmission/reception method.

FIG. 2 is a diagram illustrating an exemplary method of transmitting/receiving 3 GPP signals.

Referring to FIG. 2, when a UE is powered on or enters a new cell, the UE performs an initial cell search involving acquisition of synchronization with a BS (S201). For the initial cell search, the UE receives a primary synchronization channel (P-SCH) and a secondary synchronization channel (S-SCH), acquires synchronization with the BS, and obtains information such as a cell identifier (ID) from the P-SCH and the S-SCH. In the LTE system and the NR system, the P-SCH and the S-SCH are referred to as a primary synchronization signal (PSS) and a secondary synchronization signal (SSS), respectively. The initial cell search procedure will be described below in greater detail.

After the initial cell search, the UE may receive a PBCH from the BS and acquire broadcast information within a cell from the PBCH. During the initial cell search, the UE may check a DL channel state by receiving a DL RS.

Upon completion of the initial cell search, the UE may acquire more specific system information by receiving a PDCCH and receiving a PDSCH according to information carried on the PDCCH (S202).

When the UE initially accesses the BS or has no radio resources for signal transmission, the UE may perform a random access procedure with the BS (S203 to S206). For this purpose, the UE may transmit a predetermined sequence as a preamble on a PRACH (S203 and S205) and receive a PDCCH, and a random access response (RAR) message in response to the preamble on a PDSCH corresponding to the PDCCH (S204 and S206). If the random access procedure is contention-based, the UE may additionally perform a contention resolution procedure. The random access procedure will be described below in greater detail.

After the above procedure, the UE may then perform PDCCH/PDSCH reception (S207) and PUSCH/PUCCH transmission (S208) in a general UL/DL signal transmission procedure. Particularly, the UE receives DCI on a PDCCH.

The UE monitors a set of PDCCH candidates in monitoring occasions configured for one or more control element sets (CORESETs) in a serving cell according to a corresponding search space configuration. The set of PDCCH candidates to be monitored by the UE is defined from the perspective of search space sets. A search space set may be a common search space set or a UE-specific search space set. A CORESET includes a set of (physical) RBs that last for a time duration of one to three OFDM symbols. The network may configure a plurality of CORESETs for the UE. The UE monitors PDCCH candidates in one or more search space sets. Herein, monitoring is attempting to decode PDCCH candidate(s) in a search space. When the UE succeeds in decoding one of the PDCCH candidates in the search space, the UE determines that a PDCCH has been detected from among the PDCCH candidates and performs PDSCH reception or PUSCH transmission based on DCI included in the detected PDCCH.

The PDCCH may be used to schedule DL transmissions on a PDSCH and UL transmissions on a PUSCH. DCI in the PDCCH includes a DL assignment (i.e., a DL grant) including at least a modulation and coding format and resource allocation information for a DL shared channel, and a UL grant including a modulation and coding format and resource allocation information for a UL shared channel.

Initial Access (IA) Procedure

Synchronization Signal Block (SSB) Transmission and Related Operation

Figure 3:
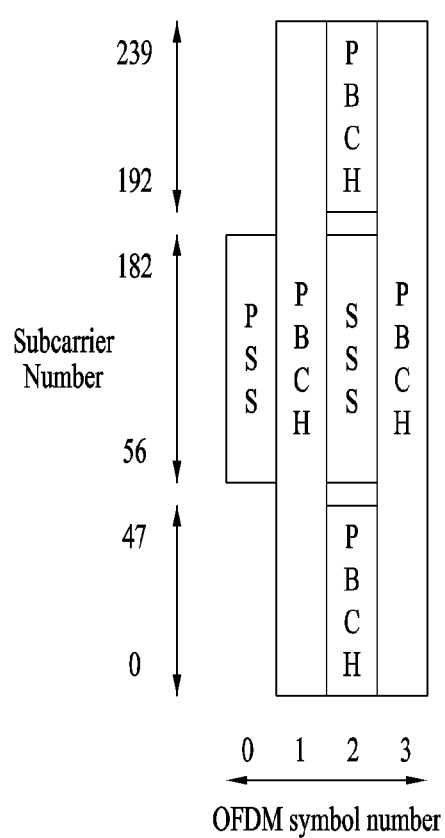
FIG. 3 illustrates an SSB structure.

FIG. 3 is a diagram illustrating an exemplary SSB structure. The UE may perform cell search, system information acquisition, beam alignment for initial access, DL measurement, and so on, based on an SSB. The term SSB is interchangeably used with synchronization signal/physical broadcast channel (SS/PBCH).

Referring to FIG. 3, an SSB includes a PSS, an SSS, and a PBCH. The SSB includes four consecutive OFDM symbols, and the PSS, the PBCH, the SSS/PBCH, or the PBCH is transmitted in each of the OFDM symbols. The PBCH is encoded/decoded based on a polar code and modulated/demodulated in quadrature phase shift keying (QPSK). The PBCH in an OFDM symbol includes data REs to which a complex modulated value of the PBCH is mapped and DMRS REs to which a DMRS for the PBCH is mapped. There are three DMRS REs per RB in an OFDM symbol and three data REs between every two of the DMRS REs.

Cell Search

Cell search is a process of acquiring the time/frequency synchronization of a cell and detecting the cell ID (e.g., physical cell ID (PCI)) of the cell by a UE. The PSS is used to detect a cell ID in a cell ID group, and the SSS is used to detect the cell ID group. The PBCH is used for SSB (time) index detection and half-frame detection.

In the 5G system, there are 336 cell ID groups each including 3 cell IDs. Therefore, a total of 1008 cell IDs are available. Information about a cell ID group to which the cell ID of a cell belongs is provided/acquired by/from the SSS of the cell, and information about the cell ID among 336 cells within the cell ID is provided/acquired by/from the PSS.

The SSB is periodically transmitted with an SSB periodicity. The UE assumes a default SSB periodicity of 20 ms during initial cell search. After cell access, the SSB periodicity may be set to one of {5 ms, 10 ms, 20 ms, 40 ms, 80 ms, 160 ms} by the network (e.g., a BS). An SSB burst set is configured at the start of an SSB period. The SSB burst set is composed of a 5-ms time window (i.e., half-frame), and the SSB may be transmitted up to L times within the SSB burst set. The maximum number L of SSB transmissions may be given as follows according to the frequency band of a carrier.

For frequency range up to 3 GHz, L=4
For frequency range from 3 GHz to 6 GHz, L=8
For frequency range from 6 GHz to 52.6 GHz, L=64

The possible time positions of SSBs in a half-frame are determined by a subcarrier spacing, and the periodicity of half-frames carrying SSBs is configured by the network. The time positions of SSB candidates are indexed as 0 to L-1 (SSB indexes) in a time order in an SSB burst set (i.e., half-frame). Other SSBs may be transmitted in different spatial directions (by different beams spanning the coverage area of the cell) during the duration of a half-frame. Accordingly, an SSB index (SSBI) may be associated with a BS transmission (Tx) beam in the 5G system.

The UE may acquire DL synchronization by detecting an SSB. The UE may identify the structure of an SSB burst set based on a detected (time) SSBI and hence a symbol/slot/half-frame boundary. The number of a frame/half-frame to which the detected SSB belongs may be identified by using system frame number (SFN) information and half-frame indication information.

Specifically, the UE may acquire the 10-bit SFN of a frame carrying the PBCH from the PBCH. Subsequently, the UE may acquire 1-bit half-frame indication information. For example, when the UE detects a PBCH with a half-frame indication bit set to 0, the UE may determine that an SSB to which the PBCH belongs is in the first half-frame of the frame. When the UE detects a PBCH with a half-frame indication bit set to 1, the UE may determine that an SSB to which the PBCH belongs is in the second half-frame of the frame. Finally, the UE may acquire the SSBI of the SSB to which the PBCH belongs based on a DMRS sequence and PBCH payload delivered on the PBCH.

System Information (SI) Acquisition

SI is divided into a master information block (MIB) and a plurality of system information blocks (SIBs). The SI except for the MIB may be referred to as remaining minimum system information (RMSI). For details, the following may be referred to.

The MIB includes information/parameters for monitoring a PDCCH that schedules a PDSCH carrying systemInformationBlock1 (SIB1), and transmitted on a PBCH of an SSB by a BS. For example, a UE may determine from the MIB whether there is any CORESET for a Type0-PDCCH common search space. The Type0-PDCCH common search space is a kind of PDCCH search space and used to transmit a PDCCH that schedules an SI message. In the presence of a Type0-PDCCH common search space, the UE may determine (1) a plurality of contiguous RBs and one or more consecutive symbols included in a CORESET, and (ii) a PDCCH occasion (e.g., a time-domain position at which a PDCCH is to be received), based on information (e.g., pdcch-ConfigSIB1) included in the MIB.

SIB1 includes information related to availability and scheduling (e.g., a transmission period and an SI-window size) of the remaining SIBs (hereinafter, referred to SIBx where x is an integer equal to or larger than 2). For example, SIB1 may indicate whether SIBx is broadcast periodically or in an on-demand manner upon user request. If SIBx is provided in the on-demand manner, SIB1 may include information required for the UE to transmit an SI request. A PDCCH that schedules SIB1 is transmitted in the Type0-PDCCH common search space, and SIB1 is transmitted on a PDSCH indicated by the PDCCH.

SIBx is included in an SI message and transmitted on a PDSCH. Each SI message is transmitted within a periodic time window (i.e., SI-window).

Random Access Procedure

The random access procedure serves various purposes. For example, the random access procedure may be used for network initial access, handover, and UE-triggered UL data transmission. The UE may acquire UL synchronization and UL transmission resources in the random access procedure. The random access procedure may be contention-based or contention-free.

Figure 4:
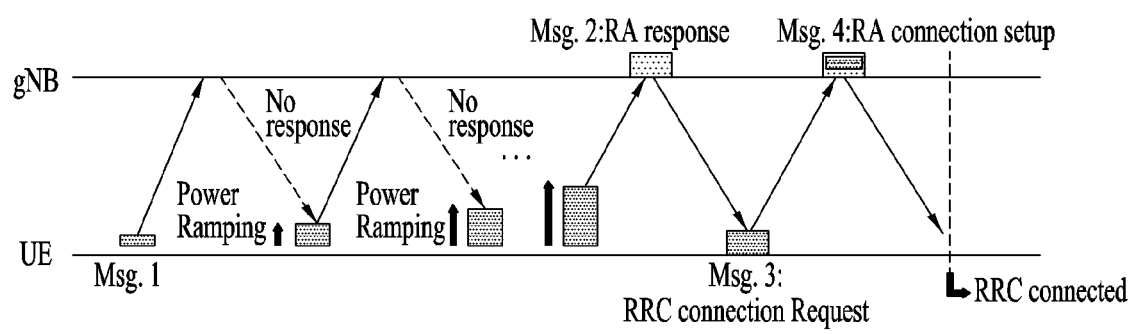
FIG. 4 illustrates an example of a random access procedure.

FIG. 4 is a diagram illustrating an exemplary random access procedure. Particularly, FIG. 4 illustrates a contention-based random access procedure.

First, a UE may transmit a random access preamble as a first message (Msg1) of the random access procedure on a PRACH. In the present disclosure, a random access procedure and a random access preamble are also referred to as a RACH procedure and a RACH preamble, respectively.

A plurality of preamble formats are defined by one or more RACH OFDM symbols and different cyclic prefixes (CPs) (and/or guard times). A RACH configuration for a cell is included in system information of the cell and provided to the UE. The RACH configuration includes information about a subcarrier spacing, available preambles, a preamble format, and so on for a PRACH. The RACH configuration includes association information between SSBs and RACH (time-frequency) resources, that is, association information between SSBIs and RACH (time-frequency) resources. The SSBIs are associated with Tx beams of a BS, respectively. The UE transmits a RACH preamble in RACH time-frequency resources associated with a detected or selected SSB. The BS may identify a preferred BS Tx beam of the UE based on time-frequency resources in which the RACH preamble has been detected.

An SSB threshold for RACH resource association may be configured by the network, and a RACH preamble transmission (i.e., PRACH transmission) or retransmission is performed based on an SSB in which an RSRP satisfying the threshold has been measured. For example, the UE may select one of SSB(s) satisfying the threshold and transmit or retransmit the RACH preamble in RACH resources associated with the selected SSB.

Upon receipt of the RACH preamble from the UE, the BS transmits an RAR message (a second message (Msg2)) to the UE. A PDCCH that schedules a PDSCH carrying the RAR message is cyclic redundancy check (CRC)-masked by an RA radio network temporary identifier (RNTI) (RA-RNTI) and transmitted. When the UE detects the PDCCH masked by the RA-RNTI, the UE may receive the RAR message on the PDSCH scheduled by DCI delivered on the PDCCH. The UE determines whether RAR information for the transmitted preamble, that is, Msg1 is included in the RAR message. The UE may determine whether random access information for the transmitted Msg1 is included by checking the presence or absence of the RACH preamble ID of the transmitted preamble. If the UE fails to receive a response to Msg1, the UE may transmit the RACH preamble a predetermined number of or fewer times, while performing power ramping. The UE calculates the PRACH transmission power of a preamble retransmission based on the latest pathloss and a power ramping counter.

Upon receipt of the RAR information for the UE on the PDSCH, the UE may acquire timing advance information for UL synchronization, an initial UL grant, and a UE temporary cell RNTI (C-RNTI). The timing advance information is used to control a UL signal transmission timing. To enable better alignment between PUSCH/PUCCH transmission of the UE and a subframe timing at a network end, the network (e.g., BS) may measure the time difference between PUSCH/PUCCH/SRS reception and a subframe and transmit the timing advance information based on the measured time difference. The UE may perform a UL transmission as a third message (Msg3) of the RACH procedure on a PUSCH. Msg3 may include an RRC connection request and a UE ID. The network may transmit a fourth message (Msg4) in response to Msg3, and Msg4 may be treated as a contention solution message on DL. As the UE receives Msg4, the UE may enter an RRC_CONNECTED state.

The contention-free RACH procedure may be used for handover of the UE to another cell or BS or performed when requested by a BS command. The contention-free RACH procedure is basically similar to the contention-based RACH procedure. However, compared to the contention-based RACH procedure in which a preamble to be used is randomly selected among a plurality of RACH preambles, a preamble to be used by the UE (referred to as a dedicated RACH preamble) is allocated to the UE by the BS in the contention-free RACH procedure. Information about the dedicated RACH preamble may be included in an RRC message (e.g., a handover command) or provided to the UE by a PDCCH order. When the RACH procedure starts, the UE transmits the dedicated RACH preamble to the BS. When the UE receives the RACH procedure from the BS, the RACH procedure is completed.

DL and UL Transmission/Reception Operations

DL Transmission/Reception Operation

DL grants (also called DL assignments) may be classified into (1) dynamic grant and (2) configured grant. A dynamic grant is a data transmission/reception method based on dynamic scheduling of a BS, aiming to maximize resource utilization.

The BS schedules a DL transmission by DCI. The UE receives the DCI for DL scheduling (i.e., including scheduling information for a PDSCH) (referred to as DL grant DCI) from the BS. The DCI for DL scheduling may include, for example, the following information: a BWP indicator, a frequency-domain resource assignment, a time-domain resource assignment, and a modulation and coding scheme (MCS).

The UE may determine a modulation order, a target code rate, and a TB size (TBS) for the PDSCH based on an MCS field in the DCI. The UE may receive the PDSCH in time-frequency resources according to the frequency-domain resource assignment and the time-domain resource assignment.

The DL configured grant is also called semi-persistent scheduling (SPS). The UE may receive an RRC message including a resource configuration for DL data transmission from the BS. In the case of DL SPS, an actual DL configured grant is provided by a PDCCH, and the DL SPS is activated or deactivated by the PDCCH. When DL SPS is configured, the BS provides the UE with at least the following parameters by RRC signaling: a configured scheduling RNTI (CS-RNTI) for activation, deactivation, and retransmission; and a periodicity. An actual DL grant (e.g., a frequency resource assignment) for DL SPS is provided to the UE by DCI in a PDCCH addressed to the CS-RNTI. If a specific field in the DCI of the PDCCH addressed to the CS-RNTI is set to a specific value for scheduling activation, SPS associated with the CS-RNTI is activated. The DCI of the PDCCH addressed to the CS-RNTI includes actual frequency resource allocation information, an MCS index, and so on. The UE may receive DL data on a PDSCH based on the SPS.

UL Transmission/Reception Operation

UL grants may be classified into (1) dynamic grant that schedules a PUSCH dynamically by UL grant DCI and (2) configured grant that schedules a PUSCH semi-statically by RRC signaling.

FIG. 5 is a diagram illustrating exemplary UL transmissions according to UL grants. Particularly, FIG. 5(a) illustrates a UL transmission procedure based on a dynamic grant, and FIG. 5(b) illustrates a UL transmission procedure based on a configured grant.

In the case of a UL dynamic grant, the BS transmits DCI including UL scheduling information to the UE. The UE receives DCI for UL scheduling (i.e., including scheduling information for a PUSCH) (referred to as UL grant DCI) on a PDCCH. The DCI for UL scheduling may include, for example, the following information: a BWP indicator, a frequency-domain resource assignment, a time-domain resource assignment, and an MCS. For efficient allocation of UL radio resources by the BS, the UE may transmit information about UL data to be transmitted to the BS, and the BS may allocate UL resources to the UE based on the information. The information about the UL data to be transmitted is referred to as a buffer status report (BSR), and the BSR is related to the amount of UL data stored in a buffer of the UE.

Referring to FIG. 5(a), the illustrated UL transmission procedure is for a UE which does not have UL radio resources available for BSR transmission. In the absence of a UL grant available for UL data transmission, the UE is not capable of transmitting a BSR on a PUSCH. Therefore, the UE should request resources for UL data, starting with transmission of an SR on a PUCCH. In this case, a 5-step UL resource allocation procedure is used.

Referring to FIG. 5(a), in the absence of PUSCH resources for BSR transmission, the UE first transmits an SR to the BS, for PUSCH resource allocation. The SR is used for the UE to request PUSCH resources for UL transmission to the BS, when no PUSCH resources are available to the UE in spite of occurrence of a buffer status reporting event. In the presence of valid PUCCH resources for the SR, the UE transmits the SR on a PUCCH, whereas in the absence of valid PUCCH resources for the SR, the UE starts the afore-described (contention-based) RACH procedure. Upon receipt of a UL grant in UL grant DCI from the BS, the UE transmits a BSR to the BS in PUSCH resources allocated by the UL grant. The BS checks the amount of UL data to be transmitted by the UE based on the BSR and transmits a UL grant in UL grant DCI to the UE. Upon detection of a PDCCH including the UL grant DCI, the UE transmits actual UL data to the BS on a PUSCH based on the UL grant included in the UL grant DCI.

Referring to FIG. 5(b), in the case of a configured grant, the UE receives an RRC message including a resource configuration for UL data transmission from the BS. In the NR system, two types of UL configured grants are defined: type 1 and type 2. In the case of UL configured grant type 1, an actual UL grant (e.g., time resources and frequency resources) is provided by RRC signaling, whereas in the case of UL configured grant type 2, an actual UL grant is provided by a PDCCH, and activated or deactivated by the PDCCH. If configured grant type 1 is configured, the BS provides the UE with at least the following parameters by RRC signaling: a CS-RNTI for retransmission; a periodicity of configured grant type 1; information about a starting symbol index S and the number L of symbols for a PUSCH in a slot; a time-domain offset representing a resource offset with respect to SFN=0 in the time domain; and an MCS index representing a modulation order, a target code rate, and a TB size. If configured grant type 2 is configured, the BS provides the UE with at least the following parameters by RRC signaling: a CS-RNTI for activation, deactivation, and retransmission; and a periodicity of configured grant type 2. An actual UL grant of configured grant type 2 is provided to the UE by DCI of a PDCCH addressed to a CS-RNTI. If a specific field in the DCI of the PDCCH addressed to the CS-RNTI is set to a specific value for scheduling activation, configured grant type 2 associated with the CS-RNTI is activated. The DCI set to a specific value for scheduling activation in the PDCCH includes actual frequency resource allocation information, an MCS index, and so on. The UE may perform a UL transmission on a PUSCH based on a configured grant of type 1 or type 2.

Figure 6:
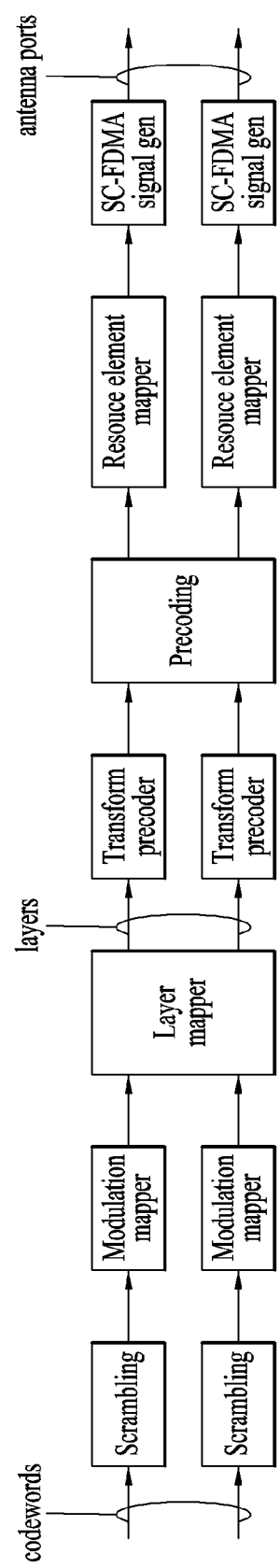
FIG. 6 shows an exemplary conceptual diagram of physical channel processing.

FIG. 6 is a conceptual diagram illustrating exemplary physical channel processing.

Each of the blocks illustrated in FIG. 6 may be performed in a corresponding module of a physical layer block in a transmission device. More specifically, the signal processing depicted in FIG. 6 may be performed for UL transmission by a processor of a UE described in the present disclosure. Signal processing of FIG. 6 except for transform precoding, with CP-OFDM signal generation instead of SC-FDMA signal generation may be performed for DL transmission in a processor of a BS described in the present disclosure. Referring to FIG. 6, UL physical channel processing may include scrambling, modulation mapping, layer mapping, transform precoding, precoding, RE mapping, and SC-FDMA signal generation. The above processes may be performed separately or together in the modules of the transmission device. The transform precoding, a kind of discrete Fourier transform (DFT), is to spread UL data in a special manner that reduces the peak-to-average power ratio (PAPR) of a waveform. OFDM which uses a CP together with transform precoding for DFT spreading is referred to as DFT-s-OFDM, and OFDM using a CP without DFT spreading is referred to as CP-OFDM. An SC-FDMA signal is generated by DFT-s-OFDM. In the NR system, if transform precoding is enabled for UL, transform precoding may be applied optionally. That is, the NR system supports two options for a UL waveform: one is CP-OFDM and the other is DFT-s-OFDM. The BS provides RRC parameters to the UE such that the UE determines whether to use CP-OFDM or DFT-s-OFDM for a UL transmission waveform. FIG. 6 is a conceptual view illustrating UL physical channel processing for DFT-s-OFDM. For CP-OFDM, transform precoding is omitted from the processes of FIG. 6. For DL transmission, CP-OFDM is used for DL waveform transmission.

Each of the above processes will be described in greater detail. For one codeword, the transmission device may scramble coded bits of the codeword by a scrambler and then transmit the scrambled bits on a physical channel. The codeword is obtained by encoding a TB. The scrambled bits are modulated to complex-valued modulation symbols by a modulation mapper. The modulation mapper may modulate the scrambled bits in a predetermined modulation scheme and arrange the modulated bits as complex-valued modulation symbols representing positions on a signal constellation. Pi/2-binay phase shift keying (pi/2-BPSK), m-phase shift keying (m-PSK), m-quadrature amplitude modulation (m-QAM), or the like is available for modulation of the coded data. The complex-valued modulation symbols may be mapped to one or more transmission layers by a layer mapper. A complexed-value modulation symbol on each layer may be precoded by a precoder, for transmission through an antenna port. If transform precoding is possible for UL transmission, the precoder may perform precoding after the complex-valued modulation symbols are subjected to transform precoding, as illustrated in FIG. 6. The precoder may output antenna-specific symbols by processing the complex-valued modulation symbols in a multiple input multiple output (MIMO) scheme according to multiple Tx antennas, and distribute the antenna-specific symbols to corresponding RE mappers. An output z of the precoder may be obtained by multiplying an output y of the layer mapper by an N×M precoding matrix, W where N is the number of antenna ports and M is the number of layers. The RE mappers map the complex-valued modulation symbols for the respective antenna ports to appropriate REs in an RB allocated for transmission. The RE mappers may map the complex-valued modulation symbols to appropriate subcarriers, and multiplex the mapped symbols according to users. SC-FDMA signal generators (CP-OFDM signal generators, when transform precoding is disabled in DL transmission or UL transmission) may generate complex-valued time domain OFDM symbol signals by modulating the complex-valued modulation symbols in a specific modulations scheme, for example, in OFDM. The SC-FDMA signal generators may perform inverse fast Fourier transform (IFFT) on the antenna-specific symbols and insert CPs into the time-domain IFFT-processed symbols. The OFDM symbols are subjected to digital-to-analog conversion, frequency upconversion, and so on, and then transmitted to a reception device through the respective Tx antennas. Each of the SC-FDMA signal generators may include an IFFT module, a CP inserter, a digital-to-analog converter (DAC), a frequency upconverter, and so on.

A signal processing procedure of the reception device is performed in a reverse order of the signal processing procedure of the transmission device. For details, refer to the above description and FIG. 6.

Now, a description will be given of the PUCCH.

The PUCCH is used for UCI transmission. UCI includes an SR requesting UL transmission resources, CSI representing a UE-measured DL channel state based on a DL RS, and/or an HARQ-ACK indicating whether a UE has successfully received DL data.

The PUCCH supports multiple formats, and the PUCCH formats are classified according to symbol durations, payload sizes, and multiplexing or non-multiplexing. [Table 1] below lists exemplary PUCCH formats.

TABLE 1

| Format | PUCCH length in OFDM symbols | Number of bits | Etc. |
|---|---|---|---|
| 0 | 1-2 | ≤2 | Sequence selection |
| 1 | 4-14 | ≤2 | Sequence modulation |
| 2 | 1-2 | >2 | CP-OFDM |
| 3 | 4-14 | >2 | DFT-s-OFDM (no UE multiplexing) |
| 4 | 4-14 | >2 | DFT-s-OFDM (Pre DFT orthogonal cover code(OCC)) |

The BS configures PUCCH resources for the UE by RRC signaling. For example, to allocate PUCCH resources, the BS may configure a plurality of PUCCH resource sets for the UE, and the UE may select a specific PUCCH resource set corresponding to a UCI (payload) size (e.g., the number of UCI bits). For example, the UE may select one of the following PUCCH resource sets according to the number of UCI bits, $N_{UCI}$.

PUCCH resource set #0, if the number of UCI bits ≤2

PUCCH resource set #1, if 2<the number of UCI bits≤$N_1$

. . .

PUCCH resource set #(K-1), if $N_{K-2}$<the number of UCI bits≤$N_{K-1}$

Herein, K represents the number of PUCCH resource sets (K>1), and Ni represents the maximum number of UCI bits supported by PUCCH resource set #i. For example, PUCCH resource set #1 may include resources of PUCCH format 0 to PUCCH format 1, and the other PUCCH resource sets may include resources of PUCCH format 2 to PUCCH format 4.

Subsequently, the BS may transmit DCI to the UE on a PDCCH, indicating a PUCCH resource to be used for UCI transmission among the PUCCH resources of a specific PUCCH resource set by an ACK/NACK resource indicator (ARI) in the DCI. The ARI may be used to indicate a PUCCH resource for HARQ-ACK transmission, also called a PUCCH resource indicator (PRI).

Enhanced Mobile Broadband Communication (eMBB)

In the NR system, a massive MIMO environment in which the number of Tx/Rx antennas is significantly increased is under consideration. On the other hand, in an NR system operating at or above 6 GHz, beamforming is considered, in which a signal is transmitted with concentrated energy in a specific direction, not omni-directionally, to compensate for rapid propagation attenuation. Accordingly, there is a need for hybrid beamforming with analog beamforming and digital beamforming in combination according to a position to which a beamforming weight vector/precoding vector is applied, for the purpose of increased performance, flexible resource allocation, and easiness of frequency-wise beam control.

Hybrid Beamforming

Figure 7:
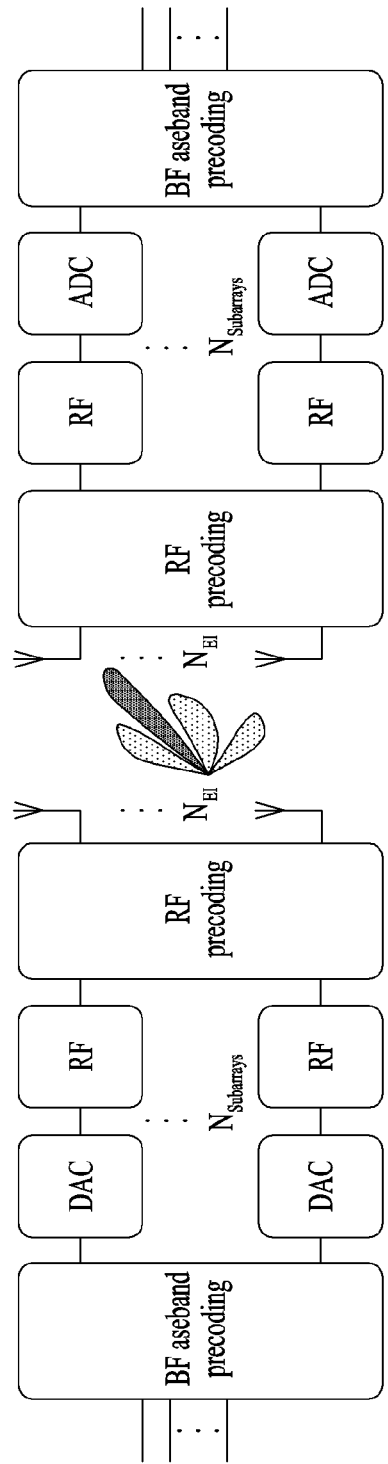
FIG. 7 is an exemplary block diagram illustrating a transmitter and a receiver for hybrid beamforming.

FIG. 7 is a block diagram illustrating an exemplary transmitter and receiver for hybrid beamforming.

In hybrid beamforming, a BS or a UE may form a narrow beam by transmitting the same signal through multiple antennas, using an appropriate phase difference and thus increasing energy only in a specific direction.

Beam Management (BM)

BM is a series of processes for acquiring and maintaining a set of BS (or transmission and reception point (TRP)) beams and/or UE beams available for DL and UL transmissions/receptions. BM may include the following processes and terminology.

Beam measurement: the BS or the UE measures the characteristics of a received beamformed signal.

Beam determination: the BS or the UE selects its Tx beam/Rx beam.

Beam sweeping: a spatial domain is covered by using a Tx beam and/or an Rx beam in a predetermined method for a predetermined time interval.

Beam report: the UE reports information about a signal beamformed based on a beam measurement.

The BM procedure may be divided into (1) a DL BM procedure using an SSB or CSI-RS and (2) a UL BM procedure using an SRS. Further, each BM procedure may include Tx beam sweeping for determining a Tx beam and Rx beam sweeping for determining an Rx beam. The following description will focus on the DL BM procedure using an SSB.

The DL BM procedure using an SSB may include (1) transmission of a beamformed SSB from the BS and (2) beam reporting of the UE. An SSB may be used for both of Tx beam sweeping and Rx beam sweeping. SSB-based Rx beam sweeping may be performed by attempting SSB reception while changing Rx beams at the UE.

SSB-based beam reporting may be configured, when CSI/beam is configured in the RRC_CONNECTED state.

The UE receives information about an SSB resource set used for BM from the BS. The SSB resource set may be configured with one or more SSBIs. For each SSB resource set, SSBI 0 to SSBI 63 may be defined.

The UE receives signals in SSB resources from the BS based on the information about the SSB resource set.

When the BS configures the UE with an SSBRI and RSRP reporting, the UE reports a (best) SSBRI and an RSRP corresponding to the SSBRI to the BS.

The BS may determine a BS Tx beam for use in DL transmission to the UE based on a beam report received from the UE.

Beam Failure Recovery (BFR) Procedure

In a beamforming system, radio link failure (RLF) may often occur due to rotation or movement of a UE or beamforming blockage. Therefore, BFR is supported to prevent frequent occurrence of RLF in NR.

For beam failure detection, the BS configures beam failure detection RSs for the UE. If the number of beam failure indications from the physical layer of the UE reaches a threshold configured by RRC signaling within a period configured by RRC signaling of the BS, the UE declares beam failure.

After the beam failure is detected, the UE triggers BFR by initiating a RACH procedure on a Pcell, and performs BFR by selecting a suitable beam (if the BS provides dedicated RACH resources for certain beams, the UE performs the RACH procedure for BFR by using the dedicated RACH resources first of all). Upon completion of the RACH procedure, the UE considers that the BFR has been completed.

Ultra-Reliable and Low Latency Communication (URLLC)

A URLLC transmission defined in NR may mean a transmission with (1) a relatively small traffic size, (2) a relatively low arrival rate, (3) an extremely low latency requirement (e.g., 0.5 ms or 1 ms), (4) a relatively short transmission duration (e.g., 2 OFDM symbols), and (5) an emergency service/message.

Pre-emption Indication

Although eMBB and URLLC services may be scheduled in non-overlapped time/frequency resources, a URLLC transmission may take place in resources scheduled for on-going eMBB traffic. To enable a UE receiving a PDSCH to determine that the PDSCH has been partially punctured due to URLLC transmission of another UE, a preemption indication may be used. The preemption indication may also be referred to as an interrupted transmission indication.

In relation to a preemption indication, the UE receives DL preemption RRC information (e.g., a DownlinkPreemption IE) from the BS by RRC signaling.

The UE receives DCI format 2_1 based on the DL preemption RRC information from the BS. For example, the UE attempts to detect a PDCCH conveying preemption indication-related DCI, DCI format 2_1 by using an int-RNTI configured by the DL preemption RRC information.

Upon detection of DCI format 2_1 for serving cell(s) configured by the DL preemption RRC information, the UE may assume that there is no transmission directed to the UE in RBs and symbols indicated by DCI format 2_1 in a set of RBs and a set of symbols during a monitoring interval shortly previous to a monitoring interval to which DCI format 2_1 belongs. For example, the UE decodes data based on signals received in the remaining resource areas, considering that a signal in a time-frequency resource indicated by a preemption indication is not a DL transmission scheduled for the UE.

Massive MTC (mMTC)

mMTC is one of 5G scenarios for supporting a hyper-connectivity service in which communication is conducted with multiple UEs at the same time. In this environment, a UE intermittently communicates at a very low transmission rate with low mobility. Accordingly, mMTC mainly seeks long operation of a UE with low cost. In this regard, MTC and narrow band-Internet of things (NB-IoT) handled in the 3GPP will be described below.

The following description is given with the appreciation that a transmission time interval (TTI) of a physical channel is a subframe. For example, a minimum time interval between the start of transmission of a physical channel and the start of transmission of the next physical channel is one subframe. However, a subframe may be replaced with a slot, a mini-slot, or multiple slots in the following description.

Machine Type Communication (MTC)

MTC is an application that does not require high throughput, applicable to machine-to-machine (M2M) or IoT. MTC is a communication technology which the 3GPP has adopted to satisfy the requirements of the IoT service.

While the following description is given mainly of features related to enhanced MTC (eMTC), the same thing is applicable to MTC, eMTC, and MTC to be applied to 5G (or NR), unless otherwise mentioned. The term MTC as used herein may be interchangeable with eMTC, LTE-M1/M2, bandwidth reduced low complexity (BL)/coverage enhanced (CE), non-BL UE (in enhanced coverage), NR MTC, enhanced BL/CE, and so on.

MTC General (1) MTC operates only in a specific system BW (or channel BW).

MTC may use a predetermined number of RBs among the RBs of a system band in the legacy LTE system or the NR system. The operating frequency BW of MTC may be defined in consideration of a frequency range and a subcarrier spacing in NR. A specific system or frequency BW in which MTC operates is referred to as an MTC narrowband (NB) or MTC subband. In NR, MTC may operate in at least one BWP or a specific band of a BWP.

While MTC is supported by a cell having a much larger BW (e.g., 10 MHz) than 1.08 MHz, a physical channel and signal transmitted/received in MTC is always limited to 1.08 MHz or 6 (LTE) RBs. For example, a narrowband is defined as 6 non-overlapped consecutive physical resource blocks (PRBs) in the frequency domain in the LTE system.

Figure 8:
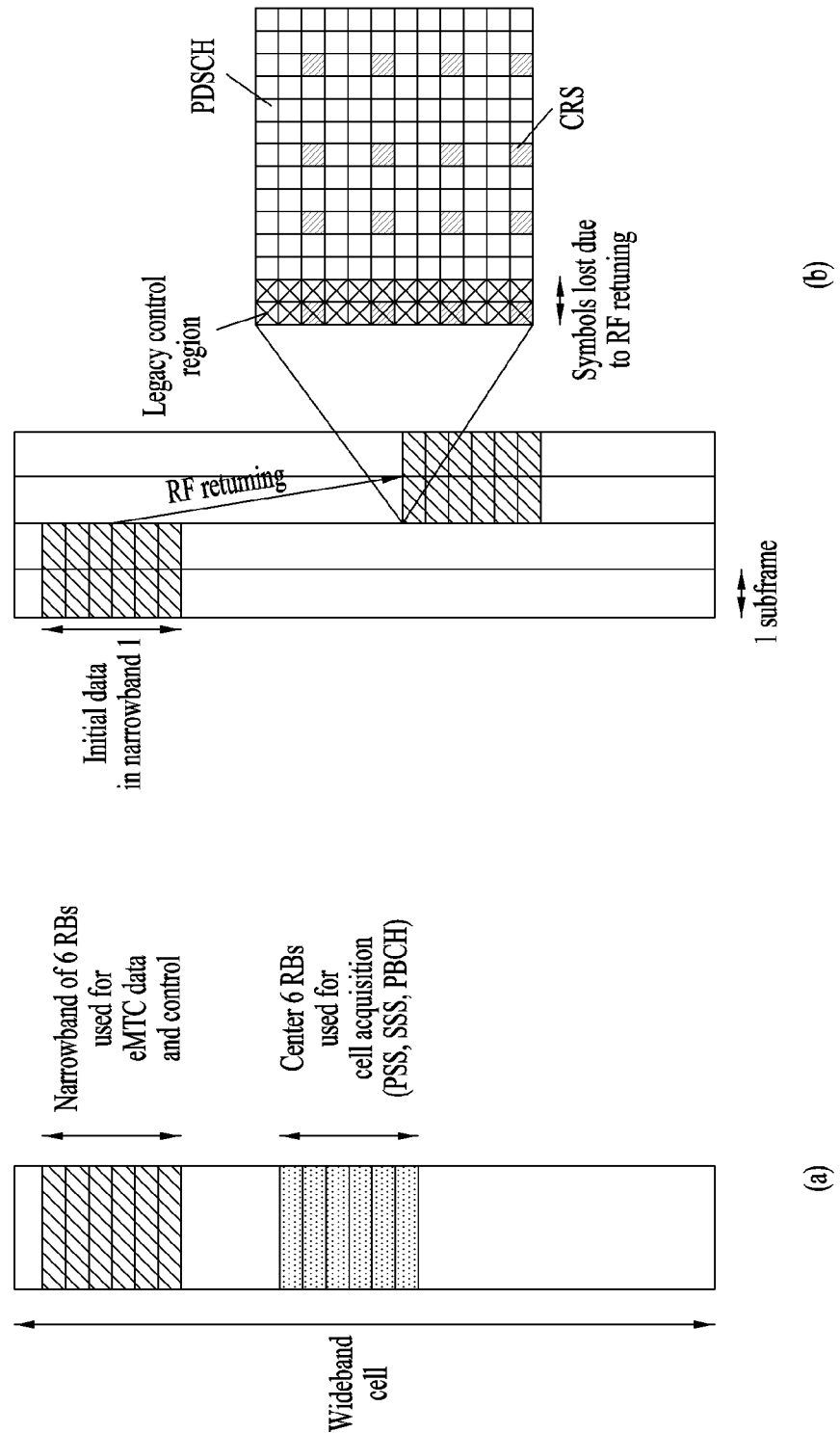
In FIG. 8, (a) is a diagram illustrating an example of narrowband operation, and (b) is a diagram illustrating an example of MTC channel repetition having RF retuning.

In MTC, some DL and UL channels are allocated restrictively within a narrowband, and one channel does not occupy a plurality of narrowbands in one time unit. FIG. 8(a) is a diagram illustrating an exemplary narrowband operation, and FIG. 8(b) is a diagram illustrating exemplary MTC channel repetition with RF retuning.

An MTC narrowband may be configured for a UE by system information or DCI transmitted by a BS.

(2) MTC does not use a channel (defined in legacy LTE or NR) which is to be distributed across the total system BW of the legacy LTE or NR. For example, because a legacy LTE PDCCH is distributed across the total system BW, the legacy PDCCH is not used in MTC. Instead, a new control channel, MTC PDCCH (MPDCCH) is used in MTC. The MPDCCH is transmitted/received in up to 6 RBs in the frequency domain. In the time domain, the MPDCCH may be transmitted in one or more OFDM symbols starting with an OFDM symbol of a starting OFDM symbol index indicated by an RRC parameter from the BS among the OFDM symbols of a subframe.

(3) In MTC, PBCH, PRACH, MPDCCH, PDSCH, PUCCH, and PUSCH may be transmitted repeatedly. The MTC repeated transmissions may make these channels decodable even when signal quality or power is very poor as in a harsh condition like basement, thereby leading to the effect of an increased cell radius and signal penetration.

MTC Operation Modes and Levels

For CE, two operation modes, CE Mode A and CE Mode B and four different CE levels are used in MTC, as listed in [Table 2] below.

TABLE 2

| Mode | Level | Description |
|---|---|---|
| Mode A | Level 1 | No repetition for PRACH |
| | Level 2 | Small Number of Repetition for PRACH |
| Mode B | Level 3 | Medium Number of Repetition for PRACH |
| | Level 4 | Large Number of Repetition for PRACH |

An MTC operation mode is determined by a BS and a CE level is determined by an MTC UE.

MTC Guard Period

The position of a narrowband used for MTC may change in each specific time unit (e.g., subframe or slot). An MTC UE may tune to different frequencies in different time units. A certain time may be required for frequency retuning and thus used as a guard period for MTC. No transmission and reception take place during the guard period.

MTC Signal Transmission/Reception Method

Apart from features inherent to MTC, an MTC signal transmission/reception procedure is similar to the procedure illustrated in FIG. 2. The operation of S201 in FIG. 2 may also be performed for MTC. A PSS/SSS used in an initial cell search operation in MTC may be the legacy LTE PSS/SSS.

After acquiring synchronization with a BS by using the PSS/SSS, an MTC UE may acquire broadcast information within a cell by receiving a PBCH signal from the BS. The broadcast information transmitted on the PBCH is an MIB. In MTC, reserved bits among the bits of the legacy LTE MIB are used to transmit scheduling information for a new system information block 1 bandwidth reduced (SIB1-BR). The scheduling information for the SIB1-BR may include information about a repetition number and a TBS for a PDSCH conveying SIB1-BR. A frequency resource assignment for the PDSCH conveying SIB-BR may be a set of 6 consecutive RBs within a narrowband. The SIB-BR is transmitted directly on the PDSCH without a control channel (e.g., PDCCH or MPDCCH) associated with SIB-BR.

After completing the initial cell search, the MTC UE may acquire more specific system information by receiving an MPDCCH and a PDSCH based on information of the MPDCCH (S202).

Subsequently, the MTC UE may perform a RACH procedure to complete connection to the BS (S203 to S206). A basic configuration for the RACH procedure of the MTC UE may be transmitted in SIB2. Further, SIB2 includes paging-related parameters. In the 3GPP system, a paging occasion (PO) means a time unit in which a UE may attempt to receive paging. Paging refers to the network's indication of the presence of data to be transmitted to the UE. The MTC UE attempts to receive an MPDCCH based on a P-RNTI in a time unit corresponding to its PO in a narrowband configured for paging, paging narrowband (PNB). When the UE succeeds in decoding the MPDCCH based on the P-RNTI, the UE may check its paging message by receiving a PDSCH scheduled by the MPDCCH. In the presence of its paging message, the UE accesses the network by performing the RACH procedure.

In MTC, signals and/or messages (Msg1, Msg2, Msg3, and Msg4) may be transmitted repeatedly in the RACH procedure, and a different repetition pattern may be set according to a CE level.

For random access, PRACH resources for different CE levels are signaled by the BS. Different PRACH resources for up to 4 respective CE levels may be signaled to the MTC UE. The MTC UE measures an RSRP using a DL RS (e.g., CRS, CSI-RS, or TRS) and determines one of the CE levels signaled by the BS based on the measurement. The UE selects one of different PRACH resources (e.g., frequency, time, and preamble resources for a PARCH) for random access based on the determined CE level and transmits a PRACH. The BS may determine the CE level of the UE based on the PRACH resources that the UE has used for the PRACH transmission. The BS may determine a CE mode for the UE based on the CE level that the UE indicates by the PRACH transmission. The BS may transmit DCI to the UE in the CE mode.

Search spaces for an RAR for the PRACH and contention resolution messages are signaled in system information by the BS.

After the above procedure, the MTC UE may receive an MPDCCH signal and/or a PDSCH signal (S207) and transmit a PUSCH signal and/or a PUCCH signal (S208) in a general UL/DL signal transmission procedure. The MTC UE may transmit UCI on a PUCCH or a PUSCH to the BS.

Once an RRC connection for the MTC UE is established, the MTC UE attempts to receive an MDCCH by monitoring an MPDCCH in a configured search space in order to acquire UL and DL data allocations.

In legacy LTE, a PDSCH is scheduled by a PDCCH. Specifically, the PDCCH may be transmitted in the first N (N=1, 2 or 3) OFDM symbols of a subframe, and the PDSCH scheduled by the PDCCH is transmitted in the same subframe.

Compared to legacy LTE, an MPDCCH and a PDSCH scheduled by the MPDCCH are transmitted/received in different subframes in MTC. For example, an MPDCCH with a last repetition in subframe #n schedules a PDSCH starting in subframe #n+2. The MPDCCH may be transmitted only once or repeatedly. A maximum repetition number of the MPDCCH is configured for the UE by RRC signaling from the BS. DCI carried on the MPDCCH provides information on how many times the MPDCCH is repeated so that the UE may determine when the PDSCH transmission starts. For example, if DCI in an MPDCCH starting in subframe #n includes information indicating that the MPDCCH is repeated 10 times, the MPDCCH may end in subframe #n+9 and the PDSCH may start in subframe #n+11. The DCI carried on the MPDCCH may include information about a repetition number for a physical data channel (e.g., PUSCH or PDSCH) scheduled by the DCI. The UE may transmit/receive the physical data channel repeatedly in the time domain according to the information about the repetition number of the physical data channel scheduled by the DCI. The PDSCH may be scheduled in the same or different narrowband as or from a narrowband in which the MPDCCH scheduling the PDSCH is transmitted. When the MPDCCH and the PDSCH are in different narrowbands, the MTC UE needs to retune to the frequency of the narrowband carrying the PDSCH before decoding the PDSCH. For UL scheduling, the same timing as in legacy LTE may be followed. For example, an MPDCCH ending in subframe #n may schedule a PUSCH transmission starting in subframe #n+4. If a physical channel is repeatedly transmitted, frequency hopping is supported between different MTC subbands by RF retuning. For example, if a PDSCH is repeatedly transmitted in 32 subframes, the PDSCH is transmitted in the first 16 subframes in a first MTC subband, and in the remaining 16 subframes in a second MTC subband. MTC may operate in half-duplex mode.

Narrowband-Internet of Things (NB-IoT)

NB-IoT may refer to a system for supporting low complexity, low power consumption, and efficient use of frequency resources by a system BW corresponding to one RB of a wireless communication system (e.g., the LTE system or the NR system). NB-IoT may operate in half-duplex mode. NB-IoT may be used as a communication scheme for implementing IoT by supporting, for example, an MTC device (or UE) in a cellular system.

In NB-IoT, each UE perceives one RB as one carrier. Therefore, an RB and a carrier as mentioned in relation to NB-IoT may be interpreted as the same meaning.

While a frame structure, physical channels, multi-carrier operations, and general signal transmission/reception in relation to NB-IoT will be described below in the context of the legacy LTE system, the description is also applicable to the next generation system (e.g., the NR system). Further, the description of NB-IoT may also be applied to MTC serving similar technical purposes (e.g., low power, low cost, and coverage enhancement).

NB-IoT Frame Structure and Physical Resources

A different NB-IoT frame structure may be configured according to a subcarrier spacing. For example, for a subcarrier spacing of 15 kHz, the NB-IoT frame structure may be identical to that of a legacy system (e.g., the LTE system). For example, a 10-ms NB-IoT frame may include 10 1-ms NB-IoT subframes each including two 0.5-ms slots. Each 0.5-ms NB-IoT slot may include 7 OFDM symbols. In another example, for a BWP or cell/carrier having a subcarrier spacing of 3.75 kHz, a 10-ms NB-IoT frame may include five 2-ms NB-IoT subframes each including 7 OFDM symbols and one guard period (GP). Further, a 2-ms NB-IoT subframe may be represented in NB-IoT slots or NB-IoT resource units (RUs). The NB-IoT frame structures are not limited to the subcarrier spacings of 15 kHz and 3.75 kHz, and NB-IoT for other subcarrier spacings (e.g., 30 kHz) may also be considered by changing time/frequency units.

NB-IoT DL physical resources may be configured based on physical resources of other wireless communication systems (e.g., the LTE system or the NR system) except that a system BW is limited to a predetermined number of RBs (e.g., one RB, that is, 180 kHz). For example, if the NB-IoT DL supports only the 15-kHz subcarrier spacing as described before, the NB-IoT DL physical resources may be configured as a resource area in which the resource grid illustrated in FIG. 1 is limited to one RB in the frequency domain.

Like the NB-IoT DL physical resources, NB-IoT UL resources may also be configured by limiting a system BW to one RB. In NB-IoT, the number of UL subcarriers $N^{UL}_{sc}$ and a slot duration $T_{slot}$ may be given as illustrated in [Table 3] below. In NB-IoT of the LTE system, the duration of one slot, $T_{slot}$ is defined by 7 SC-FDMA symbols in the time domain.

TABLE 3

| Subcarrier spacing | $N^{UL}_{sc}$ | $T_{slot}$ |
|---|---|---|
| Δf = 3.75 kHz | 48 | 6144 · $T_s$ |
| Δf = 15 kHz | 12 | 15360 · $T_s$ |

In NB-IoT, RUs are used for mapping to REs of a PUSCH for NB-IoT (referred to as an NPUSCH). An RU may be defined by $N^{UL}_{symb} * N^{UL}_{slot}$ SC-FDMA symbols in the time domain by $N^{RU}_{sc}$ consecutive subcarriers in the frequency domain. For example, $N^{RU}_{sc}$ and $N^{UL}_{symb}$ and are listed in [Table 4] for a cell/carrier having an FDD frame structure and in [Table 5] for a cell/carrier having a TDD frame structure.

TABLE 4

| NPUSCH format | Δf | $N^{RU}_{sc}$ | $N^{UL}_{slot}$ | $N^{UL}_{symb}$ |
|---|---|---|---|---|
| 1 | 3.75 kHz | 1 | 16 | 7 |
|   | 15 kHz | 1 | 16 |   |
|   |   | 3 | 8 |   |
|   |   | 6 | 4 |   |
|   |   | 12 | 2 |   |
| 2 | 3.75 kHz | 1 | 4 |   |
|   | 15 kHz | 1 | 4 |   |

TABLE 5

| NPUSCH format | Δf | Supported uplink-downlink configurations | $N^{RU}_{sc}$ | $N^{UL}_{slot}$ | $N^{UL}_{symb}$ |
|---|---|---|---|---|---|
| 1 | 3.75 kHz | 1, 4 | 1 | 16 | 7 |
|   | 15 kHz | 1, 2, 3, 4, 5 | 1 | 16 |   |
|   |   |   | 3 | 8 |   |
|   |   |   | 6 | 4 |   |
|   |   |   | 12 | 2 |   |
| 2 | 3.75 kHz | 1, 4 | 1 | 4 |   |
|   | 15 kHz | 1, 2, 3, 4, 5 | 1 | 4 |   |

NB-IoT Physical Channels

OFDMA may be adopted for NB-IoT DL based on the 15-kHz subcarrier spacing. Because OFDMA provides orthogonality between subcarriers, co-existence with other systems (e.g., the LTE system or the NR system) may be supported efficiently. The names of DL physical channels/signals of the NB-IoT system may be prefixed with "N (narrowband)" to be distinguished from their counterparts in the legacy system. For example, DL physical channels may be named NPBCH, NPDCCH, NPDSCH, and so on, and DL physical signals may be named NPSS, NSSS, narrowband reference signal (NRS), narrowband positioning reference signal (NPRS), narrowband wake up signal (NWUS), and so on. The DL channels, NPBCH, NPDCCH, NPDSCH, and so on may be repeatedly transmitted to enhance coverage in the NB-IoT system. Further, new defined DCI formats may be used in NB-IoT, such as DCI format N0, DCI format N1, and DCI format N2.

SC-FDMA may be applied with the 15-kHz or 3.75-kHz subcarrier spacing to NB-IoT UL. As described in relation to DL, the names of physical channels of the NB-IoT system may be prefixed with "N (narrowband)" to be distinguished from their counterparts in the legacy system. For example, UL channels may be named NPRACH, NPUSCH, and so on, and UL physical signals may be named NDMRS and so on. NPUSCHs may be classified into NPUSCH format 1 and NPUSCH format 2. For example, NPUSCH format 1 may be used to transmit (or deliver) an uplink shared channel (UL-SCH), and NPUSCH format 2 may be used for UCI transmission such as HARQ ACK signaling. A UL channel, NPRACH in the NB-IoT system may be repeatedly transmitted to enhance coverage. In this case, the repeated transmissions may be subjected to frequency hopping.

Multi-Carrier Operation in NB-IoT

NB-IoT may be implemented in multi-carrier mode. A multi-carrier operation may refer to using multiple carriers configured for different usages (i.e., multiple carriers of different types) in transmitting/receiving channels and/or signals between a BS and a UE.

In the multi-carrier mode in NB-IoT, carriers may be divided into anchor type carrier (i.e., anchor carrier or anchor PRB) and non-anchor type carrier (i.e., non-anchor carrier or non-anchor PRB).

The anchor carrier may refer to a carrier carrying an NPSS, an NSSS, and an NPBCH for initial access, and an NPDSCH for a system information block, N-SIB from the perspective of a BS. That is, a carrier for initial access is referred to as an anchor carrier, and the other carrier(s) is referred to as a non-anchor carrier in NB-IoT.

NB-IoT Signal Transmission/Reception Process

In NB-IoT, a signal is transmitted/received in a similar manner to the procedure illustrated in FIG. 2, except for features inherent to NB-IoT. Referring to FIG. 2, when an NB-IoT UE is powered on or enters a new cell, the NB-IoT UE may perform an initial cell search (S201). For the initial cell search, the NB-IoT UE may acquire synchronization with a BS and obtain information such as a cell ID by receiving an NPSS and an NSSS from the BS. Further, the NB-IoT UE may acquire broadcast information within a cell by receiving an NPBCH from the BS.

Upon completion of the initial cell search, the NB-IoT UE may acquire more specific system information by receiving an NPDCCH and receiving an NPDSCH corresponding to the NPDCCH (S202). In other words, the BS may transmit more specific system information to the NB-IoT UE which has completed the initial call search by transmitting an NPDCCH and an NPDSCH corresponding to the NPDCCH.

The NB-IoT UE may then perform a RACH procedure to complete a connection setup with the BS (S203 to S206). For this purpose, the NB-IoT UE may transmit a preamble on an NPRACH to the BS (S203). As described before, it may be configured that the NPRACH is repeatedly transmitted based on frequency hopping, for coverage enhancement. In other words, the BS may (repeatedly) receive the preamble on the NPRACH from the NB-IoT UE. The NB-IoT UE may then receive an NPDCCH, and a RAR in response to the preamble on an NPDSCH corresponding to the NPDCCH from the BS (S204). In other words, the BS may transmit the NPDCCH, and the RAR in response to the preamble on the NPDSCH corresponding to the NPDCCH to the NB-IoT UE. Subsequently, the NB-IoT UE may transmit an NPUSCH to the BS, using scheduling information in the RAR (S205) and perform a contention resolution procedure by receiving an NPDCCH and an NPDSCH corresponding to the NPDCCH (S206).

After the above process, the NB-IoT UE may perform an NPDCCH/NPDSCH reception (S207) and an NPUSCH transmission (S208) in a general UL/DL signal transmission procedure. In other words, after the above process, the BS may perform an NPDCCH/NPDSCH transmission and an NPUSCH reception with the NB-IoT UE in the general UL/DL signal transmission procedure.

In NB-IoT, the NPBCH, the NPDCCH, and the NPDSCH may be transmitted repeatedly, for coverage enhancement. A UL-SCH (i.e., general UL data) and UCI may be delivered on the PUSCH in NB-IoT. It may be configured that the UL-SCH and the UCI are transmitted in different NPUSCH formats (e.g., NPUSCH format 1 and NPUSCH format 2).

In NB-IoT, UCI may generally be transmitted on an NPUSCH. Further, the UE may transmit the NPUSCH periodically, aperiodically, or semi-persistently according to request/indication of the network (e.g., BS).

Wireless Communication Apparatus

Figure 9:
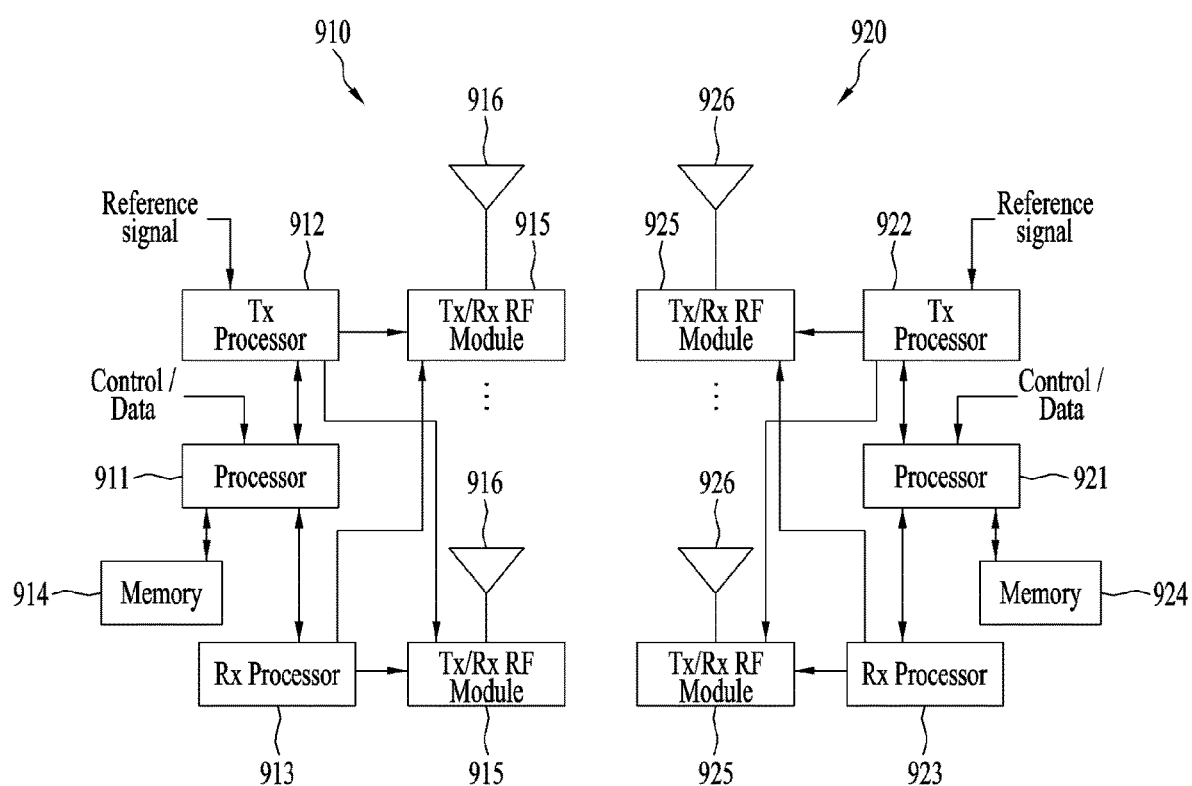
FIG. 9 is an exemplary block diagram illustrating a wireless communication system to which the methods proposed herein may be applied.

FIG. 9 is a block diagram of an exemplary wireless communication system to which proposed methods of the present disclosure are applicable.

Referring to FIG. 9, the wireless communication system includes a first communication device 910 and/or a second communication device 920. The phrases "A and/or B" and "at least one of A or B" are may be interpreted as the same meaning. The first communication device 910 may be a BS, and the second communication device 920 may be a UE (or the first communication device 910 may be a UE, and the second communication device 920 may be a BS).

Each of the first communication device 910 and the second communication device 920 includes a processor 911 or 921, a memory 914 or 924, one or more Tx/Rx RF modules 915 or 925, a Tx processor 912 or 922, an Rx processor 913 or 923, and antennas 916 or 926. A Tx/Rx module may also be called a transceiver. The processor performs the afore-described functions, processes, and/or methods. More specifically, on DL (communication from the first communication device 910 to the second communication device 920), a higher-layer packet from a core network is provided to the processor 911. The processor 911 implements Layer 2 (i.e., L2) functionalities. On DL, the processor 911 is responsible for multiplexing between a logical channel and a transport channel, provisioning of a radio resource assignment to the second communication device 920, and signaling to the second communication device 920. The Tx processor 912 executes various signal processing functions of L1 (i.e., the physical layer). The signal processing functions facilitate forward error correction (FEC) of the second communication device 920, including coding and interleaving. An encoded and interleaved signal is modulated to complex-valued modulation symbols after scrambling and modulation. For the modulation, BPSK, QPSK, 16 QAM, 64 QAM, 246 QAM, and so on are available according to channels. The complex-valued modulation symbols (hereinafter, referred to as modulation symbols) are divided into parallel streams. Each stream is mapped to OFDM subcarriers and multiplexed with an RS in the time and/or frequency domain. A physical channel is generated to carry a time-domain OFDM symbol stream by subjecting the mapped signals to IFFT. The OFDM symbol stream is spatially precoded to multiple spatial streams. Each spatial stream may be provided to a different antenna 916 through an individual Tx/Rx module (or transceiver) 915. Each Tx/Rx module 915 may upconvert the frequency of each spatial stream to an RF carrier, for transmission. In the second communication device 920, each Tx/Rx module (or transceiver) 925 receives a signal of the RF carrier through each antenna 926. Each Tx/Rx module 925 recovers the signal of the RF carrier to a baseband signal and provides the baseband signal to the Rx processor 923. The Rx processor 923 executes various signal processing functions of L1 (i.e., the physical layer). The Rx processor 923 may perform spatial processing on information to recover any spatial stream directed to the second communication device 920. If multiple spatial streams are directed to the second communication device 920, multiple Rx processors may combine the multiple spatial streams into a single OFDMA symbol stream. The Rx processor 923 converts an OFDM symbol stream being a time-domain signal to a frequency-domain signal by FFT. The frequency-domain signal includes an individual OFDM symbol stream on each subcarrier of an OFDM signal. Modulation symbols and an RS on each subcarrier are recovered and demodulated by determining most likely signal constellation points transmitted by the first communication device 910. These soft decisions may be based on channel estimates. The soft decisions are decoded and deinterleaved to recover the original data and control signal transmitted on physical channels by the first communication device 910. The data and control signal are provided to the processor 921.

On UL (communication from the second communication device 920 to the first communication device 910), the first communication device 910 operates in a similar manner as described in relation to the receiver function of the second communication device 920. Each Tx/Rx module 925 receives a signal through an antenna 926. Each Tx/Rx module 925 provides an RF carrier and information to the Rx processor 923. The processor 921 may be related to the memory 924 storing a program code and data. The memory 924 may be referred to as a computer-readable medium.

Artificial Intelligence (AI)

Artificial intelligence is a field of studying AI or methodologies for creating AI, and machine learning is a field of defining various issues dealt with in the AI field and studying methodologies for addressing the various issues. Machine learning is defined as an algorithm that increases the performance of a certain operation through steady experiences for the operation.

An artificial neural network (ANN) is a model used in machine learning and may generically refer to a model having a problem-solving ability, which is composed of artificial neurons (nodes) forming a network via synaptic connections. The ANN may be defined by a connection pattern between neurons in different layers, a learning process for updating model parameters, and an activation function for generating an output value.

The ANN may include an input layer, an output layer, and optionally, one or more hidden layers. Each layer includes one or more neurons, and the ANN may include a synapse that links between neurons. In the ANN, each neuron may output the function value of the activation function, for the input of signals, weights, and deflections through the synapse.

Model parameters refer to parameters determined through learning and include a weight value of a synaptic connection and deflection of neurons. A hyperparameter means a parameter to be set in the machine learning algorithm before learning, and includes a learning rate, a repetition number, a mini batch size, and an initialization function.

The purpose of learning of the ANN may be to determine model parameters that minimize a loss function. The loss function may be used as an index to determine optimal model parameters in the learning process of the ANN.

Machine learning may be classified into supervised learning, unsupervised learning, and reinforcement learning according to learning methods.

Supervised learning may be a method of training an ANN in a state in which a label for training data is given, and the label may mean a correct answer (or result value) that the ANN should infer with respect to the input of training data to the ANN. Unsupervised learning may be a method of training an ANN in a state in which a label for training data is not given. Reinforcement learning may be a learning method in which an agent defined in a certain environment is trained to select a behavior or a behavior sequence that maximizes cumulative compensation in each state.

Machine learning, which is implemented by a deep neural network (DNN) including a plurality of hidden layers among ANNs, is also referred to as deep learning, and deep learning is part of machine learning. The following description is given with the appreciation that machine learning includes deep learning.

<Robot>

A robot may refer to a machine that automatically processes or executes a given task by its own capabilities. Particularly, a robot equipped with a function of recognizing an environment and performing an operation based on its decision may be referred to as an intelligent robot.

Robots may be classified into industrial robots, medical robots, consumer robots, military robots, and so on according to their usages or application fields.

A robot may be provided with a driving unit including an actuator or a motor, and thus perform various physical operations such as moving robot joints. Further, a movable robot may include a wheel, a brake, a propeller, and the like in a driving unit, and thus travel on the ground or fly in the air through the driving unit.

<Self-Driving>

Self-driving refers to autonomous driving, and a self-driving vehicle refers to a vehicle that travels with no user manipulation or minimum user manipulation.

For example, self-driving may include a technology of maintaining a lane while driving, a technology of automatically adjusting a speed, such as adaptive cruise control, a technology of automatically traveling along a predetermined route, and a technology of automatically setting a route and traveling along the route when a destination is set.

Vehicles may include a vehicle having only an internal combustion engine, a hybrid vehicle having both an internal combustion engine and an electric motor, and an electric vehicle having only an electric motor, and may include not only an automobile but also a train, a motorcycle, and the like.

Herein, a self-driving vehicle may be regarded as a robot having a self-driving function.

<eXtended Reality (XR)>

Extended reality is a generical term covering virtual reality (VR), augmented reality (AR), and mixed reality (MR). VR provides a real-world object and background only as a computer graphic (CG) image, AR provides a virtual CG image on a real object image, and MR is a computer graphic technology that mixes and combines virtual objects into the real world.

MR is similar to AR in that the real object and the virtual object are shown together. However, in AR, the virtual object is used as a complement to the real object, whereas in MR, the virtual object and the real object are handled equally.

XR may be applied to a head-mounted display (HMD), a head-up display (HUD), a portable phone, a tablet PC, a laptop computer, a desktop computer, a TV, a digital signage, and so on. A device to which XR is applied may be referred to as an XR device.

Figure 10:
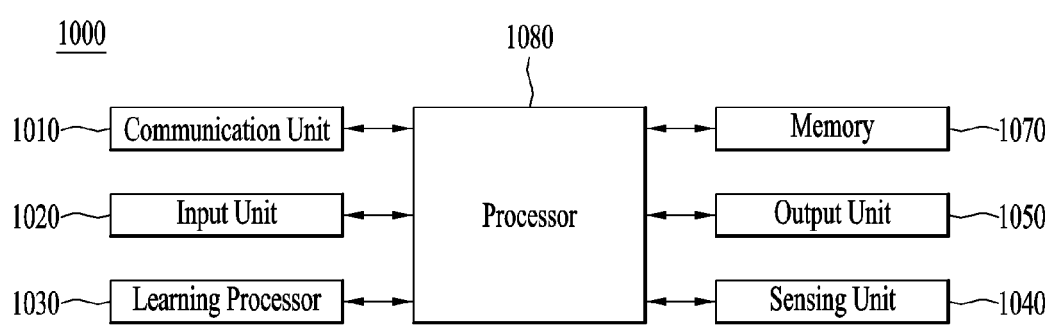
FIG. 10 illustrates an AI device 1000 according to embodiments.

FIG. 10 illustrates an AI device 1000 according to an embodiment of the present disclosure.

The AI device 1000 illustrated in FIG. 10 may be configured as a stationary device or a mobile device, such as a TV, a projector, a portable phone, a smartphone, a desktop computer, a laptop computer, a digital broadcasting terminal, a personal digital assistant (PDA), a portable multimedia player (PMP), a navigation device, a tablet PC, a wearable device, a set-top box (STB), a digital multimedia broadcasting (DMB) receiver, a radio, a washing machine, a refrigerator, a digital signage, a robot, or a vehicle.

Referring to FIG. 10, the AI device 1000 may include a communication unit 1010, an input unit 1020, a learning processor 1030, a sensing unit 1040, an output unit 1050, a memory 1070, and a processor 1080.

The communication unit 1010 may transmit and receive data to and from an external device such as another AI device or an AI server by wired or wireless communication. For example, the communication unit 1010 may transmit and receive sensor information, a user input, a learning model, and a control signal to and from the external device.

Communication schemes used by the communication unit 1010 include global system for mobile communication (GSM), CDMA, LTE, 5G, wireless local area network (WLAN), wireless fidelity (Wi-Fi), Bluetooth™, radio frequency identification (RFID), infrared data association (IrDA), ZigBee, near field communication (NFC), and so on. Particularly, the 5G technology described before with reference to FIGS. 1 to 9 may also be applied.

The input unit 1020 may acquire various types of data. The input unit 1020 may include a camera for inputting a video signal, a microphone for receiving an audio signal, and a user input unit for receiving information from a user. The camera or the microphone may be treated as a sensor, and thus a signal acquired from the camera or the microphone may be referred to as sensing data or sensor information.

The input unit 1020 may acquire training data for model training and input data to be used to acquire an output by using a learning model. The input unit 1020 may acquire raw input data. In this case, the processor 1080 or the learning processor 1030 may extract an input feature by preprocessing the input data.

The learning processor 1030 may train a model composed of an ANN by using training data. The trained ANN may be referred to as a learning model. The learning model may be used to infer a result value for new input data, not training data, and the inferred value may be used as a basis for determination to perform a certain operation.

The learning processor 1030 may perform AI processing together with a learning processor of an AI server.

The learning processor 1030 may include a memory integrated or implemented in the AI device 1000. Alternatively, the learning processor 1030 may be implemented by using the memory 1070, an external memory directly connected to the AI device 1000, or a memory maintained in an external device.

The sensing unit 1040 may acquire at least one of internal information about the AI device 1000, ambient environment information about the AI device 1000, and user information by using various sensors.

The sensors included in the sensing unit 1040 may include a proximity sensor, an illumination sensor, an accelerator sensor, a magnetic sensor, a gyro sensor, an inertial sensor, a red, green, blue (RGB) sensor, an IR sensor, a fingerprint recognition sensor, an ultrasonic sensor, an optical sensor, a microphone, a light detection and ranging (LiDAR), and a radar.

The output unit 1050 may generate a visual, auditory, or haptic output.

Accordingly, the output unit 1050 may include a display unit for outputting visual information, a speaker for outputting auditory information, and a haptic module for outputting haptic information.

The memory 1070 may store data that supports various functions of the AI device 1000. For example, the memory 1070 may store input data acquired by the input unit 1020, training data, a learning model, a learning history, and so on.

The processor 1080 may determine at least one executable operation of the AI device 100 based on information determined or generated by a data analysis algorithm or a machine learning algorithm. The processor 1080 may control the components of the AI device 1000 to execute the determined operation.

To this end, the processor 1080 may request, search, receive, or utilize data of the learning processor 1030 or the memory 1070. The processor 1080 may control the components of the AI device 1000 to execute a predicted operation or an operation determined to be desirable among the at least one executable operation.

When the determined operation needs to be performed in conjunction with an external device, the processor 1080 may generate a control signal for controlling the external device and transmit the generated control signal to the external device.

The processor 1080 may acquire intention information with respect to a user input and determine the user's requirements based on the acquired intention information.

The processor 1080 may acquire the intention information corresponding to the user input by using at least one of a speech to text (STT) engine for converting a speech input into a text string or a natural language processing (NLP) engine for acquiring intention information of a natural language.

At least one of the STT engine or the NLP engine may be configured as an ANN, at least part of which is trained according to the machine learning algorithm. At least one of the STT engine or the NLP engine may be trained by the learning processor, a learning processor of the AI server, or distributed processing of the learning processors. For reference, specific components of the AI server are illustrated in FIG. 11.

The processor 1080 may collect history information including the operation contents of the AI device 1000 or the user's feedback on the operation and may store the collected history information in the memory 1070 or the learning processor 1030 or transmit the collected history information to the external device such as the AI server. The collected history information may be used to update the learning model.

The processor 1080 may control at least a part of the components of AI device 1000 so as to drive an application program stored in the memory 1070. Furthermore, the processor 1080 may operate two or more of the components included in the AI device 1000 in combination so as to drive the application program.

Figure 11:
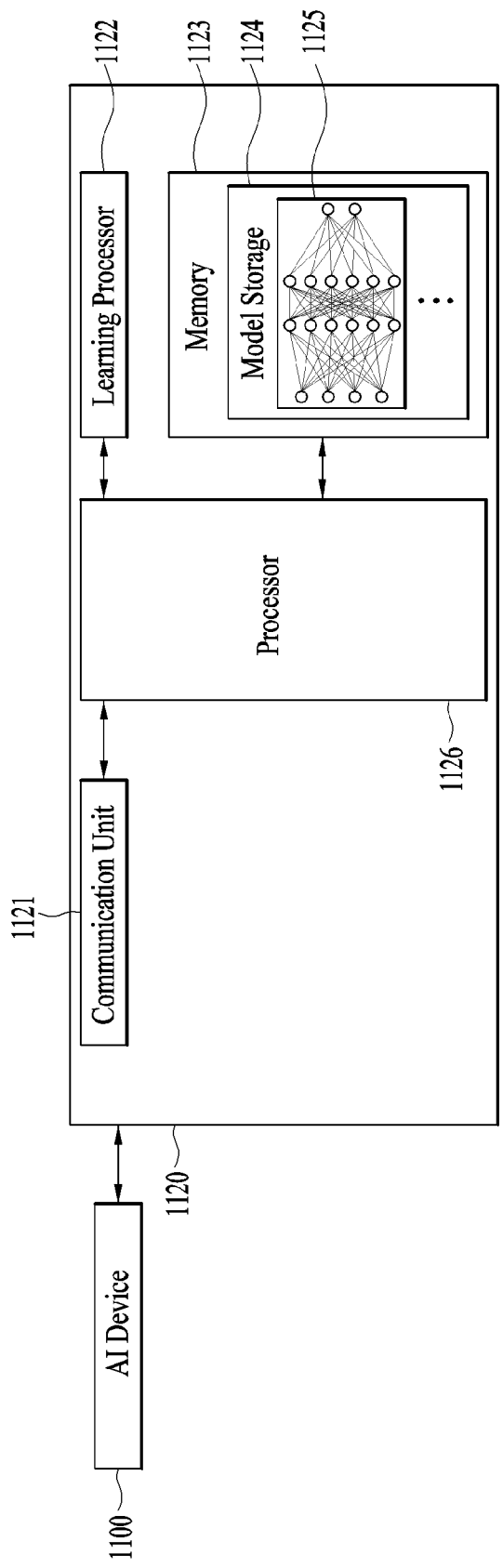
FIG. 11 illustrates an AI server 1120 according to embodiments.

FIG. 11 illustrates an AI server 1120 according to an embodiment of the present disclosure.

Referring to FIG. 11, the AI server 1120 may refer to a device that trains an ANN by a machine learning algorithm or uses a trained ANN. The AI server 1120 may include a plurality of servers to perform distributed processing, or may be defined as a 5G network. The AI server 1120 may be included as part of the AI device 1100, and perform at least part of the AI processing.

The AI server 1120 may include a communication unit 1121, a memory 1123, a learning processor 1122, a processor 1126, and so on.

The communication unit 1121 may transmit and receive data to and from an external device such as the AI device 1100.

The memory 1123 may include a model storage 1124. The model storage 1124 may store a model (or an ANN 1125) which has been trained or is being trained through the learning processor 1122.

The learning processor 1122 may train the ANN 1125 by training data. The learning model may be used, while being loaded on the AI server 1120 of the ANN, or on an external device such as the AI device 1110.

The learning model may be implemented in hardware, software, or a combination of hardware and software. If all or part of the learning model is implemented in software, one or more instructions of the learning model may be stored in the memory 1123.

The processor 1126 may infer a result value for new input data by using the learning model and may generate a response or a control command based on the inferred result value.

Figure 12:
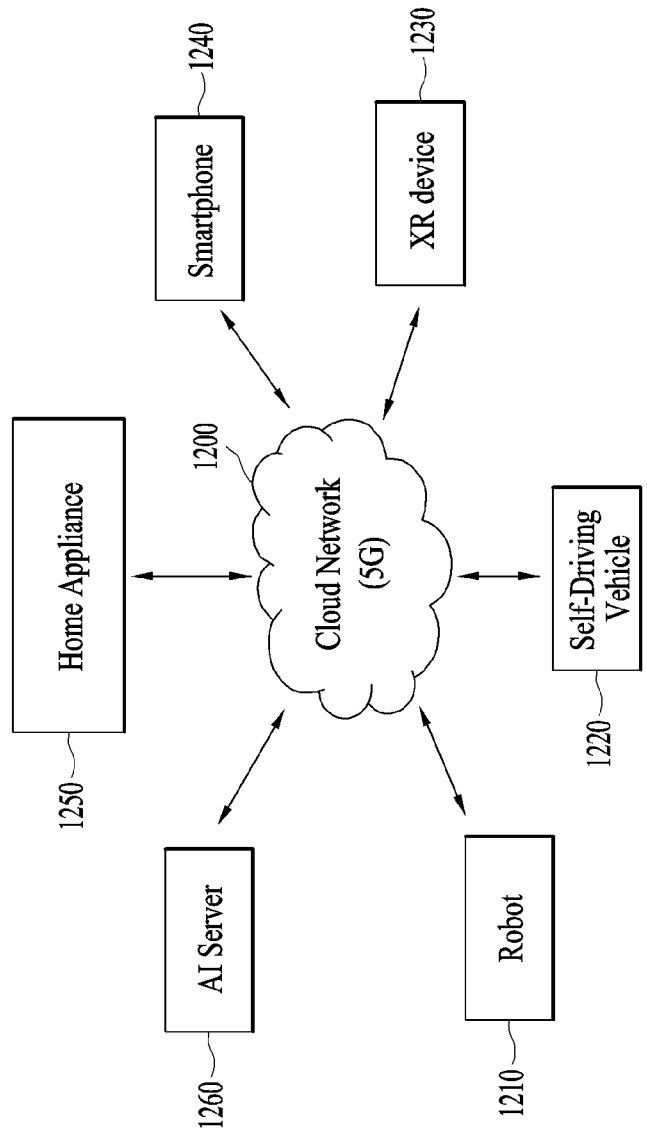
FIG. 12 illustrates an AI system according to embodiments.

FIG. 12 illustrates an AI system according to an embodiment of the present disclosure.

Referring to FIG. 12, in the AI system, at least one of an AI server 1260, a robot 1210, a self-driving vehicle 1220, an XR device 1230, a smartphone 1240, or a home appliance 1250 is connected to a cloud network 1200. The robot 1210, the self-driving vehicle 1220, the XR device 1230, the smartphone 1240, or the home appliance 1250, to which AI is applied, may be referred to as an AI device.

The cloud network 1200 may refer to a network that forms part of cloud computing infrastructure or exists in the cloud computing infrastructure. The cloud network 1200 may be configured by using a 3G network, a 4G or LTE network, or a 5G network.

That is, the devices 1210 to 1260 included in the AI system may be interconnected via the cloud network 1200. In particular, each of the devices 1210 to 1260 may communicate with each other directly or through a BS.

The AI server 1260 may include a server that performs AI processing and a server that performs computation on big data.

The AI server 1260 may be connected to at least one of the AI devices included in the AI system, that is, at least one of the robot 1210, the self-driving vehicle 1220, the XR device 1230, the smartphone 1240, or the home appliance 1250 via the cloud network 1200, and may assist at least part of AI processing of the connected AI devices 1210 to 1250.

The AI server 1260 may train the ANN according to the machine learning algorithm on behalf of the AI devices 1210 to 1250, and may directly store the learning model or transmit the learning model to the AI devices 1210 to 1250.

The AI server 1260 may receive input data from the AI devices 1210 to 1250, infer a result value for received input data by using the learning model, generate a response or a control command based on the inferred result value, and transmit the response or the control command to the AI devices 1210 to 1250.

Alternatively, the AI devices 1210 to 1250 may infer the result value for the input data by directly using the learning model, and generate the response or the control command based on the inference result.

Hereinafter, various embodiments of the AI devices 1210 to 1250 to which the above-described technology is applied will be described. The AI devices 1210 to 1250 illustrated in FIG. 12 may be regarded as a specific embodiment of the AI device 1000 illustrated in FIG. 10.

<AI+XR>

The XR device 1230, to which AI is applied, may be configured as a HIVID, a HUD provided in a vehicle, a TV, a portable phone, a smartphone, a computer, a wearable device, a home appliance, a digital signage, a vehicle, a fixed robot, a mobile robot, or the like.

The XR device 1230 may acquire information about a surrounding space or a real object by analyzing 3D point cloud data or image data acquired from various sensors or an external device and thus generating position data and attribute data for the 3D points, and may render an XR object to be output. For example, the XR device 1230 may output an XR object including additional information about a recognized object in correspondence with the recognized object.

The XR device 1230 may perform the above-described operations by using the learning model composed of at least one ANN. For example, the XR device 1230 may recognize a real object from 3D point cloud data or image data by using the learning model, and may provide information corresponding to the recognized real object. The learning model may be trained directly by the XR device 1230 or by the external device such as the AI server 1260.

While the XR device 1230 may operate by generating a result by directly using the learning model, the XR device 1230 may operate by transmitting sensor information to the external device such as the AI server 1260 and receiving the result.

<AI+Robot+XR>

The robot 1210, to which AI and XR are applied, may be implemented as a guide robot, a delivery robot, a cleaning robot, a wearable robot, an entertainment robot, a pet robot, an unmanned flying robot, a drone, or the like.

The robot 1210, to which XR is applied, may refer to a robot to be controlled/interact within an XR image. In this case, the robot 1210 may be distinguished from the XR device 1230 and interwork with the XR device 1230.

When the robot 1210 to be controlled/interact within an XR image acquires sensor information from sensors each including a camera, the robot 1210 or the XR device 1230 may generate an XR image based on the sensor information, and the XR device 1230 may output the generated XR image. The robot 1210 may operate based on the control signal received through the XR device 1230 or based on the user's interaction.

For example, the user may check an XR image corresponding to a view of the robot 1210 interworking remotely through an external device such as the XR device 1210, adjust a self-driving route of the robot 1210 through interaction, control the operation or driving of the robot 1210, or check information about an ambient object around the robot 1210.

<AI+Self-Driving+XR>

The self-driving vehicle 1220, to which AI and XR are applied, may be implemented as a mobile robot, a vehicle, an unmanned flying vehicle, or the like.

The self-driving driving vehicle 1220, to which XR is applied, may refer to a self-driving vehicle provided with a means for providing an XR image or a self-driving vehicle to be controlled/interact within an XR image. Particularly, the self-driving vehicle 1220 to be controlled/interact within an XR image may be distinguished from the XR device 1230 and interwork with the XR device 1230.

The self-driving vehicle 1220 provided with the means for providing an XR image may acquire sensor information from the sensors each including a camera and output the generated XR image based on the acquired sensor information. For example, the self-driving vehicle 1220 may include an HUD to output an XR image, thereby providing a passenger with an XR object corresponding to a real object or an object on the screen.

When the XR object is output to the HUD, at least part of the XR object may be output to be overlaid on an actual object to which the passenger's gaze is directed. When the XR object is output to a display provided in the self-driving vehicle 1220, at least part of the XR object may be output to be overlaid on the object within the screen. For example, the self-driving vehicle 1220 may output XR objects corresponding to objects such as a lane, another vehicle, a traffic light, a traffic sign, a two-wheeled vehicle, a pedestrian, a building, and so on.

When the self-driving vehicle 1220 to be controlled/interact within an XR image acquires sensor information from the sensors each including a camera, the self-driving vehicle 1220 or the XR device 1230 may generate the XR image based on the sensor information, and the XR device 1230 may output the generated XR image. The self-driving vehicle 1220 may operate based on a control signal received through an external device such as the XR device 1230 or based on the user's interaction.

VR, AR, and MR technologies of the present disclosure are applicable to various devices, particularly, for example, a HIVID, a HUD attached to a vehicle, a portable phone, a tablet PC, a laptop computer, a desktop computer, a TV, and a signage. The VR, AR, and MR technologies may also be applicable to a device equipped with a flexible or rollable display.

The above-described VR, AR, and MR technologies may be implemented based on CG and distinguished by the ratios of a CG image in an image viewed by the user.

That is, VR provides a real object or background only in a CG image, whereas AR overlays a virtual CG image on an image of a real object.

MR is similar to AR in that virtual objects are mixed and combined with a real world. However, a real object and a virtual object created as a CG image are distinctive from each other and the virtual object is used to complement the real object in AR, whereas a virtual object and a real object are handled equally in MR. More specifically, for example, a hologram service is an MR representation.

These days, VR, AR, and MR are collectively called XR without distinction among them. Therefore, embodiments of the present disclosure are applicable to all of VR, AR, MR, and XR.

For example, wired/wireless communication, input interfacing, output interfacing, and computing devices are available as hardware (HW)-related element techniques applied to VR, AR, MR, and XR. Further, tracking and matching, speech recognition, interaction and user interfacing, location-based service, search, and AI are available as software (SW)-related element techniques.

Particularly, the embodiments of the present disclosure are intended to address at least one of the issues of communication with another device, efficient memory use, data throughput decrease caused by inconvenient user experience/user interface (UX/UI), video, sound, motion sickness, or other issues.

Figure 13:
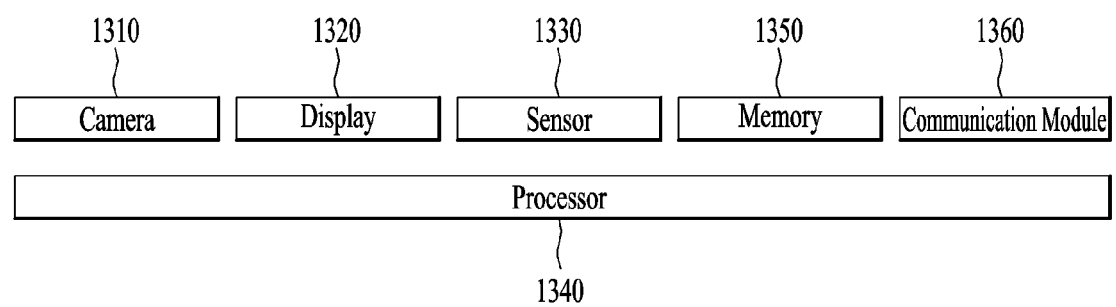
FIG. 13 is a block diagram of an XR device according to embodiments.

FIG. 13 is a block diagram illustrating an XR device according to embodiments of the present disclosure. The XR device 1300 includes a camera 1310, a display 1320, a sensor 1330, a processor 1340, a memory 1350, and a communication module 1360. Obviously, one or more of the modules may be deleted or modified, and one or more modules may be added to the modules, when needed, without departing from the scope and spirit of the present disclosure.

The communication module 1360 may communicate with an external device or a server, wiredly or wirelessly. The communication module 1360 may use, for example, Wi-Fi, Bluetooth, or the like, for short-range wireless communication, and for example, a 3GPP communication standard for long-range wireless communication. LTE is a technology beyond 3GPP TS 36.xxx Release 8. Specifically, LTE beyond 3GPP TS 36.xxx Release 10 is referred to as LTE-A, and LTE beyond 3GPP TS 36.xxx Release 13 is referred to as LTE-A pro. 3GPP 5G refers to a technology beyond TS 36.xxx Release 15 and a technology beyond TS 38.XXX Release 15. Specifically, the technology beyond TS 38.xxx Release 15 is referred to as 3GPP NR, and the technology beyond TS 36.xxx Release 15 is referred to as enhanced LTE. "xxx" represents the number of a technical specification. LTE/NR may be collectively referred to as a 3GPP system.

The camera 1310 may capture an ambient environment of the XR device 1300 and convert the captured image to an electric signal. The image, which has been captured and converted to an electric signal by the camera 1310, may be stored in the memory 1350 and then displayed on the display 1320 through the processor 1340. Further, the image may be displayed on the display 1320 by the processor 1340, without being stored in the memory 1350. Further, the camera 110 may have a field of view (FoV). The FoV is, for example, an area in which a real object around the camera 1310 may be detected. The camera 1310 may detect only a real object within the FoV. When a real object is located within the FoV of the camera 1310, the XR device 1300 may display an AR object corresponding to the real object. Further, the camera 1310 may detect an angle between the camera 1310 and the real object.

The sensor 1330 may include at least one sensor. For example, the sensor 1330 includes a sensing means such as a gravity sensor, a geomagnetic sensor, a motion sensor, a gyro sensor, an accelerator sensor, an inclination sensor, a brightness sensor, an altitude sensor, an olfactory sensor, a temperature sensor, a depth sensor, a pressure sensor, a bending sensor, an audio sensor, a video sensor, a global positioning system (GPS) sensor, and a touch sensor. Further, although the display 1320 may be of a fixed type, the display 1320 may be configured as a liquid crystal display (LCD), an organic light emitting diode (OLED) display, an electroluminescent display (ELD), or a micro LED (M-LED) display, to have flexibility. Herein, the sensor 1330 is designed to detect a bending degree of the display 1320 configured as the afore-described LCD, OLED display, ELD, or M-LED display.

The memory 1350 is equipped with a function of storing all or a part of result values obtained by wired/wireless communication with an external device or a service as well as a function of storing an image captured by the camera 1310. Particularly, considering the trend toward increased communication data traffic (e.g., in a 5G communication environment), efficient memory management is required. In this regard, a description will be given below with reference to FIG. 14.

Figure 14:
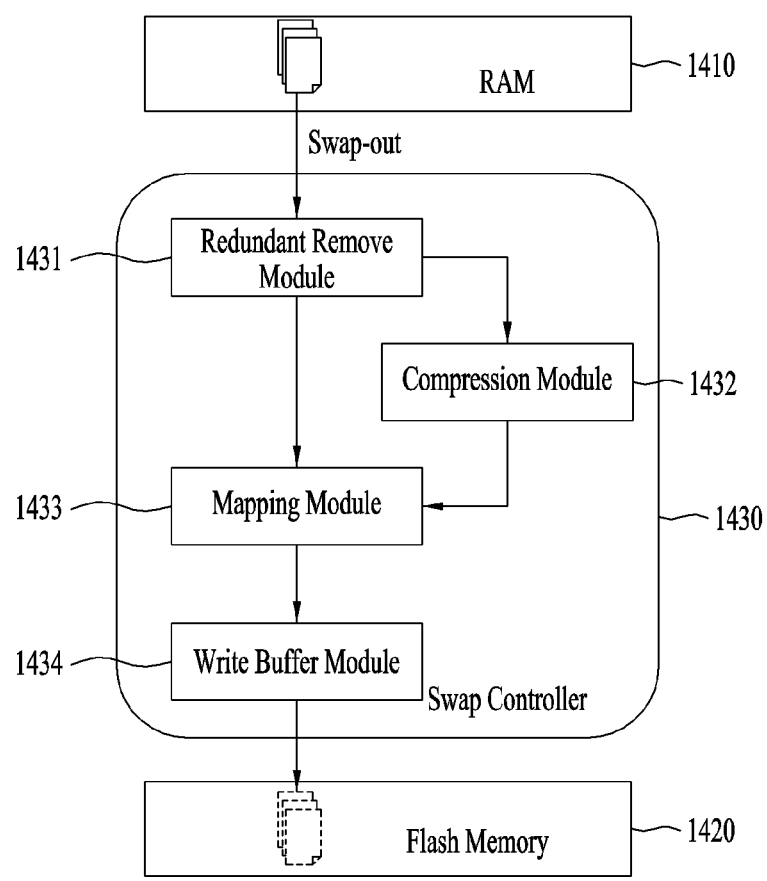
FIG. 14 is a block diagram illustrating the memory of FIG. 13 in more detail.

FIG. 14 is a detailed block diagram of the memory 1350 illustrated in FIG. 13. With reference to FIG. 14, a swap-out process between a random access memory (RAM) and a flash memory according to an embodiment of the present disclosure will be described.

When swapping out AR/VR page data from a RAM 1410 to a flash memory 1420, a controller 1430 may swap out only one of two or more AR/VR page data of the same contents among AR/VR page data to be swapped out to the flash memory 1420.

That is, the controller 1430 may calculate an identifier (e.g., a hash function) that identifies each of the contents of the AR/VR page data to be swapped out, and determine that two or more AR/VR page data having the same identifier among the calculated identifiers contain the same contents. Accordingly, the problem that the lifetime of an AR/VR device including the flash memory 1420 as well as the lifetime of the flash memory 1420 is reduced because unnecessary AR/VR page data is stored in the flash memory 1420 may be overcome.

The operations of the controller 1430 may be implemented in software or hardware without departing from the scope of the present disclosure. More specifically, the memory illustrated in FIG. 14 is included in a HMD, a vehicle, a portable phone, a tablet PC, a laptop computer, a desktop computer, a TV, a signage, or the like, and executes a swap function.

A device according to embodiments of the present disclosure may process 3D point cloud data to provide various services such as VR, AR, MR, XR, and self-driving to a user.

A sensor collecting 3D point cloud data may be any of, for example, a LiDAR, a red, green, blue depth (RGB-D), and a 3D laser scanner. The sensor may be mounted inside or outside of a HIVID, a vehicle, a portable phone, a tablet PC, a laptop computer, a desktop computer, a TV, a signage, or the like.

Figure 15:
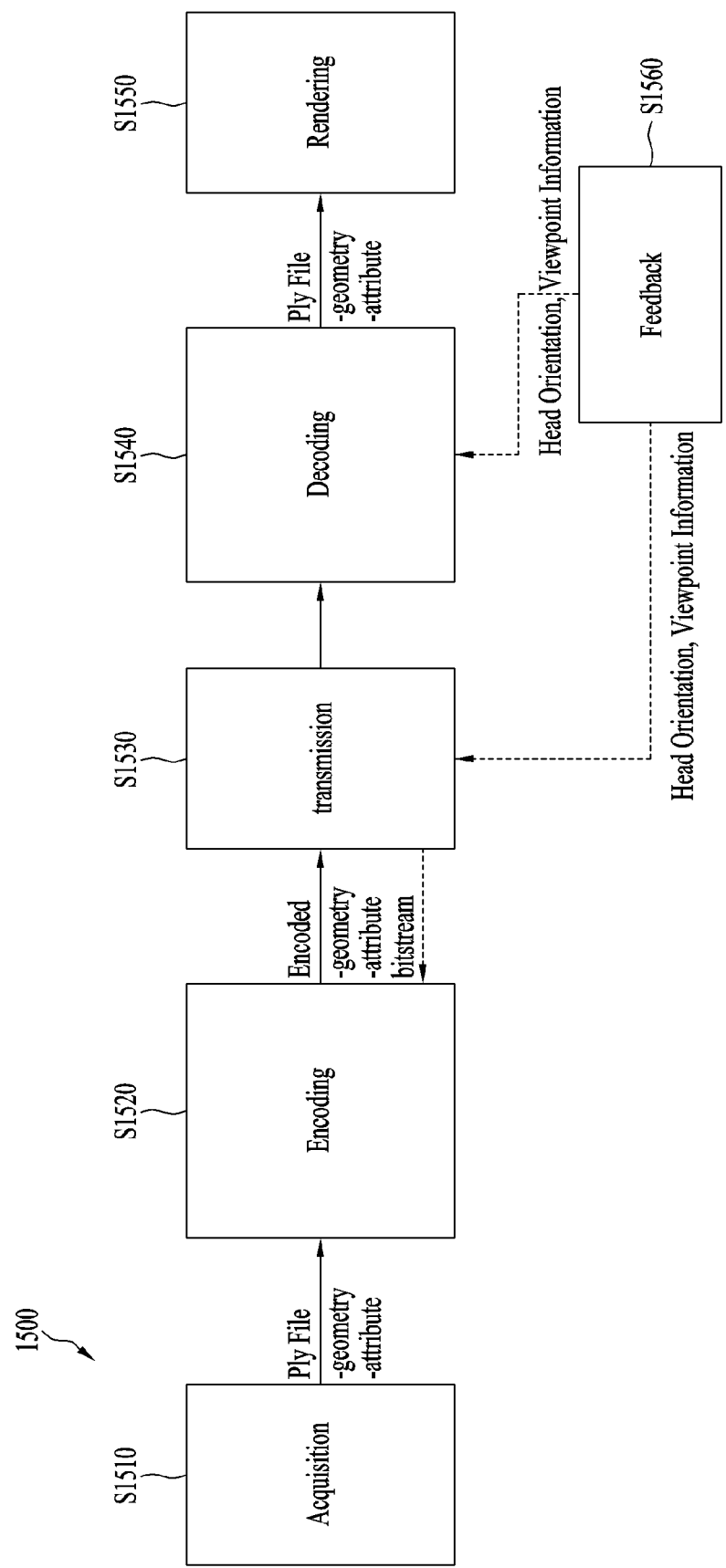
FIG. 15 illustrates a point cloud data processing system.

FIG. 15 illustrates a point cloud data processing system.

Referring to FIG. 15, a point cloud processing system 1500 includes a transmission device which acquires, encodes, and transmits point cloud data, and a reception device which acquires point cloud data by receiving and decoding video data. As illustrated in FIG. 15, point cloud data according to embodiments of the present disclosure may be acquired by capturing, synthesizing, or generating the point cloud data (S1510). During the acquisition, data (e.g., a polygon file format or standard triangle format (PLY) file) of 3D positions (x, y, z)/attributes (color, reflectance, transparency, and so on) of points may be generated. For a video of multiple frames, one or more files may be acquired. Point cloud data-related metadata (e.g., metadata related to capturing) may be generated during the capturing. The transmission device or encoder according to embodiments of the present disclosure may encode the point cloud data by video-based point cloud compression (V-PCC) or geometry-based point cloud compression (G-PCC), and output one or more video streams (S1520). V-PCC is a scheme of compressing point cloud data based on a 2D video codec such as high efficiency video coding (HEVC) or versatile video coding (VVC), G-PCC is a scheme of encoding point cloud data separately into two streams: geometry and attribute. The geometry stream may be generated by reconstructing and encoding position information about points, and the attribute stream may be generated by reconstructing and encoding attribute information (e.g., color) related to each point. In V-PCC, despite compatibility with a 2D video, much data is required to recover V-PCC-processed data (e.g., geometry video, attribute video, occupancy map video, and auxiliary information), compared to G-PCC, thereby causing a long latency in providing a service. One or more output bit streams may be encapsulated along with related metadata in the form of a file (e.g., a file format such as ISOBMFF) and transmitted over a network or through a digital storage medium (S1530).

The device or processor according to embodiments of the present disclosure may acquire one or more bit streams and related metadata by decapsulating the received video data, and recover 3D point cloud data by decoding the acquired bit streams in V-PCC or G-PCC (S1540). A renderer may render the decoded point cloud data and provide content suitable for VR/AR/MR/service to the user on a display (S1550).

As illustrated in FIG. 15, the device or processor according to embodiments of the present disclosure may perform a feedback process of transmitting various pieces of feedback information acquired during the rendering/display to the transmission device or to the decoding process (S1560). The feedback information according to embodiments of the present disclosure may include head orientation information, viewport information indicating an area that the user is viewing, and so on. Because the user interacts with a service (or content) provider through the feedback process, the device according to embodiments of the present disclosure may provide a higher data processing speed by using the afore-described V-PCC or G-PCC scheme or may enable clear video construction as well as provide various services in consideration of high user convenience.

Figure 16:
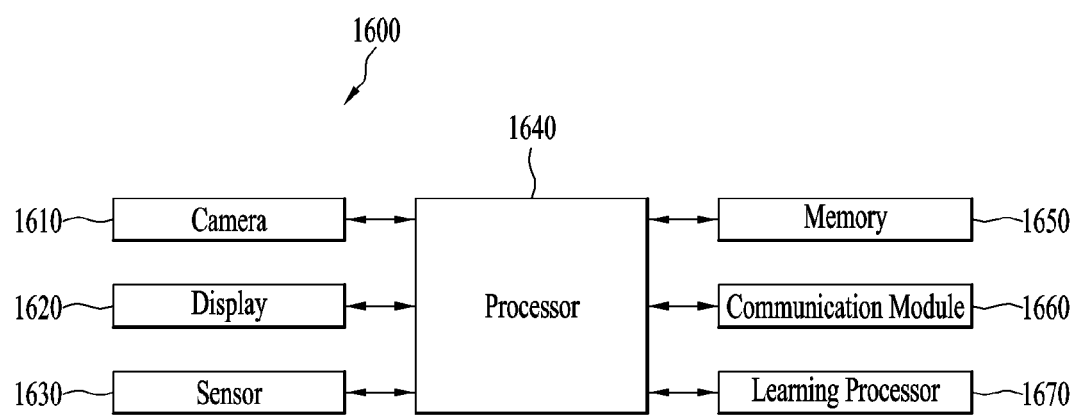
FIG. 16 shows an XR device 1600 including a learning processor.

FIG. 16 is a block diagram of an XR device 1600 including a learning processor. Compared to FIG. 13, only a learning processor 1670 is added, and thus a redundant description is avoided because FIG. 13 may be referred to for the other components.

Referring to FIG. 16, the XR device 1600 may be loaded with a learning model. The learning model may be implemented in hardware, software, or a combination of hardware and software. If the whole or part of the learning model is implemented in software, one or more instructions that form the learning model may be stored in a memory 1650.

According to embodiments of the present disclosure, a learning processor 1670 may be coupled communicably to a processor 1640, and repeatedly train a model including ANNs by using training data. An ANN is an information processing system in which multiple neurons are linked in layers, modeling an operation principle of biological neurons and links between neurons. An ANN is a statistical learning algorithm inspired by a neural network (particularly the brain in the central nervous system of an animal) in machine learning and cognitive science. Machine learning is one field of AI, in which the ability of learning without an explicit program is granted to a computer. Machine learning is a technology of studying and constructing a system for learning, predicting, and improving its capability based on empirical data, and an algorithm for the system. Therefore, according to embodiments of the present disclosure, the learning processor 1670 may infer a result value from new input data by determining optimized model parameters of an ANN. Therefore, the learning processor 1670 may analyze a device use pattern of a user based on device use history information about the user. Further, the learning processor 1670 may be configured to receive, classify, store, and output information to be used for data mining, data analysis, intelligent decision, and a machine learning algorithm and technique.

According to embodiments of the present disclosure, the processor 1640 may determine or predict at least one executable operation of the device based on data analyzed or generated by the learning processor 1670. Further, the processor 1640 may request, search, receive, or use data of the learning processor 1670, and control the XR device 1600 to perform a predicted operation or an operation determined to be desirable among the at least one executable operation. According to embodiments of the present disclosure, the processor 1640 may execute various functions of realizing intelligent emulation (i.e., knowledge-based system, reasoning system, and knowledge acquisition system). The various functions may be applied to an adaptation system, a machine learning system, and various types of systems including an ANN (e.g., a fuzzy logic system). That is, the processor 1640 may predict a user's device use pattern based on data of a use pattern analyzed by the learning processor 1670, and control the XR device 1600 to provide a more suitable XR service to the UE. Herein, the XR service includes at least one of the AR service, the VR service, or the MR service.

Figure 17:
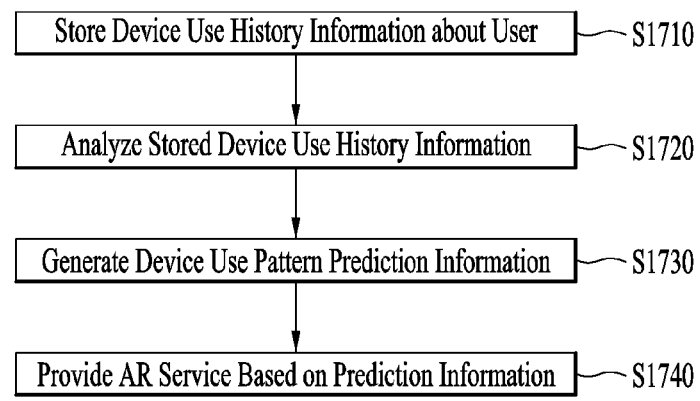
FIG. 17 illustrates a procedure in which the XR device 1600 of the embodiment illustrated in FIG. 16 provides an XR service.

FIG. 17 illustrates a process of providing an XR service by the XR service 1600 of the present disclosure illustrated in FIG. 16.

According to embodiments of the present disclosure, the processor 1670 may store device use history information about a user in the memory 1650 (S1710). The device use history information may include information about the name, category, and contents of content provided to the user, information about a time at which a device has been used, information about a place in which the device has been used, time information, and information about use of an application installed in the device.

According to embodiments of the present disclosure, the learning processor 1670 may acquire device use pattern information about the user by analyzing the device use history information (S1720). For example, when the XR device 1600 provides specific content A to the user, the learning processor 1670 may learn information about a pattern of the device used by the user using the corresponding terminal by combining specific information about content A (e.g., information about the ages of users that generally use content A, information about the contents of content A, and content information similar to content A), and information about the time points, places, and number of times in which the user using the corresponding terminal has consumed content A.

According to embodiments of the present disclosure, the processor 1640 may acquire the user device pattern information generated based on the information learned by the learning processor 1670, and generate device use pattern prediction information (S1730). Further, when the user is not using the device 1600, if the processor 1640 determines that the user is located in a place where the user has frequently used the device 1600, or it is almost time for the user to usually use the device 1600, the processor 1640 may indicate the device 1600 to operate. In this case, the device according to embodiments of the present disclosure may provide AR content based on the user pattern prediction information (S1740).

When the user is using the device 1600, the processor 1640 may check information about content currently provided to the user, and generate device use pattern prediction information about the user in relation to the content (e.g., when the user requests other related content or additional data related to the current content). Further, the processor 1640 may provide AR content based on the device use pattern prediction information by indicating the device 1600 to operate (S1740). The AR content according to embodiments of the present disclosure may include an advertisement, navigation information, danger information, and so on.

Figure 18:
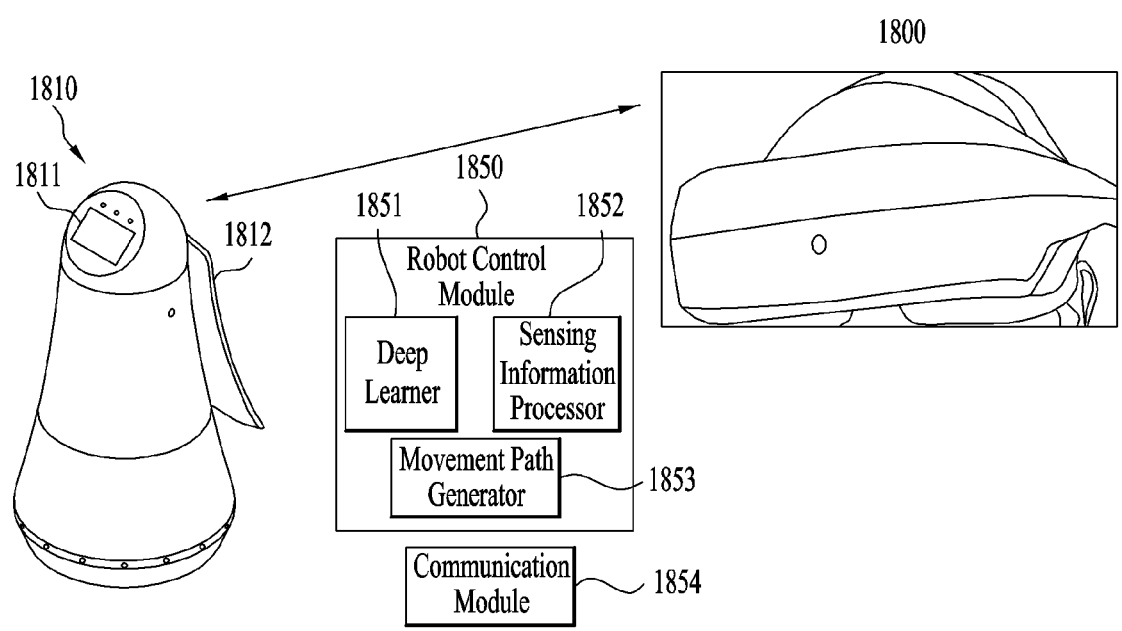
FIG. 18 shows the outer appearance of the XR device and a robot.

FIG. 18 illustrates the outer appearances of an XR device and a robot.

Component modules of an XR device 1800 according to an embodiment of the present disclosure have been described before with reference to the previous drawings, and thus a redundant description is not provided herein.

The outer appearance of a robot 1810 illustrated in FIG. 18 is merely an example, and the robot 1810 may be implemented to have various outer appearances according to the present disclosure. For example, the robot 1810 illustrated in FIG. 18 may be a drone, a cleaner, a cook root, a wearable robot, or the like. Particularly, each component of the robot 1810 may be disposed at a different position such as up, down, left, right, back, or forth according to the shape of the robot 1810.

The robot 1810 may be provided, on the exterior thereof, with various sensors to identify ambient objects. Further, to provide specific information to a user, the robot 1810 may be provided with an interface unit 1811 on top or the rear surface 1812 thereof.

To sense movement of the robot 1810 and an ambient object, and control the robot 1810, a robot control module 1850 is mounted inside the robot 1810. The robot control module 1850 may be implemented as a software module or a hardware chip with the software module implemented therein. The robot control module 1850 may include a deep learner 1851, a sensing information processor 1852, a movement path generator 1853, and a communication module 1854.

The sensing information processor 1852 collects and processes information sensed by various types of sensors (e.g., a LiDAR sensor, an IR sensor, an ultrasonic sensor, a depth sensor, an image sensor, and a microphone) arranged in the robot 1810.

The deep learner 1851 may receive information processed by the sensing information processor 1851 or accumulative information stored during movement of the robot 1810, and output a result required for the robot 1810 to determine an ambient situation, process information, or generate a moving path.

The moving path generator 1852 may calculate a moving path of the robot 1810 by using the data calculated by the deep learner 8151 or the data processed by the sensing information processor 1852.

Because each of the XR device 1800 and the robot 1810 is provided with a communication module, the XR device 1800 and the robot 1810 may transmit and receive data by short-range wireless communication such as Wi-Fi or Bluetooth, or 5G long-range wireless communication. A technique of controlling the robot 1810 by using the XR device 1800 will be described below with reference to FIG. 19.

Figure 19:
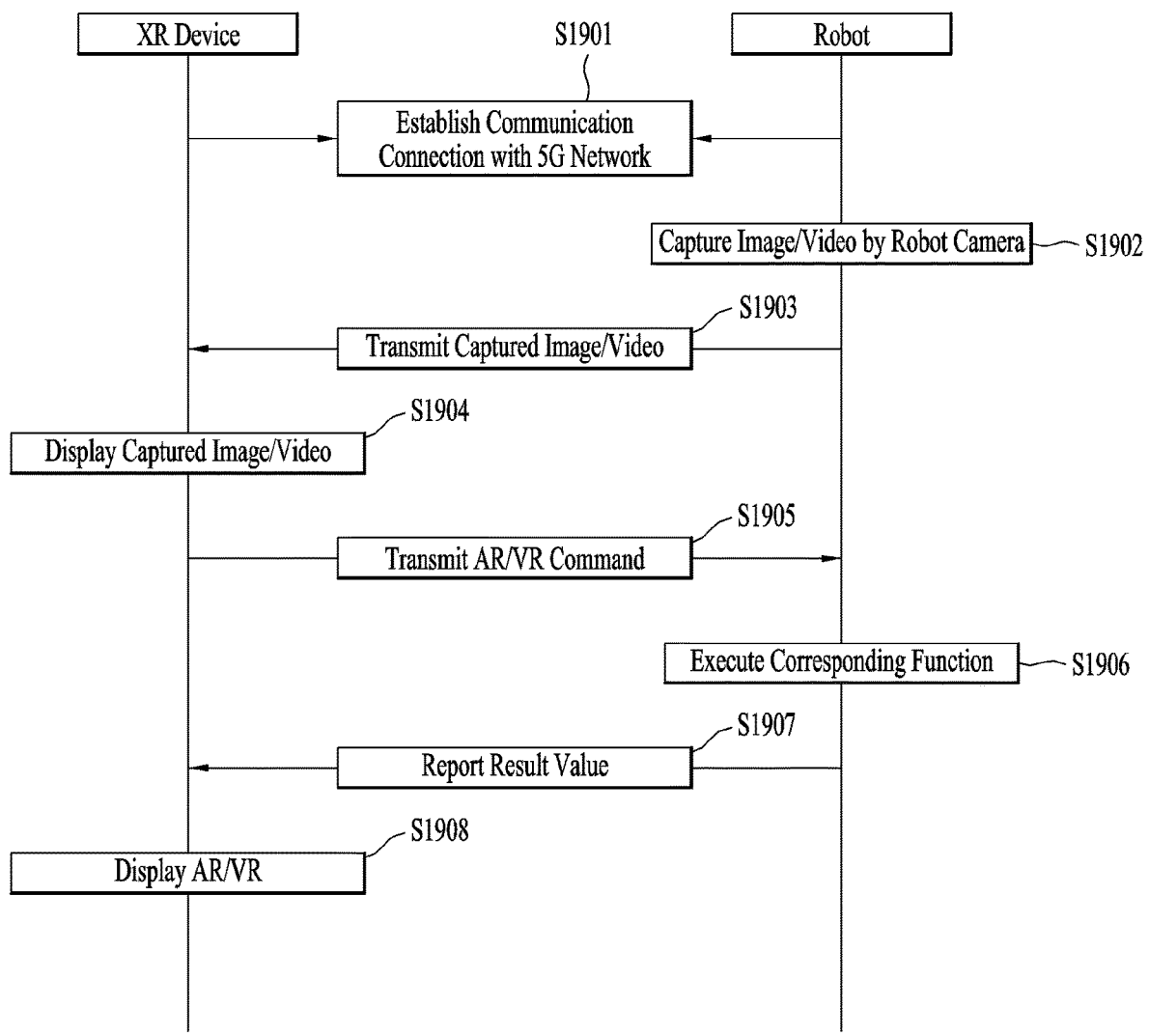
FIG. 19 is a flowchart illustrating a procedure of controlling a robot using a device equipped with XR technology.

FIG. 19 is a flowchart illustrating a process of controlling a robot by using an XR device.

The XR device and the robot are connected communicably to a 5G network (S1901). Obviously, the XR device and the robot may transmit and receive data by any other short-range or long-range communication technology without departing from the scope of the present disclosure.

The robot captures an image/video of the surroundings of the robot by means of at least one camera installed on the interior or exterior of the robot (S1902) and transmits the captured image/video to the XR device (S1903). The XR device displays the captured image/video (S1904) and transmits a command for controlling the robot to the robot (S1905). The command may be input manually by a user of the XR device or automatically generated by AI without departing from the scope of the disclosure.

The robot executes a function corresponding to the command received in step S1905 (S1906) and transmits a result value to the XR device (S1907). The result value may be a general indicator indicating whether data has been successfully processed or not, a current captured image, or specific data in which the XR device is considered. The specific data is designed to change, for example, according to the state of the XR device. If a display of the XR device is in an off state, a command for turning on the display of the XR device is included in the result value in step S1907. Therefore, when an emergency situation occurs around the robot, even though the display of the remote XR device is turned off, a notification message may be transmitted.

AR/VR content is displayed according to the result value received in step S1907 (S1908).

According to another embodiment of the present disclosure, the XR device may display position information about the robot by using a GPS module attached to the robot.

The XR device 1300 described with reference to FIG. 13 may be connected to a vehicle that provides a self-driving service in a manner that allows wired/wireless communication, or may be mounted on the vehicle that provides the self-driving service. Accordingly, various services including AR/VR may be provided even in the vehicle that provides the self-driving service.

Figure 20:
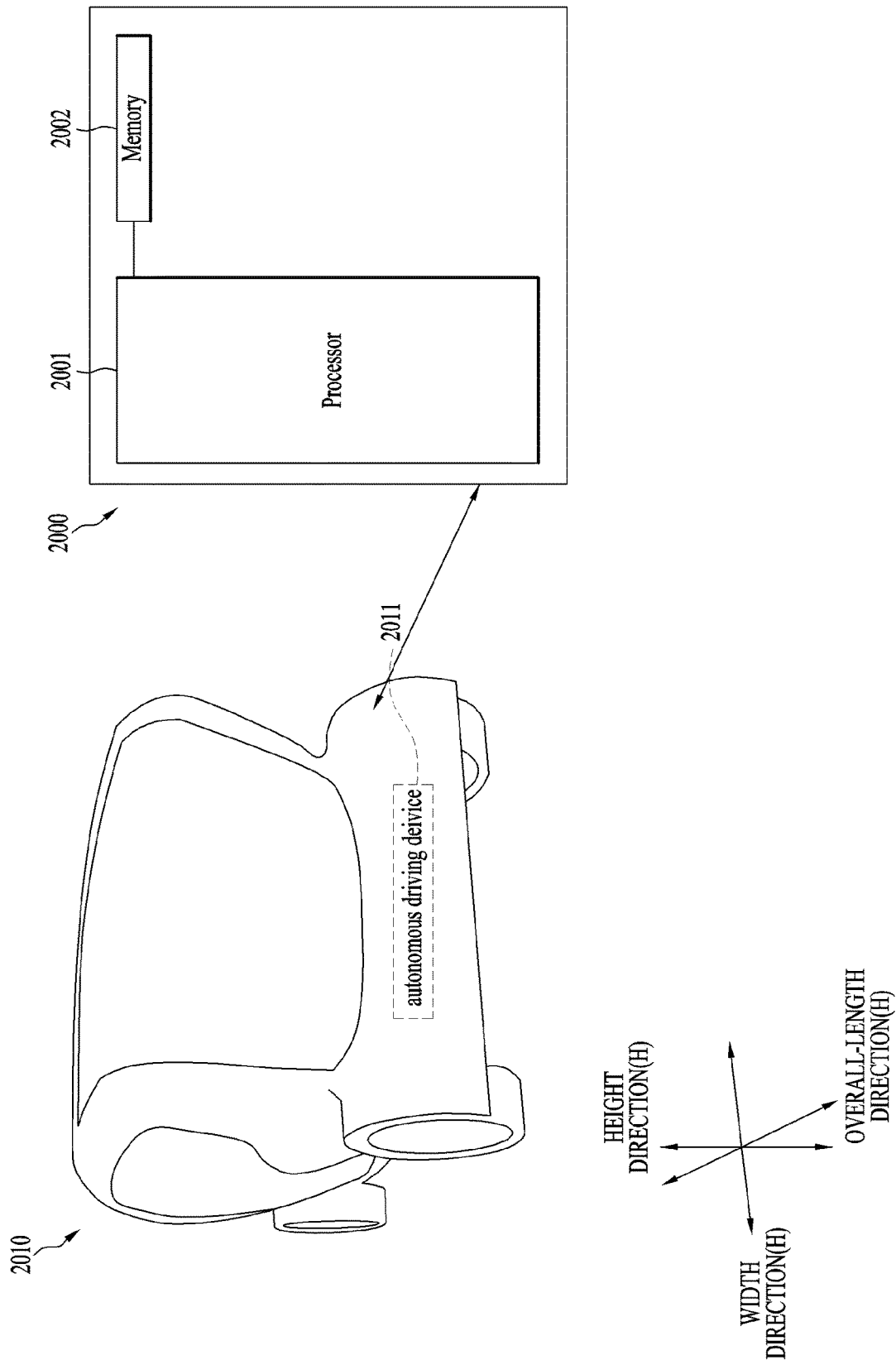
FIG. 20 illustrates a vehicle providing an self-driving service.

FIG. 20 illustrates a vehicle that provides a self-driving service.

According to embodiments of the present disclosure, a vehicle 2010 may include a car, a train, and a motor bike as transportation means traveling on a road or a railway. According to embodiments of the present disclosure, the vehicle 2010 may include all of an internal combustion engine vehicle provided with an engine as a power source, a hybrid vehicle provided with an engine and an electric motor as a power source, and an electric vehicle provided with an electric motor as a power source.

According to embodiments of the present disclosure, the vehicle 2010 may include the following components in order to control operations of the vehicle 2010: a user interface device, an object detection device, a communication device, a driving maneuver device, a main electronic control unit (ECU), a drive control device, a self-driving device, a sensing unit, and a position data generation device.

Each of the user interface device, the object detection device, the communication device, the driving maneuver device, the main ECU, the drive control device, the self-driving device, the sensing unit, and the position data generation device may generate an electric signal, and be implemented as an electronic device that exchanges electric signals.

The user interface device may receive a user input and provide information generated from the vehicle 2010 to a user in the form of a UI or UX. The user interface device may include an input/output (I/O) device and a user monitoring device. The object detection device may detect the presence or absence of an object outside of the vehicle 2010, and generate information about the object. The object detection device may include at least one of, for example, a camera, a LiDAR, an IR sensor, or an ultrasonic sensor. The camera may generate information about an object outside of the vehicle 2010. The camera may include one or more lenses, one or more image sensors, and one or more processors for generating object information. The camera may acquire information about the position, distance, or relative speed of an object by various image processing algorithms. Further, the camera may be mounted at a position where the camera may secure an FoV in the vehicle 2010, to capture an image of the surroundings of the vehicle 1020, and may be used to provide an AR/VR-based service. The LiDAR may generate information about an object outside of the vehicle 2010. The LiDAR may include a light transmitter, a light receiver, and at least one processor which is electrically coupled to the light transmitter and the light receiver, processes a received signal, and generates data about an object based on the processed signal.

The communication device may exchange signals with a device (e.g., infrastructure such as a server or a broadcasting station), another vehicle, or a terminal) outside of the vehicle 2010. The driving maneuver device is a device that receives a user input for driving. In manual mode, the vehicle 2010 may travel based on a signal provided by the driving maneuver device. The driving maneuver device may include a steering input device (e.g., a steering wheel), an acceleration input device (e.g., an accelerator pedal), and a brake input device (e.g., a brake pedal).

The sensing unit may sense a state of the vehicle 2010 and generate state information. The position data generation device may generate position data of the vehicle 2010. The position data generation device may include at least one of a GPS or a differential global positioning system (DGPS). The position data generation device may generate position data of the vehicle 2010 based on a signal generated from at least one of the GPS or the DGPS. The main ECU may provide overall control to at least one electronic device provided in the vehicle 2010, and the drive control device may electrically control a vehicle drive device in the vehicle 2010.

The self-driving device may generate a path for the self-driving service based on data acquired from the object detection device, the sensing unit, the position data generation device, and so on. The self-driving device may generate a driving plan for driving along the generated path, and generate a signal for controlling movement of the vehicle according to the driving plan. The signal generated from the self-driving device is transmitted to the drive control device, and thus the drive control device may control the vehicle drive device in the vehicle 2010.

As illustrated in FIG. 20, the vehicle 2010 that provides the self-driving service is connected to an XR device 2000 in a manner that allows wired/wireless communication. The XR device 2000 may include a processor 2001 and a memory 2002. While not shown, the XR device 2000 of FIG. 20 may further include the components of the XR device 1300 described before with reference to FIG. 13.

If the XR device 2000 is connected to the vehicle 2010 in a manner that allows wired/wireless communication. The XR device 2000 may receive/process AR/VR service-related content data that may be provided along with the self-driving service, and transmit the received/processed AR/VR service-related content data to the vehicle 2010. Further, when the XR device 2000 is mounted on the vehicle 2010, the XR device 2000 may receive/process AR/VR service-related content data according to a user input signal received through the user interface device and provide the received/processed AR/VR service-related content data to the user. In this case, the processor 2001 may receive/process the AR/VR service-related content data based on data acquired from the object detection device, the sensing unit, the position data generation device, the self-driving device, and so on. According to embodiments of the present disclosure, the AR/VR service-related content data may include entertainment content, weather information, and so on which are not related to the self-driving service as well as information related to the self-driving service such as driving information, path information for the self-driving service, driving maneuver information, vehicle state information, and object information.

Figure 21:
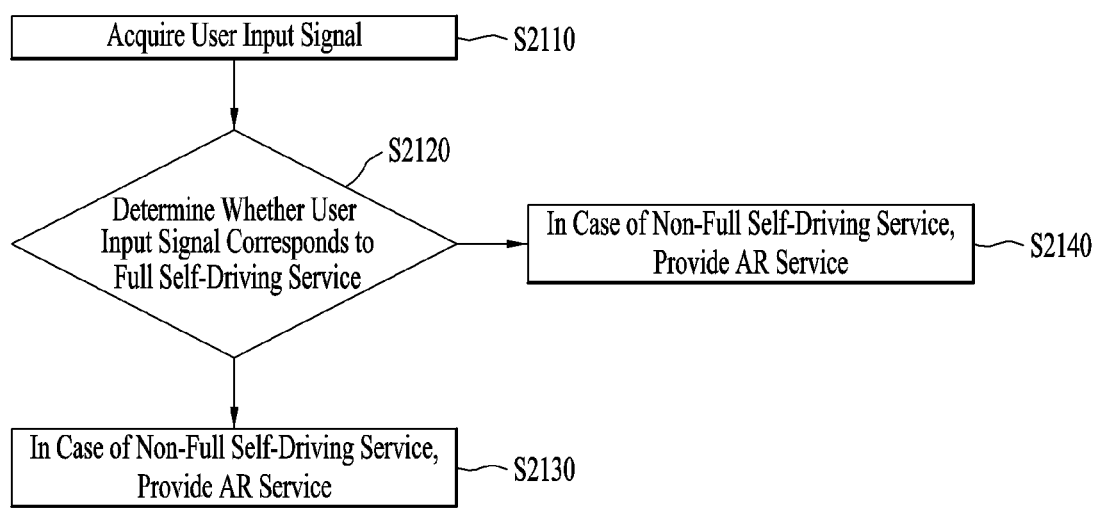
FIG. 21 illustrates a procedure of providing an AR/VR service during provision of the self-driving service.

FIG. 21 illustrates a process of providing an AR/VR service during a self-driving service.

According to embodiments of the present disclosure, a vehicle or a user interface device may receive a user input signal (S2110). According to embodiments of the present disclosure, the user input signal may include a signal indicating a self-driving service. According to embodiments of the present disclosure, the self-driving service may include a full self-driving service and a general self-driving service. The full self-driving service refers to perfect self-driving of a vehicle to a destination without a user's manual driving, whereas the general self-driving service refers to driving a vehicle to a destination through a user's manual driving and self-driving in combination.

It may be determined whether the user input signal according to embodiments of the present disclosure corresponds to the full self-driving service (S2120). When it is determined that the user input signal corresponds to the full self-driving service, the vehicle according to embodiments of the present disclosure may provide the full self-driving service (S2130). Because the full self-driving service does not need the user's manipulation, the vehicle according to embodiments of the present disclosure may provide VR service-related content to the user through a window of the vehicle, a side mirror of the vehicle, an HMD, or a smartphone (S2130). The VR service-related content according to embodiments of the present disclosure may be content related to full self-driving (e.g., navigation information, driving information, and external object information), and may also be content which is not related to full self-driving according to user selection (e.g., weather information, a distance image, a nature image, and a voice call image).

If it is determined that the user input signal does not correspond to the full self-driving service, the vehicle according to embodiments of the present disclosure may provide the general self-driving service (S2140). Because the FoV of the user should be secured for the user's manual driving in the general self-driving service, the vehicle according to embodiments of the present disclosure may provide AR service-related content to the user through a window of the vehicle, a side mirror of the vehicle, an HIVID, or a smartphone (S2140).

The AR service-related content according to embodiments of the present disclosure may be content related to full self-driving (e.g., navigation information, driving information, and external object information), and may also be content which is not related to self-driving according to user selection (e.g., weather information, a distance image, a nature image, and a voice call image).

While the present disclosure is applicable to all the fields of 5G communication, robot, self-driving, and AI as described before, the following description will be given mainly of the present disclosure applicable to an XR device with reference to following figures.

Figure 22:
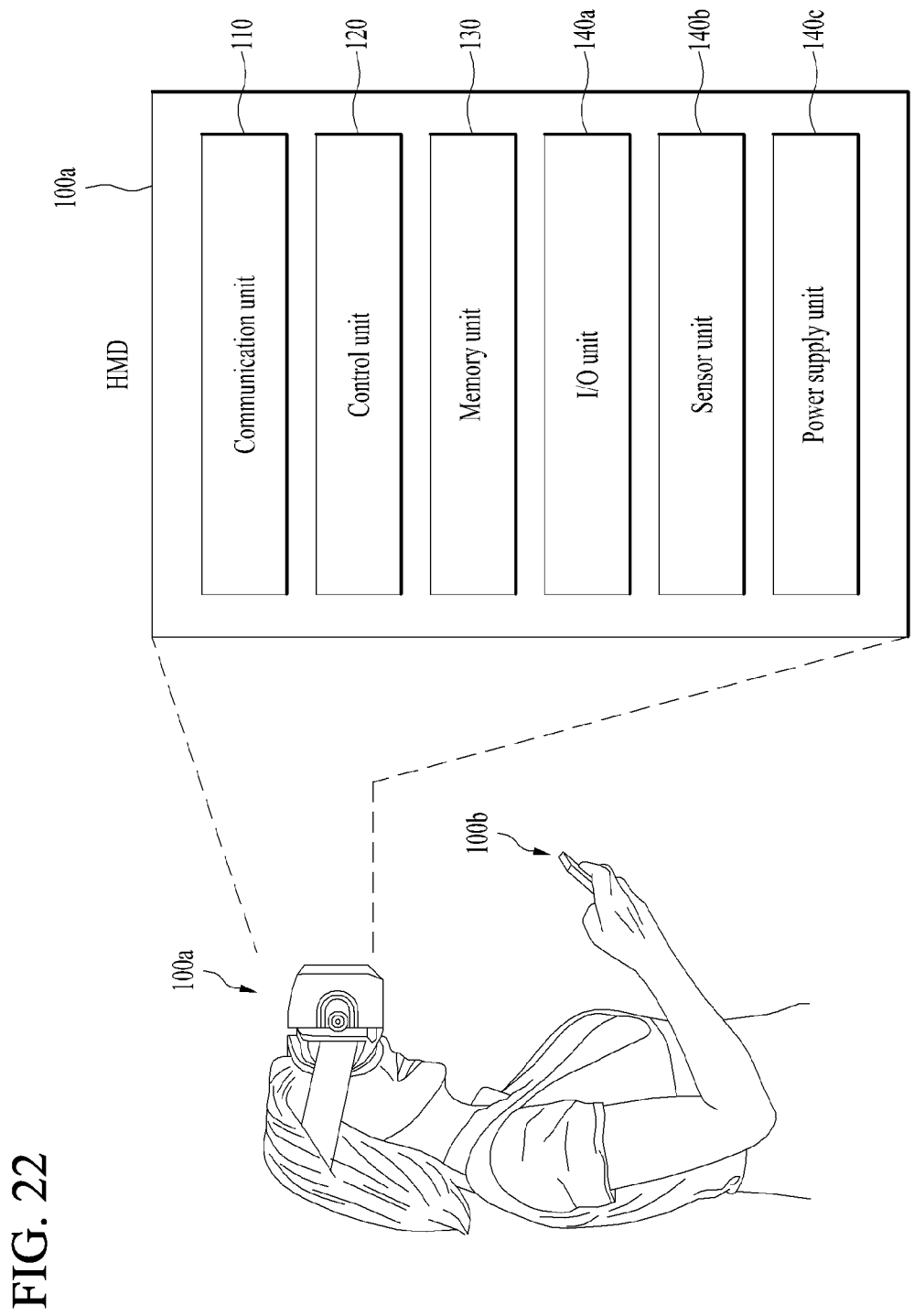
FIG. 22 illustrates a case where an XR device according to embodiments is implemented as an HMD type device.

FIG. 22 is a conceptual diagram illustrating an exemplary method for implementing the XR device using an HIVID type according to an embodiment of the present disclosure. The above-mentioned embodiments may also be implemented in HIVID types shown in FIG. 22.

The HIVID-type XR device 100a shown in FIG. 22 may include a communication unit 110, a control unit 120, a memory unit 130, an input/output (I/O) unit 140a, a sensor unit 140b, a power-supply unit 140c, etc. Specifically, the communication unit 110 embedded in the XR device 10a may communicate with a mobile terminal 100b by wire or wirelessly.

Figure 23:
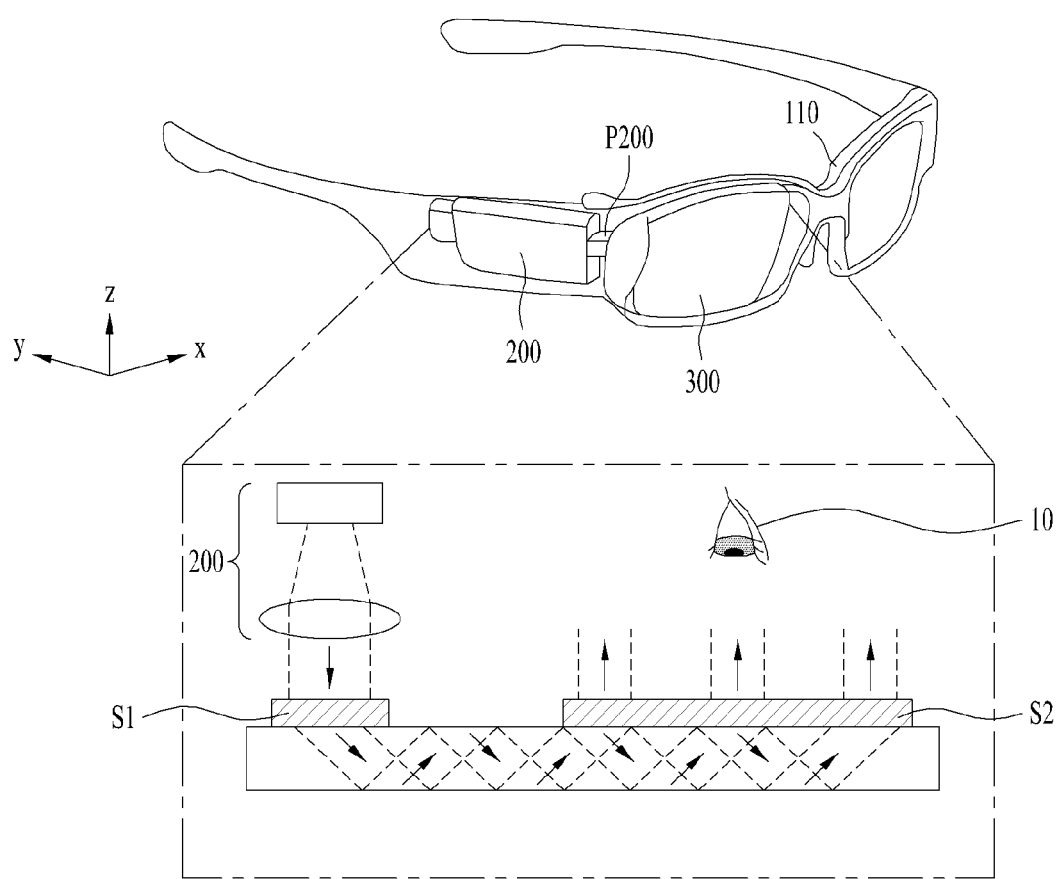
FIG. 23 illustrates a case where an XR device according to embodiments is implemented as an AR glass type device.

FIG. 23 is a conceptual diagram illustrating an exemplary method for implementing an XR device using AR glasses according to an embodiment of the present disclosure. The above-mentioned embodiments may also be implemented in AR glass types shown in FIG. 23.

Referring to FIG. 23, the AR glasses may include a frame, a control unit 200, and an optical display unit 300.

Although the frame may be formed in a shape of glasses worn on the face of the user 10 as shown in FIG. 23, the scope or spirit of the present disclosure is not limited thereto, and it should be noted that the frame may also be formed in a shape of goggles worn in close contact with the face of the user 10.

The frame may include a front frame 110 and first and second side frames.

The front frame 110 may include at least one opening, and may extend in a first horizontal direction (i.e., an X-axis direction). The first and second side frames may extend in the second horizontal direction (i.e., a Y-axis direction) perpendicular to the front frame 110, and may extend in parallel to each other.

The control unit 200 may generate an image to be viewed by the user 10 or may generate the resultant image formed by successive images. The control unit 200 may include an image source configured to create and generate images, a plurality of lenses configured to diffuse and converge light generated from the image source, and the like. The images generated by the control unit 200 may be transferred to the optical display unit 300 through a guide lens P200 disposed between the control unit 200 and the optical display unit 300.

The controller 200 may be fixed to any one of the first and second side frames. For example, the control unit 200 may be fixed to the inside or outside of any one of the side frames, or may be embedded in and integrated with any one of the side frames.

The optical display unit 300 may be formed of a translucent material, so that the optical display unit 300 can display images created by the control unit 200 for recognition of the user 10 and can allow the user to view the external environment through the opening.

The optical display unit 300 may be inserted into and fixed to the opening contained in the front frame 110, or may be located at the rear surface (interposed between the opening and the user 10) of the opening so that the optical display unit 300 may be fixed to the front frame 110. For example, the optical display unit 300 may be located at the rear surface of the opening, and may be fixed to the front frame 110 as an example.

Referring to the XR device shown in FIG. 23, when images are incident upon an incident region S1 of the optical display unit 300 by the control unit 200, image light may be transmitted to an emission region S2 of the optical display unit 300 through the optical display unit 300, images created by the controller 200 can be displayed for recognition of the user 10.

Accordingly, the user 10 may view the external environment through the opening of the frame 100, and at the same time may view the images created by the control unit 200.

As mentioned in disclosure, the embodiments can be applied to (or with) 5G communication technology field, robot technology field, autonomous mobility field and AI (Artificial Intelligence) field. Following figures represents applicable multimedia device (electronic device) such as digital signage, TV and XR device. According to the figures, person skilled art either can carry out embodiments in disclosure or can combine according to embodiments in disclosure.

Hereinafter, mobility using AR technology and a method of controlling the mobility will be described. An AR mobility control device and/or AR mobility according to embodiments may be interpreted as an XR device according to embodiments and may include all or part of the components of the XR device described above. In addition, in the following description, an AR mobility device may be interpreted as AR mobility, an AR mobility control device, an AR mobility device control device, or the like.

FIG. 24 illustrates an AR mobility device and an internal structure of AR mobility according to embodiments.

AR mobility referred to herein may be referred to as an AR mobility apparatus, a mobility apparatus, an AR mobility device, an AR mobility vehicle, a mobility vehicle, a mobility device, augmented reality mobility, an augmented reality mobility device, an AR mobility automobile, and the like. In addition, the AR mobility control device described herein may refer to the AR mobility device itself according to the embodiments, or components (or a set of components) included in the AR mobility device and to control AR mobility. Thus, components included in AR mobility according to the embodiments described herein may be understood as components of an AR mobility control device according to embodiments. In addition, an AR mobility control method may refer to a method of controlling an AR mobility device or an AR mobility control device.

Mobility services are evolving into a form of driverless vehicles capable of transporting a large number of passengers. Transparent displays may be mounted on the front/rear and left/right windows. There is an increasing need for differentiated Human Machine Interface (HMI) services in a multi-display environment for passengers. Augmented reality based service technology may be suitable for such services.

Both the positions and the viewing directions (gazes) of the passengers may be random. In the AR mobility according to embodiments, there may be many passengers on board, or passengers may crowd around the front side or rear side. In addition, there may also be passengers looking forward, passengers looking one side, passengers looking backward, seated passengers, standing passengers. Therefore, the AR mobility according to the embodiments needs to overcome difficulties in matching the AR graphic displayed on the transparent display for each passenger location with reality. That is, when AR gaze matching (and calibration) is performed based on a specific passenger, an AR matching error may occur for other passengers. For example, when matching calibration is performed based on passenger A, a matching error may occur for passenger B. This is because AR operates based on the perspective projection principle.

In addition, different AR content may expected by each passenger. Accordingly, there is a need for control of a shared screen and independent screens. Examples of such content may include destination information and POI.

FIG. 24(A) illustrates a mobility shuttle among AR mobility devices according to embodiments. The AR mobility device according to the embodiments may travel on a road. In addition, the AR mobility may be a vehicle capable of self-driving according to the embodiments described above.

The AR mobility according to the embodiments may carry one or more occupants (or users). In this case, the AR mobility may display an AR object (or an AR component) to be displayed on the display of the AR mobility, which will be described later, based on information about the locations of the one or more occupants and the gaze directions. Details will be described below.

FIG. 24(B) illustrates a multi-display human machine interface (HMI) of an AR mobility device according to embodiments. The AR mobility device according to the embodiments may include one or more interfaces configured to interact with a user. For example, the AR mobility device may include a display capable of receiving an input signal from a user or providing an image or video to the user.

For example, the display according to the embodiments may be configured with display panels arranged on the front, rear, left and/or right sides of the AR mobility. The display may be configured with one display panel. For example, the display according to the embodiments may be a transparent display. The display according to the embodiments may provide necessary information for a user by displaying an AR object (or an AR component).

FIG. 24(C) illustrates that an AR mobility device interacts with users according to embodiments. The AR mobility device according to the embodiments may receive an input signal from a user or provide information required by the user, using one or more interfaces. For example, the AR mobility device according to the embodiments may display the above-described AR object (or AR component) on the display according to the embodiments. In addition, for example, the display according to the embodiments may be a left or right transparent display having the shape of the windows of the above-mentioned AR mobility device. Accordingly, as the display displays the AR object (or AR component), the user may view the AR object (or AR component) and objects (real objects, buildings, etc.) present outside the AR mobility together.

FIG. 24(D) illustrates an AR mobility device according to embodiments. The AR mobility device according to the embodiments may be vehicle mobility or bus mobility. The AR mobility device may be subway mobility, or may be a personal mobility. The AR mobility device according to the embodiments may include seats to allow one or more occupants to sit thereon. The AR mobility device according to the embodiments may include a window including a plurality of displays.

According to embodiments, calibration may refer to displaying a display component (e.g., an AR object) on a display. A calibration position may mean that the display determines a reference point inside the AR mobility to display the AR object according to the embodiments. Specifically, calibrating an AR object may refer to determining, based on a reference point derived through a series of computational operations, a position where the AR object is to be displayed and then displaying the AR object on the display. Therefore, calibrating an AR object based on a reference point according to embodiments may refer to displaying the above-described AR object in a region on the display onto which an object present outside the AR mobility device is projected with respect to the reference point described above.

The AR mobility device (or AR mobility control device) according to the embodiments may be a vehicle capable of self-driving according to embodiments. That is, the AR mobility device according to the embodiments may be a vehicle configured to perform self-driving using a communicator (communication unit), a position sensor, and the like according to embodiments.

Here, the AR mobility device according to the embodiments may further display an AR object that may enable self-driving related feedback or interaction from users. The AR mobility device according to the embodiments may receive feedback information for updated information related to an external POI from users. The AR mobility device according to the embodiments may transmit the received feedback information to the server, using the communicator.

Accordingly, the AR mobility control device according to the embodiments may include a camera configured to photograph one or more users to generate image data, a controller (control unit) configured to extract information about one or more users from the image data, a calibrator (calibration unit) configured to calculate a reference point for projection of an AR object based on location information about the users, and a display configured to display the AR object based on the calculated reference point. Here, the information about one or more users may include location information about the users.

This configuration may allow the AR mobility device control method and/or the AR mobility device according to the embodiments to effectively eliminate the effect of a mismatch between the AR object and an external object while displaying the AR object on the display for the users.

This configuration may allow the AR mobility device control method and/or the AR mobility device according to the embodiments to prevent a mismatch between an AR object presented by a display and an external object using the gaze information about each of the users (or seats) even when the gazes of the user are changed or the viewing directions of the users are different from each other.

In addition, with the AR mobility device control method and/or the AR mobility device according to the embodiments, the amount of computation required to display (or calibrate) an AR object on the display may be reduced by determining a representative value as a reference point based on information about the locations of one or more users.

This configuration may allow the AR mobility device control method and/or the AR mobility device according to the embodiments to quickly calculate a reference point for reducing mismatch by pre-storing the pre-calibration position.

This configuration may allow the AR mobility device control method and/or the AR mobility device according to the embodiments to receive feedback information from users while operating self-driving. In addition, the AR mobility device according to the embodiments may allow a server to quickly correct wrong information, thereby quickly providing correct information (updated information) for users.

This configuration may allow the AR mobility device control method and/or the AR mobility control device according to the embodiments to provide information about external objects for users in real time while operating self-driving. That is, the AR mobility device according to the embodiments may intuitively provide road travel related information or information about driving.

In addition, this configuration may allow the AR mobility device according to the embodiments to maximize stability of self-driving by providing detailed information about self-driving for users and enabling the users to interact with self-driving.

Figure 25:
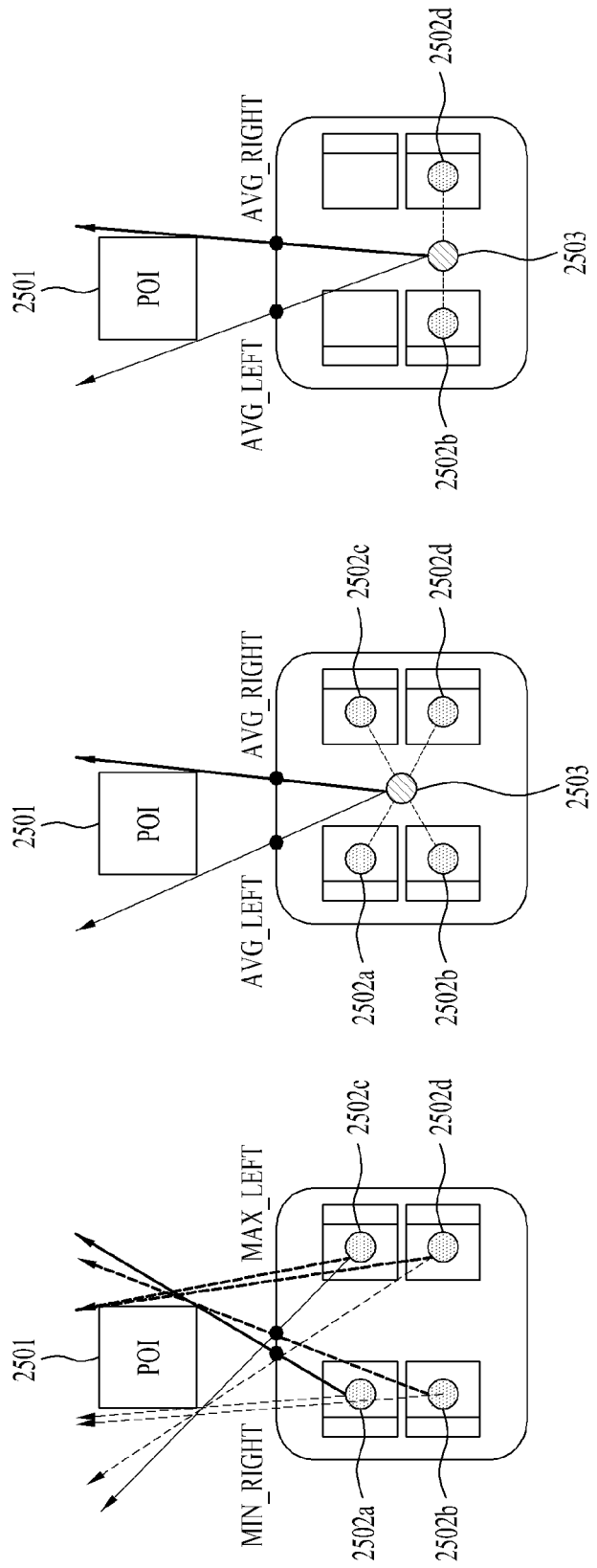
FIG. 25 illustrates a procedure in which a display of an AR mobility device according to embodiments displays an AR object (or an AR component)

FIG. 25 illustrates a procedure in which a display of an AR mobility device according to embodiments displays an AR object (or an AR component).

AR mobility referred to herein may be referred to as an AR mobility apparatus, a mobility apparatus, an AR mobility device, an AR mobility vehicle, a mobility vehicle, a mobility device, augmented reality mobility, an augmented reality mobility device, an AR mobility automobile, and the like. In addition, the AR mobility control device described herein may refer to the AR mobility device itself according to the embodiments, or components (or a set of components) included in the AR mobility device and to control AR mobility. Thus, components included in AR mobility according to the embodiments described herein may be understood as components of an AR mobility control device according to embodiments. In addition, an AR mobility control method may refer to a method of controlling an AR mobility device or an AR mobility control device.

A Point of Interest (POI) 2501 according to embodiments represents an object that is present outside the AR mobility. The POI may refer to an object that is present outside the AR mobility. For example, the POI may refer to a building, an artificial sculpture, a natural object, or the like that is present outside the AR mobility. For example, the POI may refer to a specific building or a subway station exit, an apartment, a bus stop, a park entrance, or the like.

Seat points 2502a, 2502b, 2502c, and 2502d according to embodiments may refer to positions of seats present inside the AR mobility according to the embodiments. That is, one or more users may look at an object that is present outside the above-mentioned AR mobility at the corresponding seat points. The seats present in the AR mobility according to the embodiments may not arranged as illustrated in FIG. 25, but may be arranged differently according to the design. A seating point may be referred to or understood as location information about one or more occupants (or users). The location information about one or more users may be extracted or determined by a camera included in AR mobility.

A representative position 2503 of all seats or (a representative position of all seat points) according to embodiments may be a reference point determined to display on the display an AR object (or AR component) for the aforementioned Point of Interest (POI). The reference point may represent the seat points.

The display of the AR mobility according to the embodiments may display an AR object (or AR component) related to an object present outside the above-described AR mobility. That is, users who ride inside the AR mobility may view the above-described AR object (or AR component) together in the direction in which the above-described POI (or object) is seen. In other words, the above-described POI and the above-described AR component may be seen to the users in an overlaid manner, or the POI and the AR component may be seen to be positioned close to each other.

In this case, a plurality of occupants (or a plurality of users) may look at the above-described object from two or more seat points among the seat points 2502a to 2502d. In this case, there may be a partial area of the display in which an object is projected onto the display from each seat point. For example, an area (or range) in which the object is projected on the display when a user looks at the aforementioned object from a seat point 2502a on the upper left side among the aforementioned seat points may be different from an area (or range) in which the object is projected on the display when a user looks at the object from a seat point 2502c on the upper right side among the aforementioned seat points.

Accordingly, the AR mobility according to the embodiments may determine a position where an AR object (or an AR component) to be displayed on the display is displayed, in consideration of information about the locations of one or more occupants (users) in the AR mobility and the location of the POI.

Thus, according to embodiments, FIG. 25A illustrates displaying an AR object (or AR component) based on a minimum AR graphic output area. Specifically, the figure illustrates a method of determining a range of an area of the display on which the above-described AR object (or AR component) is displayed based on the information about the locations of one or more occupants in the AR mobility.

As an example, in FIG. 25, the rightmost boundary of the POI may need to be displayed at least on the right side of a point (i.e., the MIN_RIGHT point) where the display according to the embodiments meets the viewing line extending from the seat point located at the upper left seat in the AR mobility. On the other hand, the leftmost boundary of the POI may need to be displayed at least on the left side of a point (i.e., the MAX_LEFT point) where the display according to the embodiments meets the viewing line extending from the seat point located at the upper right seat in the AR mobility. Thus, when an AR object (or AR component) related to a POI may be displayed between MIN_RIGHT and MAX_LEFT when the AR object (or AR component) related to the POI may be seen to all users in an overlapping (or overlaid) manner.

Similarly, the AR mobility according to the embodiments may calculate or extract the location information about each seat point (or location information about users) based on (X, Y, Z) coordinate values, and the display position of an AR object (or AR component) to be displayed on the display may be determined based on the corresponding (X, Y, Z) coordinate values and the location information about the POI, and then the AR object (or AR component) may be displayed.

FIG. 25B illustrates displaying an AR object (or AR component) based on an AR graphic output area according to a passenger location. Specifically, the figure illustrates a method by which the AR mobility device according to the embodiments determines information about a representative location 2503 for all the above-described seats based on the location information about one or more users (or location information about each seat point), and determines an area of the display in which the AR object (or AR component) is to be displayed based on the determined information about the representative location for all seats.

The AR mobility device according to the embodiments may calculate the representative location 2503 for all the seats based on the respective seat points (or the location information about the users), and determine an area of the display in which an AR object (or an AR component) is to be displayed, based on the calculated representative location (or reference point) for all the seats. That is, when the user views the above-mentioned object at the representative location for all the seats, the above-described AR object (or AR component) may be displayed in the area (or range) in which the object is projected on the display. For example, in FIG. 25B, an AR object (or AR component) related to a POI may be displayed on the right side of AVG_LEFT and/or the left side of AVG_RIGHT.

According to embodiments, calibration may refer to displaying a display component (e.g., an AR object) on a display. A calibration position may mean that the display determines a reference point inside the AR mobility to display the AR object according to the embodiments. Specifically, calibrating an AR object may refer to determining, based on a reference point derived through a series of computational operations, a position where the AR object is to be displayed and then displaying the AR object on the display. Therefore, calibrating an AR object based on a reference point according to embodiments may refer to displaying the above-described AR object in an area of the display onto which an object present outside the AR mobility device is projected with respect to the reference point described above.

Accordingly, an AR mobility control device according to embodiments may include a camera configured to photograph one or more users to generate image data, a controller configured to extract information about one or more users from the image data, a calibrator configured to calculate a reference point for projection of an AR object based on location information about the users, and a display configured to display the AR object based on the calculated reference point. Here, the information about one or more users may include location information about the users.

In addition, a method of controlling an AR mobility device according to embodiments may include photographing one or more users by a camera and generating image data, extracting information about one or more users from the image data, calculating a reference point for projection of an AR object based on location information about the users, and displaying the AR object on a display based on the calculated reference point. Here, the information about one or more users may include location information about the users.

Here, the camera may be a 360-degree camera, and the reference point may be a representative value determined based on the coordinate values for the one or more users included in the location information about the users.

The representative value according to the embodiments may refer to a value representing the reference point, which is determined based on the coordinate values corresponding to the location information about the users. As an example, the representative value may be a value for the center of mass calculated based on the coordinate values corresponding to the location information about the users. As another example, the representative value may be determined as one of the coordinate values corresponding to the location information about the users. As another example, the representative value may refer to an outer center, an incenter, a center of mass, an excenter, and/or an orthocenter of a triangular figure formed by three coordinates among the coordinate values corresponding to the location information about the users. As another example, the representative value may be determined as a coordinate value of one point among all points present in the circular figure formed by the three coordinate values described above. As another example, the representative value may be a point of internal division and/or a point of external division formed by two coordinate values among the coordinate values corresponding to the location information about the users.

The AR mobility control device according to the embodiments may pre-calculate calibration data based on a specific location in a mobility vehicle according to embodiments. Here, the AR mobility control device according to the embodiments may derive a data combination required by the AR mobility according to the embodiments as follows.

(Data combination)=(each actually present seat location+virtual intermediate seat)*(height of each passenger eye)

Through a 360-degree camera mounted on the ceiling of the AR mobility, the locations and viewing directions of the passengers may be recognized, and, for example, the distribution in space and the center of gravity may be calculated. An AR object (or an AR component) may be output by setting a point around which passengers crowd as a representative seat and applying a corresponding calibration value in real time. This configuration may reduce the average matching error.

The configuration may also be applied to a case where there are multiple viewers (multiple passengers share one display).

AR graphic output area to minimize mismatch
- An AR graphic indicating a certain area shall have a portion matching with the corresponding area seen from the viewpoints of all users (In the environment as shown in FIG. 25A, the minimum output area of the AR graphic is from MIN_RIGHT to MAX_LEFT).
- An AR graphic shall be output for a virtual location representing all passenger locations.
- The representative passenger location may dynamically change depending on the seats on which the passenger are seated (see FIG. 25B).

This configuration may allow the AR mobility device control method and/or the AR mobility device according to the embodiments to effectively eliminate the effect of a mismatch between the AR object and an external object while displaying the AR object on the display for the users.

This configuration may allow the AR mobility device control method and/or the AR mobility device according to the embodiments to prevent a mismatch between an AR object presented by a display and an external object using the gaze information about each of the users (or seats) even when the gazes of the user are changed or the viewing directions of the users are different from each other.

In addition, with the AR mobility device control method and/or the AR mobility device according to the embodiments, the amount of computation required to display (or calibrate) an AR object on the display may be reduced by determining a representative value as a reference point based on information about the locations of one or more users.

In addition, this configuration may allow the AR mobility device control method and/or the AR mobility device according to the embodiments to quickly calculate a reference point for reducing mismatch by pre-storing the pre-calibration position.

Figure 26:
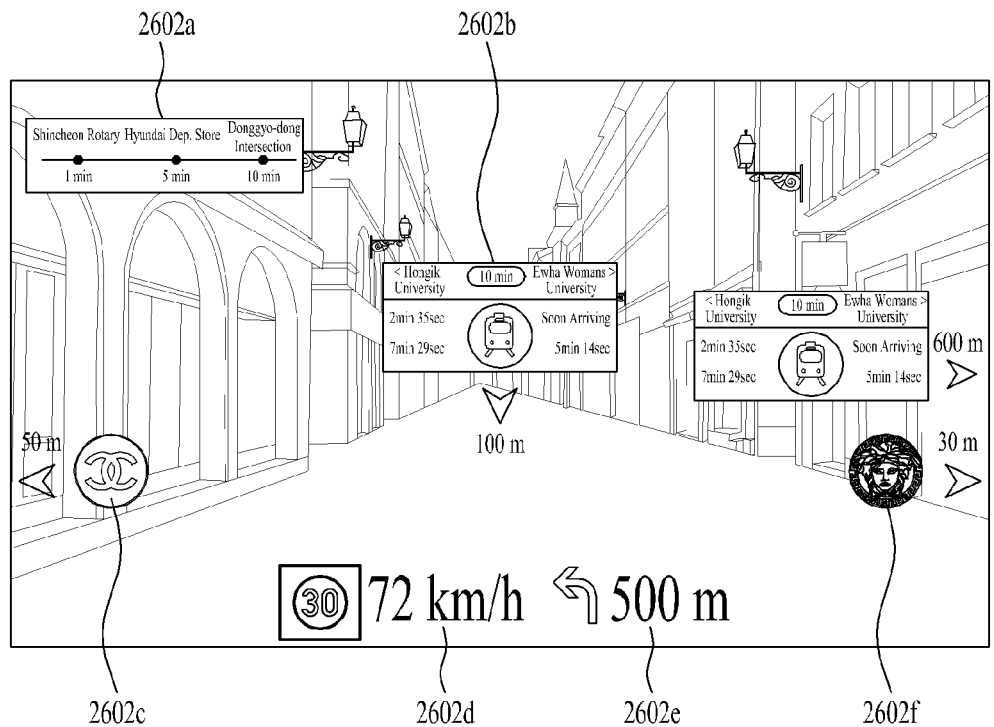
FIG. 26 illustrates an AR mobility device according to embodiments and AR objects (or AR components) according to embodiments of a display.

FIG. 26 illustrates an AR mobility device according to embodiments and AR objects (or AR components) according to embodiments of a display.

The display according to the embodiments may be a transparent display. The display according to the embodiments may present a static graphic output area (displaying only simple directions such as left, right, and front with respect to the front view). AR components according to embodiments may include a vehicle path, locations of nearby stops, and basic driving information (speed, temperature in a vehicle body, etc.), and brief information about nearby facilities.

An AR mobility device 2600, which is an AR mobility device according to embodiments, may be a mobility vehicle that travels on a road. The AR mobility device may include a display and other sensors according to embodiments. The other sensors may include a position sensor (e.g., a GPS sensor), a communicator configured to transmit or receive data to or from a server, and a controller configured to extract information about users and the like.

The display 2601 is a device on which AR objects (or AR components) are displayed. The display may be located on at least one of the front, rear, left, right, top, and/or bottom surfaces of the AR mobility device. The display may be a transparent display. As another example, the display may refer to one display surrounding the AR mobility device.

AR components 2602a to 2602f may represent AR graphic outputs displayed on a display according to embodiments. An AR component may be called an AR object. The AR component may be a component related to the above-described POI.

When the AR mobility device according to the embodiments is a mobility shuttle, the AR components may include a component 2602a representing information about a stop where the mobility shuttle (or bus) stops.

In addition, when the point of interest (POI) is an object related to a subway station (e.g., an exit of the subway station), the AR components related to the POI may include a component 2602b representing information related to the subway line of the subway station, and a component 2602b representing information about the arrival time of a subway train approaching the subway station. As another example, when the POI is an object related to a restaurant, the AR components may include components 2602c and 2602f representing information about a distance and a direction of the restaurant from the AR mobility device according to the embodiments.

Other AR components may include, for example, a component (e.g., a map, etc.) representing information about a location where the AR mobility device according to the embodiments is currently located. The AR components may also include a component 2602d related to a travel speed of the AR mobility device according to the embodiments, and a component 2602e representing guide information about a destination of the AR mobility device.

The AR mobility device (or AR mobility control device) according to the embodiments may be a vehicle capable of self-driving according to embodiments. That is, the AR mobility device according to the embodiments may be a vehicle configured to perform self-driving using a communicator, a position sensor, and the like according to embodiments.

Here, the AR mobility device according to the embodiments may further display an AR object that may enable self-driving related feedback or interaction from users. The AR mobility device according to the embodiments may receive feedback information for updated information related to an external POI from users. The AR mobility device according to the embodiments may transmit the received feedback information to the server, using the communicator.

Accordingly, the AR mobility control device according to the embodiments may include a camera configured to photograph one or more users to generate image data, a controller configured to extract information about one or more users from the image data, a calibrator configured to calculate a reference point for projection of an AR object based on location information about the users, and a display configured to display the AR object based on the calculated reference point. Here, the information about one or more users may include location information about the users.

In addition, a method of controlling an AR mobility device according to embodiments may include photographing one or more users by a camera and generating image data, extracting information about one or more users from the image data, calculating a reference point for projection of an AR object based on location information about the users, and displaying the AR object on a display based on the calculated reference point. Here, the information about one or more users may include location information about the users.

Here, the display may be a transparent display, and may further display a first object representing information about a distance of an object from the AR mobility, a second object representing information about a moving speed of the AR mobility, and a third object indicating information about a destination of the AR mobility, a fourth object representing a map, a fifth object representing information related to an object located within a certain distance from the AR mobility, a sixth object representing news information, and a seventh object representing the current time.

Here, the AR object may represent information related to an object outside of the AR mobility. The AR object may be displayed on a first area of the display, which is an area where the object is projected on a first display with respect to a reference point, or a second area of the display, which is an area for displaying information related to the first area.

This configuration may allow the AR mobility device control method and/or the AR mobility device according to the embodiments to effectively eliminate the effect of a mismatch between the AR object and an external object while displaying the AR object on the display for the users.

This configuration may allow the AR mobility device control method and/or the AR mobility device according to the embodiments to prevent a mismatch between an AR object presented by a display and an external object using the gaze information about each of the users (or seats) even when the gazes of the user are changed or the viewing directions of the users are different from each other.

In addition, this configuration may allow the AR mobility device control method and/or the AR mobility device according to the embodiments to quickly calculate a reference point for reducing mismatch by pre-storing the pre-calibration position.

This configuration may allow the AR mobility device control method and/or the AR mobility device according to the embodiments to receive feedback information from users while operating self-driving. In addition, the AR mobility device according to the embodiments may allow a server to quickly correct wrong information, thereby quickly providing correct information (updated information) for users.

This configuration may allow the AR mobility device control method and/or the AR mobility control device according to the embodiments to provide information about external objects for users in real time while operating self-driving. That is, the AR mobility device according to the embodiments may intuitively provide road travel related information or information about driving.

In addition, this configuration may allow the AR mobility device according to the embodiments to maximize stability of self-driving by providing detailed information about self-driving for users and enabling the users to interact with self-driving.

FIG. 27 illustrates an AR mobility control device (or AR mobility device) according to embodiments.

Specifically, FIG. 27 is an overall system diagram illustrating an entire system of an AR mobility control device (or an AR mobility device) according to embodiments.

The AR mobility device may include an AR mobility control device. That is, in order to control the AR mobility device according to the embodiments, the AR mobility device may include an AR mobility control device, which may include components to be described later. Hereinafter, all or some of the components described as being included in the AR mobility may be included in the AR mobility control device according to the embodiments.

An AR mobility device (or AR mobility control device) 2700 may be AR mobility according to the embodiments described above in FIGS. 24 to 27. The AR mobility according to embodiments may include a 360-degree RGB camera 2701, a GPS sensor 2702, a passenger location calibrator 2703, an AR engine 2704, and a transparent display 2705.

The 360-degree RGB camera 2701 may be mounted inside or outside the mobility device according to the embodiments. The 360-degree RGB camera may deliver captured image data to the passenger location calibrator 2703, the AR engine 2704, and/or the transparent display 2705.

According to embodiments, the 360-degree RGB camera may generate image data (or video data) by photographing passengers (or one or more users) in AR mobility. The 360-degree RGB camera may extract information about the location of each user and/or information about the gaze direction of each user based on the captured image data (or video data). The information about the above-described location may be represented by coordinate information indicating the location of each user. In addition, the above-described information about the gaze direction may be represented by vector coordinate information indicating the gaze direction of each user. The information about the gaze direction of each user may be related to the information about the position of the seat on which each user is located. Here, the gaze direction information about the users may refer to directions in which the users are actually looking, or directions in which seats related to the users are positioned (for example, a direction for each of the seats where the users are sitting). In addition, the locations of the seats may be obtained by sensors present in the seats.

An operation of detecting the information about the locations of the users and/or the information about the gaze direction based on the above-described image data may be directly performed by the 360-degree RGB camera 2701 according to the embodiments, or may be performed by the passenger location calibrator 2703, which will be described later, when the passenger location calibrator 2703 receives the image data. Similarly, the AR engine 2704 may receive the above-described image data and detect the information about the locations of the users and/or the information about the gaze direction. Here, the gaze direction information about the users may refer to directions in which the users are actually looking, or directions in which seats related to the users are positioned (for example, a direction for each of the seats where the users are sitting). In addition, the locations of the seats may be obtained by sensors present in the seats.

The GPS sensor 2702 may generate information about the location of the AR mobility device according to the embodiments. The GPS sensor may transmit the generated information about the location of the AR mobility device to the passenger location calibrator 2703 and the AR engine 2704.

The passenger location calibrator 2703 may display, on the transparent display 2705, the location (or area) of an AR object (or AR component) to be displayed based on the information about the locations of one or more users and/or the information about the gaze direction received from the 360 degree RGB camera. That is, the passenger location calibrator 2703 may determine a representative location (i.e., reference point) for all seats based on the information 2700a to 2700d about the locations of one or more users, in order to determine an area for displaying the AR object.

According to embodiments, calibration may refer to displaying a display component (e.g., an AR object) on a display. A calibration position may mean that the display determines a reference point inside the AR mobility to display the AR object according to the embodiments. Specifically, calibrating an AR object may refer to determining, based on a reference point derived through a series of computational operations, a position where the AR object is to be displayed and then displaying the AR object on the display. Therefore, calibrating an AR object based on a reference point according to embodiments may refer to displaying the above-described AR object in a region on the display onto which an object present outside the AR mobility device is projected with respect to the reference point described above.

In addition, projecting an AR object may mean displaying the AR object on the display. In addition, projecting an AR object based on the reference point may mean displaying the AR object in a display area in which an object POI present outside the AR mobility device is projected on the display according to the embodiments (or an area related to the display area for the projection), based on the reference point described above.

The AR engine 2704 may perform a computational operation to display the AR object (or AR component) according to the embodiments on the display according to the embodiments.

The transparent display 2705 is a display according to embodiments. The transparent display may be located on the front, rear, left side, right side, top side and/or bottom side of the AR mobility device according to the embodiments.

Accordingly, the AR mobility control device according to the embodiments may include a camera configured to photograph one or more users to generate image data, a controller (control unit) configured to extract information about one or more users from the image data, a calibrator (calibration unit) configured to calculate a reference point for projection of an AR object based on location information about the users, and a display configured to display the AR object based on the calculated reference point. Here, the information about one or more users may include location information about the users.

In addition, a method of controlling an AR mobility device according to embodiments may include photographing one or more users by a camera and generating image data, extracting information about one or more users from the image data, calculating a reference point for projection of an AR object based on location information about the users, and displaying the AR object on a display based on the calculated reference point. Here, the information about one or more users may include location information about the users.

Here, the AR object may represent information related to an object outside of the AR mobility. The AR object may be displayed on a first area of the display, which is an area where the object is projected on a first display with respect to a reference point, or a second area of the display, which is an area for displaying information related to the first area.

This configuration may allow the AR mobility device control method and/or the AR mobility device according to the embodiments to effectively eliminate the effect of a mismatch between the AR object and an external object while displaying the AR object on the display for the users.

This configuration may allow the AR mobility device control method and/or the AR mobility device according to the embodiments to prevent a mismatch between an AR object presented by a display and an external object using the gaze information about each of the users (or seats) even when the gazes of the user are changed or the viewing directions of the users are different from each other.

In addition, this configuration may allow the AR mobility device control method and/or the AR mobility device according to the embodiments to quickly calculate a reference point for reducing mismatch by pre-storing the pre-calibration position.

Figure 28:
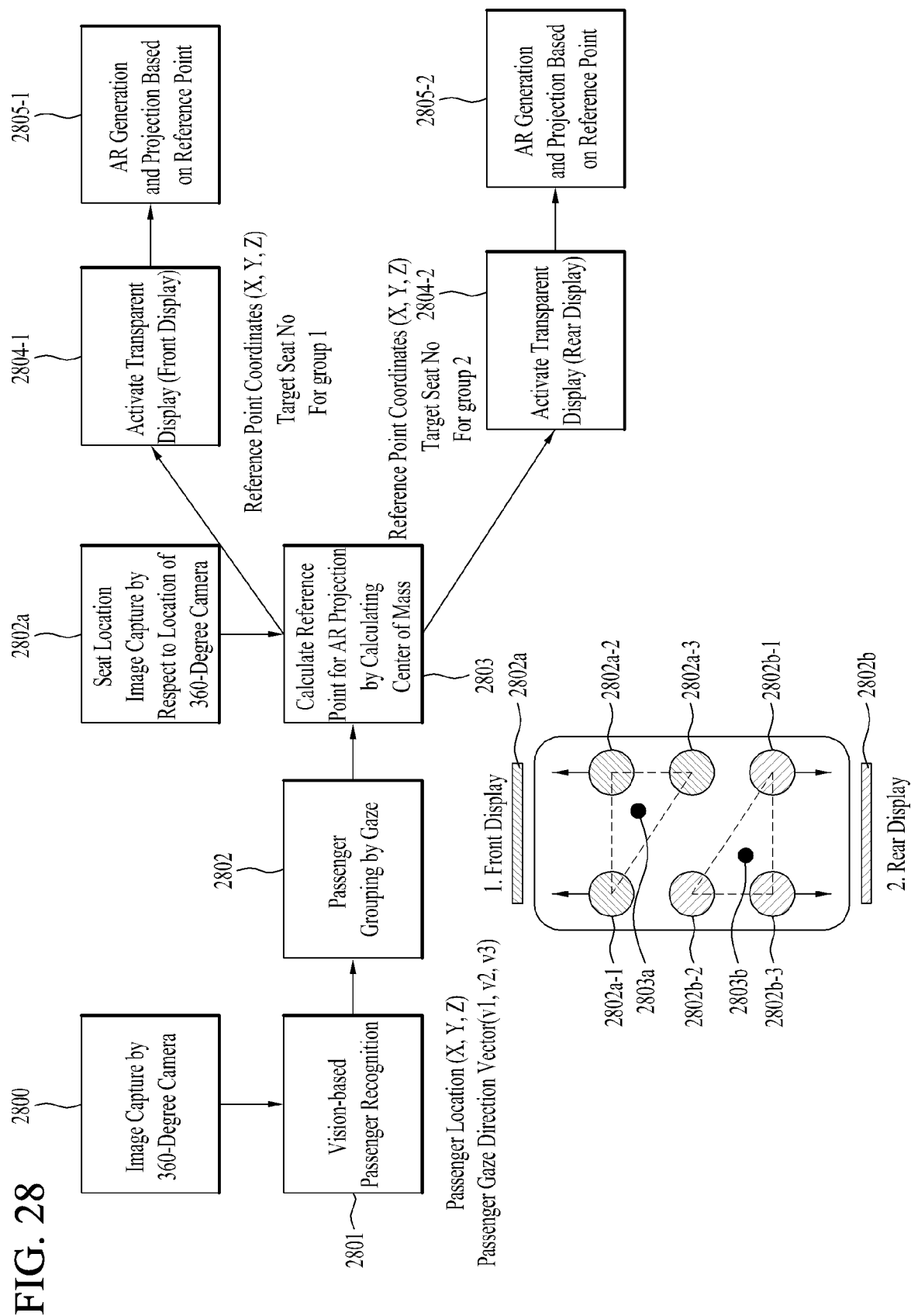
FIG. 28 illustrates a control method of an AR mobility device (or an AR mobility control device) according to an embodiment.

FIG. 28 illustrates a control method of an AR mobility device (or an AR mobility control device) according to an embodiment.

FIG. 28 shows an algorithm flowchart of an AR mobility device (or an AR mobility control device) according to embodiments.

Specifically, FIG. 28 illustrates a procedure in which an AR mobility device according to embodiments calculates a reference point for displaying an AR object (or AR component) according to embodiments for users, and displays the AR component on the display based on the reference point.

In 360-degree camera image capturing 2800, the inside of the AR mobility is photographed using one or more cameras in the AR mobility according to the embodiments. That is, the AR mobility according to the embodiments may generate image data (or video data) by photographing one or more passengers (or occupants) inside the AR mobility using the camera according to the embodiments (S2800). The camera according to the embodiments may be the 360-degree RGB camera described above with reference to FIG. 27, or may be a wide-angle camera, a 360-degree camera, a special camera, or an around view camera. The AR mobility according to the embodiments may include a plurality of cameras to extract the exact locations and gaze direction of the passengers.

In vision-based passenger recognition 2801, the AR mobility according to the embodiments may recognize one or more passengers (users). In other words, the AR mobility according to the embodiments may recognize one or more passengers through a controller (or passenger location calibrator) according to embodiments (2801). The controller or the passenger location calibrator may receive the image or video data captured by the camera described above, and recognize one or more photographed passengers in the image or image data. In this case, the controller or the passenger location calibrator may recognize the locations of the passengers and extract location information about each passenger (e.g., coordinate values of (X, Y, Z)). In addition, the controller or the passenger location calibrator may recognize the passengers and extract gaze direction information about each passenger (e.g., (v1, v2, v3) vector coordinate values). In addition, the locations of the seats may be obtained by sensors present in the seats.

In the vision-based passenger recognition 2801, information about the locations of one or more passengers (or the locations of the seats inside the AR mobility) and/or information about the gaze directions (or the directions of the seats inside the AR mobility) of one or more passengers may be extracted based on the image data or video data about the inside of the AR mobility captured by the camera. The locations of the seats may be obtained by sensors present in the seats.

The location information and/or gaze direction information about each passenger may be extracted through an image recognition method (or an image processing method). Also, the location information and/or gaze direction information about each passenger may be extracted by one or more cameras. In other words, the gaze direction of each passenger and the location of each passenger may be extracted based on the image data and/or video data generated from one or more cameras. Here, the gaze direction information about the users may refer to directions in which the users are actually looking, or directions in which seats related to the users are positioned (for example, a direction for each of the seats where the users are sitting). In addition, the locations of the seats may be obtained by sensors present in the seats.

For example, an AR mobility device (or an AR mobility control device) 2802-1 according to embodiments may include a display including a front display 2802a and/or a rear display 2802b. In addition, inside the AR mobility device according to the embodiments, there may be a plurality of passengers 2802a-1, 2802a-2, and 2802a-3 looking toward the front display (or in a direction similar to the direction in which the passengers view the front display), and a plurality of passengers 2802b-1, 2802b-2, and 2802b-3 looking toward the rear display described above (or in a direction similar to the direction in which the passengers view the rear display).

Here, in the vision-based passenger recognition 2801, the plurality of passengers 2802a-1 to 2802a-3 and/or 2802b-1 to 2802b-3 may be recognized based on the image data (or video data) about the inside of the AR mobility captured by the camera of the AR mobility. In the vision-based passenger recognition 2801, the gaze direction information and/or location information about the plurality of passengers described above may be extracted using the above-described image data (or video data). Thereafter, in gaze-specific passenger grouping 2802, the plurality of passengers may be grouped based on the information about the information about the gaze directions described above. For example, passengers looking at the front display (that is, passengers gazing at the front display or in a direction similar to the direction of the front display) may have passengers 2801a-1, 2802a-2, and 2802a-3. Thus, an AR mobility device (or an AR mobility control device) according to embodiments may group these three passengers into one group (or a first group). Similarly, passengers looking at the rear display (that is, passengers gazing at the rear display or in a direction similar to the direction of the rear display) may be passengers 2801b-1, 2802b-2, and 2802b-3 passengers and may be grouped into a second group.

In calculation 2803 of a reference point of AR projection by calculating the center of mass, a reference point may be calculated for each of the above-mentioned groups based on the location information about the passengers of each group. Here, the reference point may refer to a reference point for displaying an AR object on a display (or a display area or display unit) viewed by users (occupants) belonging to each group. Therefore, when the users are grouped into a plurality of groups, the AR mobility control device according to the embodiments may calculate reference points as many as the number of groups. The calculation 2803 of a reference point of AR projection by calculating the center of mass may be performed by a controller and/or a passenger location calibrator according to embodiments. In addition, in the calculation 2803 of a reference point of AR projection by calculating the center of mass, the reference point may be determined as a center of mass value, but may not be necessarily limited to the center of mass.

Here, data of a seat location (X, Y, Z) with respect to the location of the 360-degree camera may be used in calculating the reference point (2802). That is, the AR mobility control device according to the embodiments may calculate the reference point based on the location information (e.g., (X, Y, Z) coordinates) about the seats in the AR mobility instead of the location information about the passengers.

The reference point may be determined as a representative value according to embodiments. Here, the representative value may refer to a value representing the reference point, which is determined based on the coordinate values corresponding to the location information about the users. As an example, the representative value may be a value for the center of mass calculated based on the coordinate values corresponding to the location information about the users. As another example, the representative value may be determined as one of the coordinate values corresponding to the location information about the users. As another example, the representative value may refer to an outer center, an incenter, a center of mass, an excenter, and/or an orthocenter of a triangular figure formed by three coordinates among the coordinate values corresponding to the location information about the users. As another example, the representative value may be determined as a coordinate value of one point among all points present in the circular figure formed by the three coordinate values described above. As another example, the representative value may be a point of internal division and/or a point of external division formed by two coordinate values among the coordinate values corresponding to the location information about the users.

For the first group, transparent display (front display) activation 2804-1 may represent activating the display to display an AR object corresponding to the display viewed by the passengers belonging to the first group among the plurality of groups.

In AR generation and projection 2805-1 based on the reference point, the AR mobility control device according to the embodiments may display the above-described AR object based on the coordinates (e.g., (X, Y, Z) coordinates) of a reference point (i.e., a first reference point) for the first group. That is, the AR object related to an object present outside the AR mobility may be displayed in an area in which the above-described object is projected on the display, based on the first reference point calculated as described above.

For the second group, transparent display (rear display) activation 2804-2 may represent activating the display to display an AR object corresponding to the display viewed by the passengers belonging to the second group among the plurality of groups.

In AR generation and projection 2805-2 based on the reference point, the AR mobility control device according to the embodiments may display the above-described AR object based on the coordinates (e.g., (X, Y, Z) coordinates) of a reference point (i.e., a second reference point) for the second group. That is, the AR object related to an object present outside the AR mobility may be displayed in an area in which the above-described object is projected on the display, based on the second reference point calculated as described above.

In the example above, for example, passengers 2802a-1, 2802a-2, and 2802a-3 may be grouped into a first group by a controller (or passenger location calibrator) according to embodiments. In addition, passengers 2802b-1, 2802b-2, 2802b-3 may be grouped into a second group by the controller (or passenger location calibrator). Accordingly, the controller (or the passenger location calibrator) may calculate a first reference point 2803a based on the location information about the passengers 2801a-1, 2801a-2, and 2801a-3 belonging to the first group. The first reference point may refer to a reference point for displaying an object present outside the front display (or the AR mobility device according to the embodiments) on the front display. That is, the AR object related to the above-described object may be displayed in an area where the above-described object is projected on the front display, based on the first reference point calculated as described above.

Similarly, the controller (or the passenger location calibrator) may calculate a second reference point 2803b based on the location information about the passengers belonging to the second group. The second reference point may refer to a reference point for displaying an object present outside the rear display (or the AR mobility device according to the embodiments) on the front display. That is, the AR object related to the above-described object may be displayed in an area in which the object is projected on the rear display, based on the second reference point calculated as described above.

The reference point according to the embodiments may be a center of mass value for the location information about the passengers belonging to the corresponding group. Alternatively, the reference point may be location information about one passenger among the passengers belonging to the group. As another example, the reference point according to the embodiments may be present within an area generated based on the location information about the passengers belonging to the group.

Accordingly, an AR mobility control device according to embodiments may include a camera configured to photograph one or more users to generate image data, a controller configured to extract information about one or more users from the image data, a calibrator configured to calculate a reference point for projection of an AR object based on location information about the users, and a display configured to display the AR object based on the calculated reference point. Here, the information about one or more users may include location information about the users.

In addition, a method of controlling an AR mobility device according to embodiments may include photographing one or more users by a camera and generating image data, extracting information about one or more users from the image data, calculating a reference point for projection of an AR object based on location information about the users, and displaying the AR object on a display based on the calculated reference point. Here, the information about one or more users may include location information about the users.

Here, the information about the one or more users may further include gaze direction information about the one or more users, wherein the AR mobility device control method (or the controller and/or the passenger location calibrator) may further include grouping the one or more users into at least one group according to the gaze direction information about the one or more users before calculating the reference point, wherein the reference point may be determined based on the location information about the at least one user included in a first group of the group.

This configuration may allow the AR mobility device control method and/or the AR mobility device according to the embodiments to effectively eliminate the effect of a mismatch between the AR object and an external object while displaying the AR object on the display for the users.

This configuration may allow the AR mobility device control method and/or the AR mobility device according to the embodiments to prevent a mismatch between an AR object presented by a display and an external object using the gaze information about each of the users (or seats) even when the gazes of the user are changed or the viewing directions of the users are different from each other.

This configuration may allow the AR mobility device control method and/or the AR mobility device according to the embodiments to quickly calculate a reference point for reducing mismatch by pre-storing the pre-calibration position.

Figure 29:
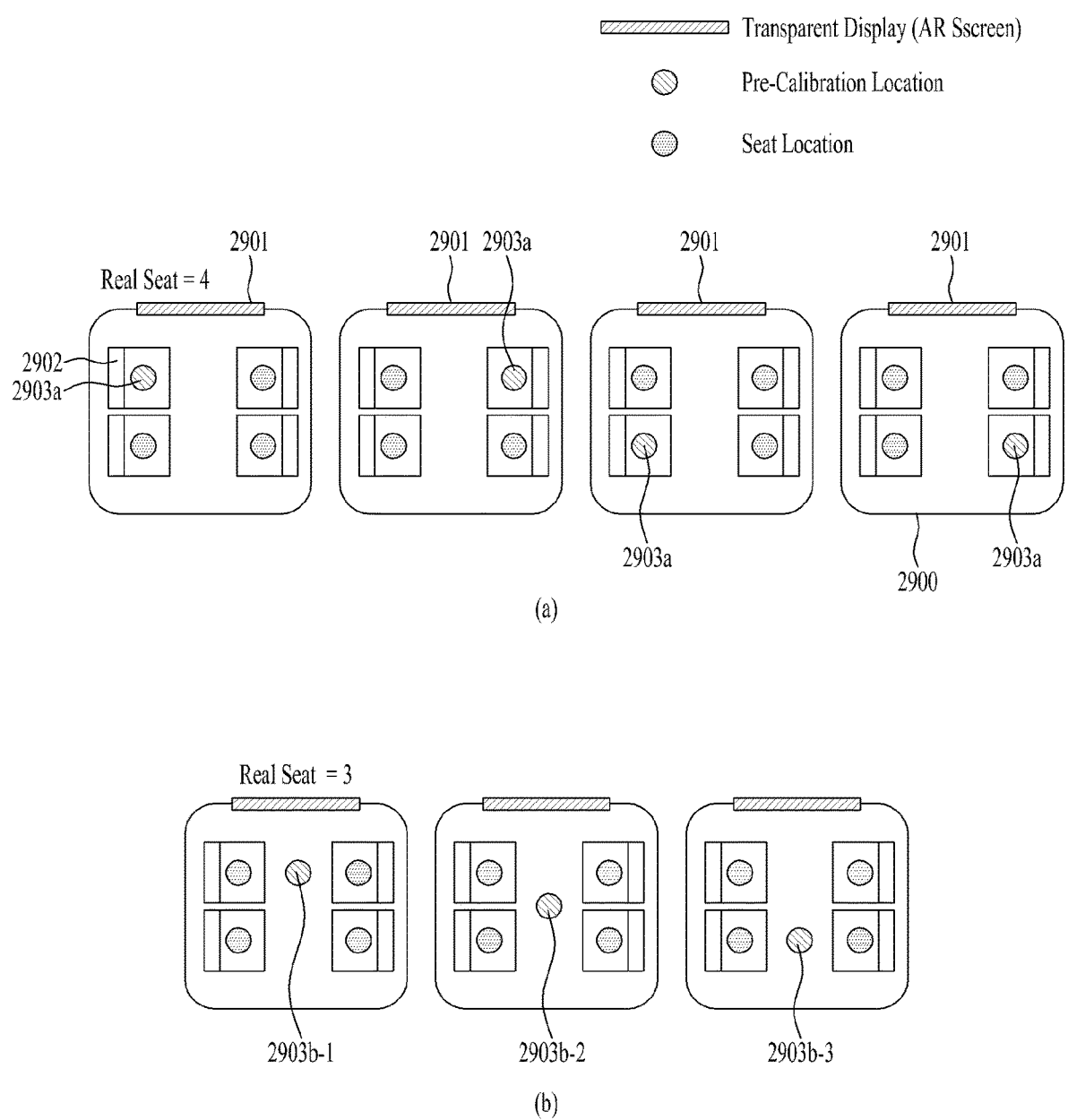
FIG. 29 illustrates a procedure of generating a reference point according to embodiments by an AR mobility control device according to embodiments.

FIG. 29 illustrates a procedure of generating a reference point according to embodiments by an AR mobility control device according to embodiments.

FIG. 29 illustrates a procedure or method of selecting pre-calibration data calculation location.

In the mobility vehicle assembly step, a calibration value may be pre-calculated and stored for each of the following representative locations. Subsequently, in performing real-time calibration while driving, a location that is closest to the current reference point may be read from the pre-stored data and interpolated.

For example, a pre-calibration target location (e.g., four seats) may be pre-calculated and stored in the storage.

FIG. 29(A) illustrates the inside of AR mobility according to embodiments. Specifically, FIG. 29(A) illustrates a method of calculating a reference point according to embodiments by an AR mobility control device according to embodiments.

AR mobility 2900 may include a display 2901 and/or a plurality of seats 2902 according to embodiments.

The display 2901 may display an AR object and/or an object (or a component) according to embodiments. The display may be a transparent display or an AR screen.

A pre-calibration position 2907*a* may represent a reference point according to embodiments. The pre-calibration position may be calculated based on the location information and/or gaze direction information about the passengers present inside the AR mobility device according to the embodiments. The pre-calibration position according to the embodiments may be calculated according to the method described with reference to FIG. 28. Here, the gaze direction information about the users may refer to directions in which the users are actually looking, or directions in which seats related to the users are positioned (for example, a direction for each of the seats where the users are sitting).

According to embodiments, the pre-calibration position 2903*a* may be calculated based on the location information about the occupants. In addition, the pre-calibration position 2903*a* may be calculated based on the location information about the seats that are present inside the AR mobility device according to the embodiments. For example, the pre-calibration position 2903*a* may be one of the locations for a plurality of seats. For example, when the AR mobility has four seats including an upper left seat, a lower left seat, an upper right seat and/or a lower right seat, the calibration position may be one of the locations for the four seats.

FIG. 29(B) illustrates the inside of AR mobility according to embodiments. Specifically, FIG. 29(B) illustrates another method of calculating a reference point according to embodiments by an AR mobility control device according to embodiments.

That is, according to embodiments, the pre-calibration position 2903*b* may be calculated based on the location information about the seats that are present inside the AR mobility device according to the embodiments. For example, the pre-calibration position 2903*b* may be a point that is determined based on one or more of the locations for the plurality of seats. For example, when the AR mobility has four seats including an upper left seat, a lower left seat, an upper right seat and/or a lower right seat, the calibration position may be a midpoint 2803*b*-1 between the upper left seat and the upper right seat, a midpoint 2803*b*-2 of all four seats, or a midpoint 2803*b*-3 between the lower left seat and the lower right seat.

According to embodiments, the pre-calibration position may be stored in the AR mobility device according to the embodiments. That is, the AR mobility device according to the embodiments may further include a storage configured to store the above-described pre-calibration position (i.e., the reference point).

The reference point may be determined as a representative value according to embodiments. Here, the representative value may refer to a value representing the reference point, which is determined based on the coordinate values corresponding to the location information about the users. As an example, the representative value may be a value for the center of mass calculated based on the coordinate values corresponding to the location information about the users. As another example, the representative value may be determined as one of the coordinate values corresponding to the location information about the users. As another example, the representative value may refer to an outer center, an incenter, a center of mass, an excenter, and/or an orthocenter of a triangular figure formed by three coordinates among the coordinate values corresponding to the location information about the users. As another example, the representative value may be determined as a coordinate value of one point among all points present in the circular figure formed by the three coordinate values described above. As another example, the representative value may be a point of internal division and/or a point of external division formed by two coordinate values among the coordinate values corresponding to the location information about the users.

Accordingly, an AR mobility control device according to embodiments may include a camera configured to photograph one or more users to generate image data, a controller configured to extract information about one or more users from the image data, a calibrator configured to calculate a reference point for projection of an AR object based on location information about the users, and a display configured to display the AR object based on the calculated reference point. Here, the information about one or more users may include location information about the users.

In addition, a method of controlling an AR mobility device according to embodiments may include photographing one or more users by a camera and generating image data, extracting information about one or more users from the image data, calculating a reference point for projection of an AR object based on location information about the users, and displaying the AR object on a display based on the calculated reference point. Here, the information about one or more users may include location information about the users.

Here, the AR object may represent information related to an object outside of the AR mobility. The AR object may be displayed on a first area of the display, which is an area where the object is projected on a first display with respect to a reference point, or a second area of the display, which is an area for displaying information related to the first area.

This configuration may allow the AR mobility device control method and/or the AR mobility device according to the embodiments to effectively eliminate the effect of a mismatch between the AR object and an external object while displaying the AR object on the display for the users.

This configuration may allow the AR mobility device control method and/or the AR mobility device according to the embodiments to prevent a mismatch between an AR object presented by a display and an external object using the gaze information about each of the users (or seats) even when the gazes of the user are changed or the viewing directions of the users are different from each other.

In addition, this configuration may allow the AR mobility device control method and/or the AR mobility device according to the embodiments to quickly calculate a reference point for reducing mismatch by pre-storing the pre-calibration position.

Figure 30:
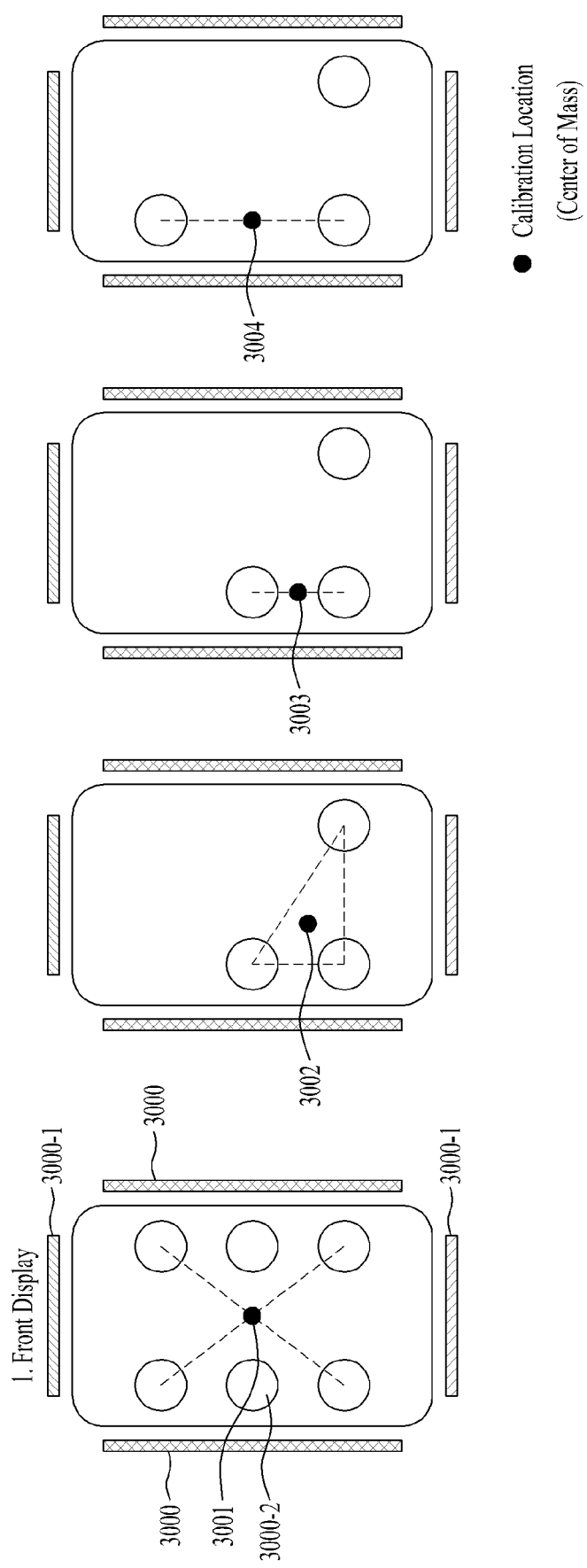
FIG. 30 illustrates a method of calculating a reference point according to embodiments by an AR mobility control device according to embodiments.

FIG. 30 illustrates a method of calculating a reference point according to embodiments by an AR mobility control device according to embodiments.

FIG. 30 illustrates a method of determining locations of passengers and setting a reference point in a case where all passengers look forward.

The front display may be activated. A 360-degree camera on the ceiling may detect the distribution of passengers and set the center of mass point in the space as a calibration reference point. The center of mass of the passenger population may be set to minimize matching errors.

In addition, scenarios may be applied when the front/rear/side displays are each activated.

Specifically, FIG. 30 illustrates a method of calculating a reference point (or calibration position) 3001, 3002, 3003, 3004 according to embodiments by an AR mobility control device according to embodiments. The AR mobility control device (or AR mobility device) according to the embodiments may include displays 3000 and 3000-1 according to embodiments. In the figure, it is assumed that one or more passengers (or seats) 3000-2 are present inside AR mobility according to the embodiments.

The procedure of calculating the reference point (or calibration position) described in FIG. 30 may be performed by a controller and/or a calibrator (or a passenger location calibrator) according to embodiments.

The display 3000 may display an AR object and/or an object (or a component) according to embodiments. The display may include a front display 3000-1. In FIG. 30, it is assumed that the gaze directions (or seat orientations) for the occupants (or seats) are directed to the front display (or the occupants (or seats) are grouped into the same group as described above in FIG. 28, even if the gaze directions (or seat orientations) are not directed to the front display).

In FIG. 30, it is assumed that one or more passengers or seats 3000-2 face the front display (or grouped into the same group as described above in FIG. 28, even if they do not face the front display). Information about the locations of one or more passengers or seats 3000-2 and/or information about the gaze directions may be extracted based on the image data (or video data) captured by a camera of the AR mobility according to embodiments. Alternatively, the information about the locations of one or more passengers or seats 3000-2 and/or information about the gaze directions may be pre-stored in a storage in the AR mobility according to the embodiments.

The calibration position 3001 according to embodiments may be calculated based on the location information about some or all of the users in the AR mobility (or the locations of some or all of the seats present in the AR mobility). For example, as shown in FIG. 30, three passengers (or three seats) may be present on the upper left, middle left, and lower left sides, respectively, and three passengers (or three seats) may be present on the upper right, middle right, and lower right sides, respectively, in the AR mobility. In this case, the calibration position may be calculated based on the information about all or part of the locations of the six passengers (or six seats) (e.g., the location information about passengers or seats on the upper left, lower left, upper right and/or lower right sides). The calculated calibration position may be the median or center of mass of the location information about all or part of the passengers (or seats), or may be calculated as the location of one passenger (or seat) of the above-mentioned passengers (or seats). Here, the locations of the seats may be obtained by sensors present in the seats.

According to other embodiments, for example, there may be two passengers (or two seats) on the middle left and lower left sides in the AR mobility, one passenger (or one seat) may be present on the lower right side in the AR mobility. In this case, a calibration position 3002 may be calculated based on the location information about the three (or three seats). The calculated calibration position may be the median or the center of mass 3002 of the location values of the three (or three seats) described above, or may be calculated as the location of one of the passengers (or seats) described above.

According to other embodiments, for example, two passengers (or two seats) may be present only on the lower left and middle left sides in AR mobility, as shown in FIG. 30. In this case, a calibration position 3002 may be calculated as the center of the locations of the two passengers (or two seats). The calculated calibration position may be the median of the location values of the two passengers (or two seats) described above, or may be calculated as the location of one of the passengers (or seats).

According to other embodiments, for example, two passengers (or two seats) may be present only on the upper left and lower left sides in AR mobility, as shown in FIG. 30. In this case, a calibration position 3004 may be may be calculated as the center of the locations of the two passengers (or two seats). The calculated calibration position may be the median of the location values of the two passengers (or two seats) described above, or may be calculated as the location of one of the passengers (or seats).

Here, projecting an AR object may mean displaying the AR object on the display. In addition, projecting an AR object based on the reference point may mean displaying the AR object in a display area in which an object POI present outside the AR mobility device is projected on the display according to the embodiments (or an area related to the display area for the projection), based on the reference point described above.

Accordingly, the AR mobility control device according to the embodiments may include a camera configured to photograph one or more users to generate image data, a controller (control unit) configured to extract information about one or more users from the image data, a calibrator (calibration unit) configured to calculate a reference point for projection of an AR object based on location information about the users, and a display configured to display the AR object based on the calculated reference point. Here, the information about one or more users may include location information about the users.

In addition, a method of controlling an AR mobility device according to embodiments may include photographing one or more users by a camera and generating image data, extracting information about one or more users from the image data, calculating a reference point for projection of an AR object based on location information about the users, and displaying the AR object on a display based on the calculated reference point. Here, the information about one or more users may include location information about the users.

Here, the AR object may represent information related to an object outside of the AR mobility. The AR object may be displayed on a first area of the display, which is an area where the object is projected on a first display with respect to a reference point, or a second area of the display, which is an area for displaying information related to the first area.

Here, the camera may be a 360-degree camera, and the reference point may be a representative value determined based on the coordinate values for the one or more users included in the location information about the users.

The representative value according to the embodiments may refer to a value representing the reference point, which is determined based on the coordinate values corresponding to the location information about the users. As an example, the representative value may be a value for the center of mass calculated based on the coordinate values corresponding to the location information about the users. As another example, the representative value may be determined as one of the coordinate values corresponding to the location information about the users. As another example, the representative value may refer to an outer center, an incenter, a center of mass, an excenter, and/or an orthocenter of a triangular figure formed by three coordinates among the coordinate values corresponding to the location information about the users. As another example, the representative value may be determined as a coordinate value of one point among all points present in the circular figure formed by the three coordinate values described above. As another example, the representative value may be a point of internal division and/or a point of external division formed by two coordinate values among the coordinate values corresponding to the location information about the users.

This configuration may allow the AR mobility device control method and/or the AR mobility device according to the embodiments to effectively eliminate the effect of a mismatch between the AR object and an external object while displaying the AR object on the display for the users.

This configuration may allow the AR mobility device control method and/or the AR mobility device according to the embodiments to prevent a mismatch between an AR object presented by a display and an external object using the gaze information about each of the users (or seats) even when the gazes of the user are changed or the viewing directions of the users are different from each other.

With the AR mobility device control method and/or the AR mobility device according to the embodiments, the amount of computation required to display (or calibrate) an AR object on the display may be reduced by determining a representative value as a reference point based on information about the locations of one or more users.

With the AR mobility device control method and/or the AR mobility device according to the embodiments, a reference point for reducing mismatch may be quickly calculated by pre-storing the pre-calibration position.

Figure 31:
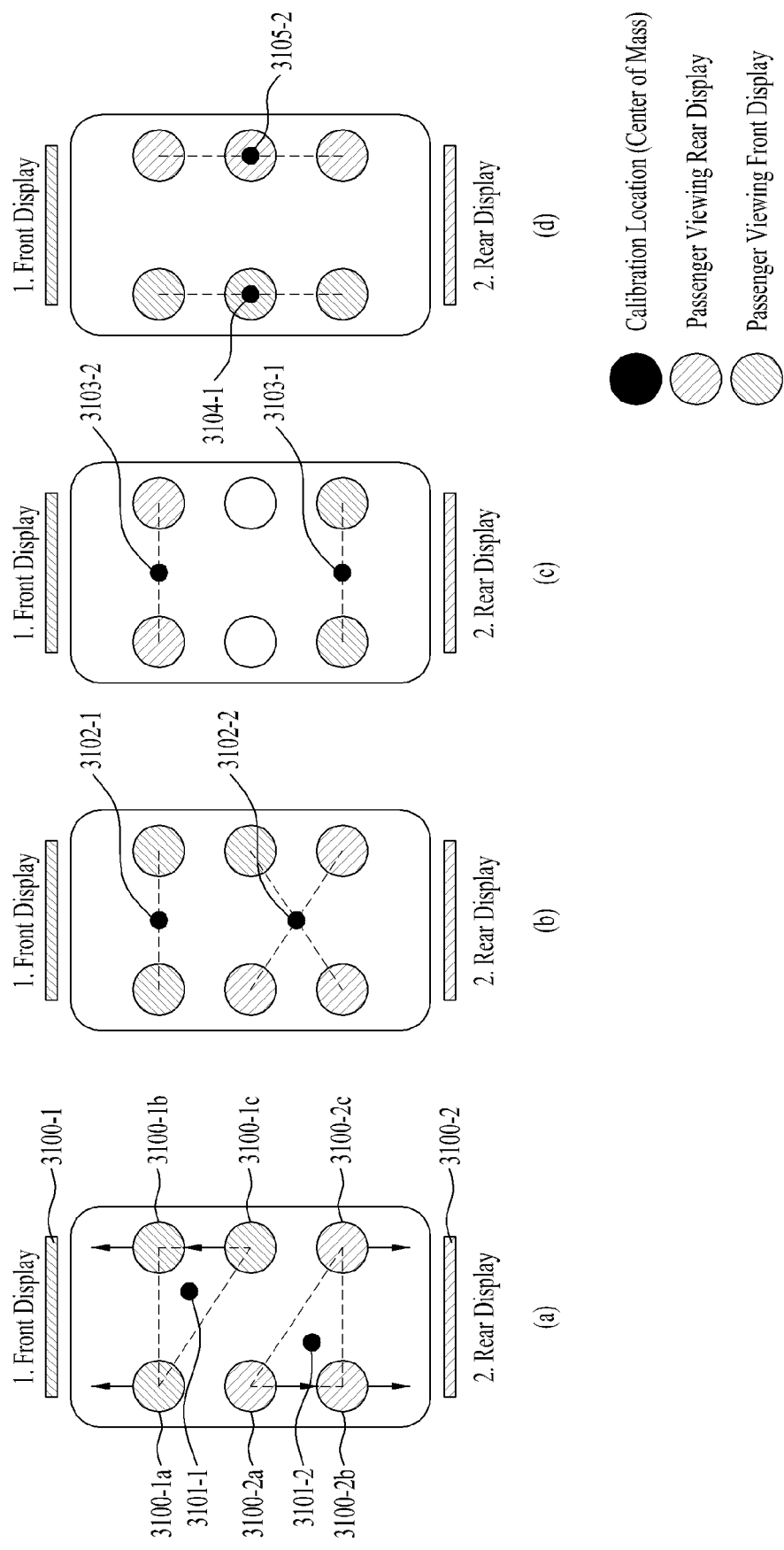
FIG. 31 illustrates a method of calculating reference points grouped into each group according to embodiments by an AR mobility control device according to embodiments.

FIG. 31 illustrates a method of calculating reference points grouped into each group according to embodiments by an AR mobility control device according to embodiments.

That is, FIG. 31 illustrates a method of determining locations of passengers and setting a reference point in a case where the passengers look in different directions.

When the front and rear displays are activated, the 360-degree camera on the ceiling may group passengers by viewing directions, and set the center of mass of each group as a calibration reference point of the corresponding display.

Specifically, FIG. 31 illustrates a method of grouping one or more passengers in AR mobility into two groups and calculating a reference point for each of the two groups according to embodiments.

The AR mobility of FIG. 31 according to embodiments may include a front display 3100-1 and/or a rear display 3100-2. The front display and/or the rear display may refer to a display according to embodiments. There may be one or more passengers (or seats) inside the AR mobility according to the embodiments of FIG. 31. In FIG. 31, there may be passengers (or seats) on the upper left 3100-1a, the left center 3100-2a, the lower left 3100-2b, the upper right 3100-1b, the right center 3100-1c, and the lower right 3100-2c.

In FIG. 31, an operation of separating the six passengers (or six seats) in the AR mobility into two groups may be performed by a controller and/or a passenger location calibrator (or a calibrator) according to embodiments. In addition, the operation of calculating each reference point (or calibration position) for each of the two separate groups may be performed by the controller and/or the passenger location calibrator.

Here, projecting an AR object may mean displaying the AR object on the display. In addition, projecting an AR object based on the reference point may mean displaying the AR object in a display area in which an object POI present outside the AR mobility device is projected on the display according to the embodiments (or an area related to the display area for the projection), based on the reference point described above.

FIG. 31(A) illustrates an operation of classifying six passengers (or six seats) in the AR mobility into two groups and calculating a reference point for each of the groups. In the example of FIG. 31(A), the upper left passenger (or seat) 3100-1a, the upper right passenger (or seat) 3100-1b, and the right center passenger (or seat) 3100-1c face the front display according to the embodiments, and the left center passenger (or seat) 3100-2a, the lower left passenger (or seat) 3100-2b, and the lower right passenger (or seat) 3100-2c face the rear display according to the embodiments.

Herein, the controller and/or the passenger location calibrator according to the embodiments may extract information about the gaze direction of the upper left passenger (or seat) 3100-1a, the upper right passenger (or seat) 3100-1b, and the right center passenger (or seat) 3100-1c to group the passengers into a first group. Similarly, the controller and/or the passenger location calibrator according to the embodiments may extract information about the gaze direction of the left center passenger (or seat) 3100-2a, the lower left passenger (or seat) 3100-2b, and the lower right passenger (or seat) 3100-2c to group the passengers into a second group.

Then, the controller and/or the passenger location calibrator according to the embodiments may calculate a first reference point 3101-1 corresponding to the first group based on the location information about the three passengers (or three seats) included in the first group. Similarly, the controller and/or the passenger location calibrator according to the embodiments may calculate a second reference point 3101-2 corresponding to the second group based on the location information about the three passengers (or three seats) included in the second group. The first reference point and the second reference point may refer to reference points calculated according to the method of calculating a reference point according to the above-described embodiments. For example, the first reference point and the second reference point may be determined as center of mass values of the location information about the occupants (seats) included in the first group and the second group.

When the first reference point and the second reference point are determined, the front display according to the embodiments may display, on the front display, an AR object related to an object outside the AR mobility, based on the first reference point. The AR object may be displayed in a partial area of the front display on which the object is projected or in an area related to the corresponding area, based on the first reference point. Similarly, the rear display according to the embodiments may display, on the rear display, an AR object related to an object (or another object) outside the AR mobility, based on the second reference point.

FIG. 31(B) illustrates another embodiment of an operation of classifying six passengers (or six seats) in the AR mobility into two groups and calculating a reference point for each of the groups. In the example of FIG. 31(B), the upper left passenger (or seat) 3100-1a and the upper right passenger (or seat) 3100-1b face the front display according to the embodiments, and the right center passenger (or seat) 3100-1c, the left center passenger (or seat) 3100-2a, the lower left passenger (or seat) 3100-2b, and the lower right passenger (or seat) 3100-2c face the rear display according to the embodiments.

Similarly, in FIG. 31(B), the controller and/or the calibrator according to the embodiments may classify the upper left passenger (or seat) 3100-1a and the upper right passenger (or seat) 3100-1b into a first group, and classify the other passengers into a second group. In addition, the controller and/or the calibrator may calculate a first reference point 3102-1 corresponding to the first group and/or a second reference point 3102-2 corresponding to the second group. When the first reference point and the second reference point are determined, the front display according to the embodiments may display, on the front display, an AR object related to an object outside the AR mobility, based on the first reference point. Similarly, the rear display according to the embodiments may display, on the rear display, an AR object related to an object (or another object) outside the AR mobility, based on the second reference point.

FIG. 31(C) illustrates another embodiment of an operation of classifying four passengers (or six seats) in the AR mobility into two groups and calculating a reference point for each of the groups. In the example of FIG. 31(C), the upper left passenger (or seat) 3100-1a and the upper right passenger (or seat) 3100-1b face the rear display according to the embodiments, and the lower left passenger (or seat) 3100-2b and the lower right passenger (or seat) 3100-2c face the rear display according to the embodiments.

In this case, when there are seats at the right center 3100-1c and the left center 3100-2a but there are no passengers (or there are neither seats nor passengers), the corresponding locations may not be considered in calculating reference points according to the embodiments.

That is, the controller and/or the calibrator may classify the upper left passenger (or seat) 3100-1a and the upper right passenger (or seat) 3100-1b into a second group, and the lower left passenger (or seat) 3100-2b and the lower right passenger (or seat) 3100-2c into a first group. In addition, the controller and/or the calibrator may calculate a first reference point 3103-1 corresponding to the first group and/or a second reference point 3103-2 corresponding to the second group. When the first reference point and the second reference point are determined, the front display according to the embodiments may display, on the front display, an AR object related to an object outside the AR mobility, based on the first reference point. Similarly, the rear display according to the embodiments may display, on the rear display, an AR object related to an object (or another object) outside the AR mobility, based on the second reference point.

FIG. 31(D) illustrates another embodiment of an operation of classifying six passengers (or six seats) in the AR mobility into two groups and calculating a reference point for each of the groups. In the example of FIG. 31(D), the upper left passenger (or seat) 3100-1a, the left center passenger (or seat) 3100-2a, and the lower left passenger (or seat) 3100-2b face the front display according to the embodiments, and the upper right passenger (or seat) 3100-1b, the right center passenger (or seat) 3100-1c, and the lower right passenger (or seat) 3100-2c face the rear display according to the embodiments.

Even in this case, the controller and/or the calibrator classify the three passengers (or seats) on the left side into a first group and calculate a first reference point 3104-1 corresponding to the first group. It may calculate a second reference point in a similar manner. When the first reference point and the second reference point are determined, the front display according to the embodiments may display, on the front display, an AR object related to an object outside the AR mobility, based on the first reference point. Similarly, the rear display according to the embodiments may display, on the rear display, an AR object related to an object (or another object) outside the AR mobility, based on the second reference point.

Accordingly, an AR mobility control device according to embodiments may include a camera configured to photograph one or more users to generate image data, a controller configured to extract information about one or more users from the image data, a calibrator configured to calculate a reference point for projection of an AR object based on location information about the users, and a display configured to display the AR object based on the calculated reference point. Here, the information about one or more users may include location information about the users.

In addition, a method of controlling an AR mobility device according to embodiments may include photographing one or more users by a camera and generating image data, extracting information about one or more users from the image data, calculating a reference point for projection of an AR object based on location information about the users, and displaying the AR object on a display based on the calculated reference point. Here, the information about one or more users may include location information about the users.

Here, the information about the one or more users may further include gaze direction information about the one or more users, wherein the AR mobility device control method (or the AR mobility device) may further include grouping the one or more users into at least one group according to the gaze direction information about the one or more users before calculating the reference point, wherein the reference point may be determined based on the location information about the at least one user included in a first group of the group.

This configuration may allow the AR mobility device control method and/or the AR mobility device according to the embodiments to effectively eliminate the effect of a mismatch between the AR object and an external object while displaying the AR object on the display for the users.

This configuration may allow the AR mobility device control method and/or the AR mobility device according to the embodiments to prevent a mismatch between an AR object presented by a display and an external object using the gaze information about each of the users (or seats) even when the gazes of the user are changed or the viewing directions of the users are different from each other.

With the AR mobility device control method and/or the AR mobility device according to the embodiments, the amount of computation required to display (or calibrate) an AR object on the display may be reduced by determining a representative value as a reference point based on information about the locations of one or more users.

With the AR mobility device control method and/or the AR mobility device according to the embodiments, a reference point for reducing mismatch may be quickly calculated by pre-storing the pre-calibration position.

With this configuration, the AR mobility device control method and/or the AR mobility device according to the embodiments may allow users to intuitively interact with an object present outside the AR mobility. In addition, with such a configuration, the AR mobility device control method and/or the AR mobility device according to the embodiments may intuitively provide users with road travel related information or information about a destination.

Figure 32:
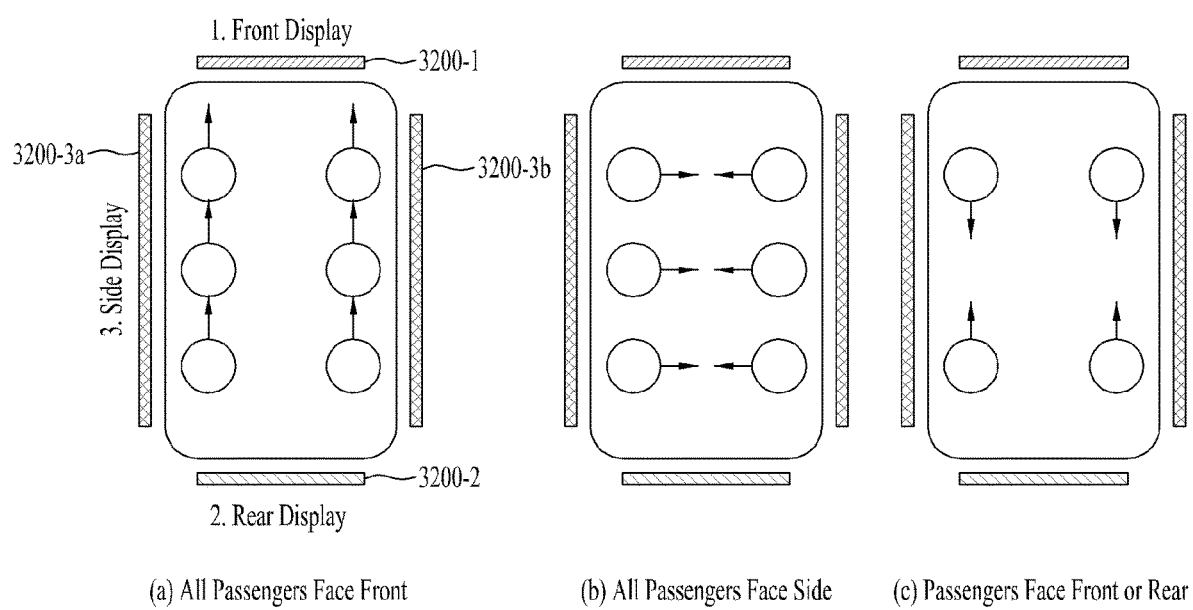
FIG. 32 illustrates a method of using a display according to a passenger location by an AR mobility control device according to embodiments.

FIG. 32 illustrates a method of using a display according to a passenger location by an AR mobility control device according to embodiments.

This figure illustrates an embodiment of different roles of transparent displays according to the passenger locations. When multiple viewers (multiple passengers) share one display, the display according to the embodiments may use the front display 1, the rear display 2, or a display B-3 (the side display in a case where all passengers face a side) as a shared display. When one viewer (one passenger) monopolizes one display, a display A-3 (the side display in a case where all passengers looks forward) may be used as an exclusive display.

Specifically, FIG. 32 illustrates an embodiment of a method of using a display according to the locations and gaze direction of the passengers present inside AR mobility according to embodiments. In FIG. 32, the display may include a front display 3200-1, side displays 3200-3a and 3200-3b, and a rear display 3200-2. The side displays according to the embodiments may include a left display 3200-3a and a right display 3200-3b according to the embodiments.

FIG. 32(A) illustrates that all passengers (or seats) present inside the AR mobility face the front display (or one of the displays according to the embodiments).

According to embodiments, where all passenger(s) face the front display (or all seats face the front display), a reference point (or calibration position) according to the embodiments may be calculated based on all or part of the location information about the passengers (or seats). Here, the reference point may refer to a point used as a reference for displaying an AR object on the front display according to the embodiments. That is, the reference point (or calibration position) may refer to a point used as a reference for displaying an AR object related to an object present outside the AR mobility on the front display. Thus, based on the calibration position, the above-described AR object may be displayed in a first area in which the above-described object is projected on the front display. Alternatively, the AR object may be displayed near the first area described above, or may be displayed in a second area related to and different from the first area.

Here, the shared display (or shared display area) may refer to a display (or a partial area of the display) shared by one or more passengers (occupants). That is, when multiple passengers share one display (or a partial area of the display), the display may be referred to as a shared display (or partial area of the display). Thus, the shared display may refer to a display viewed by at least two passengers. An AR object (or component) displayed on the shared display may be called a shared AR object.

Here, the exclusive display (or exclusive display area) may refer to a display (or a partial area of the display) used by only one passenger. When one passenger monopolizes one display (or a partial area of the display), that display (or the area) may be referred to as an exclusive display (or exclusive display area). An AR object (or component) displayed on the exclusive display (or exclusive display area) may be referred to as an exclusive AR object. The exclusive display may not be limited to a partial area or some displays of the display present inside the AR mobility. That is, the exclusive display may refer to a display in a personal terminal by which the above-mentioned information is received from the server.

Accordingly, in FIG. 32(A), the front display may be referred to as a shared display. This is because all occupants (or users) in the AR mobility share the front display. That is, the front display is a shared display because it is a display viewed by at least two users (occupants) in the AR mobility.

Here, the left display, the right display, and/or the rear display of FIG. 32(A) may be used as exclusive displays for users, or may provide exclusive display areas, respectively. For example, the seat of a passenger located at the lower left of FIG. 32(A) faces the front display and the seats of all the occupants in the AR mobility face the front display. Accordingly, the front display may be used as a shared display. In addition, the passenger located at the lower left of FIG. 32(A) may use a portion or the entirety of the area of the left display 3200-3*a* as an exclusive display for displaying an exclusive AR object related only with the passenger.

FIG. 32(B) illustrates that the passenger(s) belonging to the first group among the passengers present in the AR mobility face the right display 3200-3*b* according to the embodiments, and the passenger(s) belonging to the second group face the left display 3200-3*b* according to the embodiments.

The passengers belonging to the first group of FIG. 32(B) may use the right display as a shared display. In addition, the passengers belonging to the second group may use the left display as a shared display. Thus, the right display may display a shared AR object for the passengers belonging to the first group, and the left display may display a shared AR object for the passengers belonging to the second group.

Here, the front display and/or rear display may be used as an exclusive display for each of the passengers belonging to the first group. That is, the front display and/or rear display may provide an exclusive display area for each of the users belonging to the first group to allow use each of the users to use the exclusive display area as an exclusive display. Similarly, the front display and/or rear display may be used as an exclusive display for each of the passengers belonging to the second group.

FIG. 32(C) illustrates that the passenger(s) belonging to the first group among the passengers present in the AR mobility face the rear display 3200-2 according to the embodiments, and the passenger(s) belonging to the second group face the front display 3200-1 according to the embodiments.

In FIG. 32(C), the passengers belonging to the first group may use the rear display as a shared display. In addition, the passengers belonging to the second group may use the front display as a shared display. Thus, the rear display may display a shared AR object for the passengers belonging to the first group, and the front display may display a shared AR object for the passengers belonging to the second group.

Here, the left display and/or the right display may be used as an exclusive display for each of the passengers belonging to the first group. That is, the left display and/or the right display may provide an exclusive display area for each of the users belonging to the first group such that the users use the exclusive display areas as their exclusive displays. Similarly, the left display and/or the right display may be used as an exclusive display for each of the passengers belonging to the second group.

Accordingly, an AR mobility control device according to embodiments may include a camera configured to photograph one or more users to generate image data, a controller configured to extract information about one or more users from the image data, a calibrator configured to calculate a reference point for projection of an AR object based on location information about the users, and a display configured to display the AR object based on the calculated reference point. Here, the information about one or more users may include location information about the users.

In addition, a method of controlling an AR mobility device according to embodiments may include photographing one or more users by a camera and generating image data, extracting information about one or more users from the image data, calculating a reference point for projection of an AR object based on location information about the users, and displaying the AR object on a display based on the calculated reference point. Here, the information about one or more users may include location information about the users.

Herein, the AR mobility control method (or the AR mobility device) may display an exclusive object representing information related to a first user of one or more users on the display based on the information about the location of the first user.

This configuration may allow the AR mobility device control method and/or the AR mobility device according to the embodiments to prevent a mismatch between an AR object presented by a display and an external object using the gaze information about each of the users (or seats) even when the gazes of the user are changed or the viewing directions of the users are different from each other.

With this configuration, the AR mobility device control method and/or the AR mobility device according to the embodiments may allow users to intuitively interact with an object present outside the AR mobility. In addition, with such a configuration, the AR mobility device control method and/or the AR mobility device according to the embodiments may intuitively provide users with road travel related information or information about a destination.

FIG. 33 illustrates objects displayed on a display of an AR mobility control device (or an AR mobility device) according to embodiments.

FIG. 33(A) illustrates a case where the display according to the embodiments is an opaque display and is used as a shared display. That is, the opaque display may display a shared AR component to be displayed on a shared display. In this case, the opaque display according to the embodiments may output a panoramic view of the surroundings in front of (near) the AR mobility. In addition, the display may display information such as detailed information about nearby facilities and the location of a nearby stop.

FIG. 33(B) illustrates a case where the display according to the embodiments is a transparent display and is used as a shared display. That is, the transparent display may display a shared AR component to be displayed on the shared display.

The transparent display and/or the opaque display according to the embodiment may include an object/distance object 3301 indicating a distance between an object outside the AR mobility device and the AR mobility and/or information about the object, an object object 3302 indicating information about the object, an object detail object 3303 indicating detailed information about the object, a road/location object 3304 indicating information related to a road near AR mobility (or road information related to a destination), a current time object 3305 indicating a current time, a subway station object 3306 indicating information related to a subway station near the AR mobility, a speed object 3307 indicating information about a speed of the AR mobility, and a navigation object 3308 indicating guide information about the destination of the AR mobility. The objects illustrated in FIG. 33 may be AR objects. The objects may also be referred to as components.

The AR mobility control device (or AR mobility) according to the embodiments may further include a communicator configured to receive the above-mentioned objects according to the embodiments from a server. That is, in order to receive the above-mentioned objects by the communicator, the AR mobility according to the embodiments may transit request information for obtaining information related to the above-mentioned objects to the server using the communicator according to the embodiments.

The object/distance object 3301 may be an AR object (or component) that indicates information about an object present outside the AR mobility according to the embodiments. For example, when the object present outside the AR mobility is a particular restaurant, the object/distance object may include an icon (or the trademark and/or name of the restaurant) representing the restaurant. The object/distance object may further include distance information indicating the distance between the AR mobility and the restaurant.

The object object 3302 may be an AR object (or component) indicating information about an object present outside the AR mobility according to the embodiments. For example, when the object present outside the AR mobility is a particular restaurant, the object object 3302 may include an icon (or the trademark and/or name of the restaurant) representing the restaurant.

The object detail object 3303 may be an AR object (or component) indicating detailed information about an object present outside the AR mobility according to embodiments. For example, when the object is a clothing store of a specific brand, the object detail object 3303 may indicate information about a product that is on sale in the clothing store of the specific brand, discount information about the product, and the like.

The road/location object 3304 may indicate information about a road present outside of the AR mobility according to the embodiments. That is, when the object present outside the AR mobility is a road, the road/location object 3304 may be an object indicating information about the road. For example, when the AR mobility is traveling on a first road, the road/location object may indicate information about the density of vehicles present on the first road. In addition, the road/location object may indicate the road on which the AR mobility is traveling by highlighting (or shading) the road. In addition, the road/location object may indicate the name of the road on which the AR mobility is traveling in the shape of an arrow pointer (or a pointer pin icon).

The current time object 3305 is information indicating the current time. The current time object may take the form of a digital clock and consist of a series of numbers and an indication of AM/PM, or may be configured with a clock icon consisting of clock hands and a series of numbers.

The subway station object 3306 may be an object indicating information related to a subway station near the AR mobility. For example, when there is a first subway station near the AR mobility, the subway station object may indicate information related to the subway line of the first subway station, information about a train approaching the first subway station, crowdedness information about the train, information about a time when the train approaches or arrives at the first subway station, an icon related to the subway, and information about a previous station and a next station of the first subway.

The speed object 3307 may indicate information about the speed of the AR mobility. The speed object may further include an icon indicating whether there is a speed limit for the road based on the information about the road on which the AR mobility is traveling.

The navigation object 3308 may indicate guide information about the destination of the AR mobility. For example, when the AR mobility device is an AR shuttle mobility, the navigation object may indicate information about the current destination of the AR shuttle mobility, information about the next destination, and the like. The navigation object may also indicate the time required to reach the current destination and/or the time required to reach the next destination.

In addition, AR objects according to the embodiments may include a news related information object indicating a related news article and/or video.

Thus, for example, the AR mobility control device according to the embodiments may transmit the location information about the AR mobility control device from a position sensor (for example, a GPS sensor) to the server. Then, the AR mobility control device may receive, by the communicator, object related information for displaying the above-described objects according to the embodiments. When the object related information is related information for displaying the object/distance object, the object related information may include a distance between the object and the AR mobility, an icon (or a shop name/trademark) for a corresponding object, and/or location information about the object. Thereafter, the AR mobility control device may display the received object(s) according to the embodiments by the controller and/or the passenger location calibrator according to the embodiments.

The AR mobility device (or AR mobility control device) according to the embodiments may be a vehicle capable of self-driving according to the embodiments. That is, the AR mobility device according to the embodiments may be a vehicle configured to perform self-driving using a communicator, a position sensor, and the like according to embodiments.

Here, the AR mobility device according to the embodiments may further display an AR object that may enable self-driving related feedback or interaction from users. The AR mobility device according to the embodiments may receive feedback information for updated information related to an external POI from users. The AR mobility device according to the embodiments may transmit the received feedback information to the server, using the communicator.

For example, while the AR mobility device according to the embodiments operates self-driving, the AR mobility device may receive information about an object from a server. In this case, the AR mobility device according to the embodiments may receive incorrect information about the object or may receive information with a part missing. For example, the AR mobility device according to the embodiments may fail to receive information about a newly created pavement. In this case, the users may provide feedback information through AR objects (or components) related to feedback.

For example, the AR mobility device according to the embodiments may receive wrong information while operating self-driving. For example, the AR mobility device according to the embodiments may receive shop operation time information about a shop that has already been closed down. In this case, the users may provide the latest feedback information through AR objects (or components) related to feedback.

Accordingly, the AR mobility control device according to the embodiments may transmit information related to feedback received from the users to the server, thereby causing the server to update the existing information with the modified information in real time.

The AR mobility control device according to the embodiments may receive and display AR objects (or the aforementioned objects) for objects present outside the AR mobility in real time while performing self-driving. The AR mobility device may further display an AR object related to self-driving on a display by performing self-driving. The AR mobility device according to the embodiments may also provide in real time information about the state of self-driving and the destination of self-driving.

In other words, it may present embodiments of objects shown on a shared display for multiple viewers (multiple passengers sharing one display). The AR graphic output area may be separated from the static graphic output area. This is intended to reduce AR graphic mismatch in a multi-viewer environment without introducing a 3D display or a personal device. In addition, passengers may obtain information about wider surroundings. Areas may be divided by importance of information to selectively acquire information.

An opaque display may include an AR graphic output area. A panoramic view of the surroundings in front may be output. In addition, the display may display information such as detailed information about nearby facilities and the location of a nearby stop.

A transparent display may include a static graphic output area (only simple directions such as left, right, and front with respect to the front view). In addition, it may display a vehicle path, locations of nearby stops, and basic driving information (speed, temperature in a vehicle body, etc.), and brief information about nearby facilities.

Accordingly, the AR mobility control device according to the embodiments may include a camera configured to photograph one or more users to generate image data, a controller configured to extract information about one or more users from the image data, a calibrator configured to calculate a reference point for projection of an AR object based on location information about the users, and a display configured to display the AR object based on the calculated reference point. Here, the information about one or more users may include location information about the users.

In addition, a method of controlling an AR mobility device according to embodiments may include photographing one or more users by a camera and generating image data, extracting information about one or more users from the image data, calculating a reference point for projection of an AR object based on location information about the users, and displaying the AR object on a display based on the calculated reference point. Here, the information about one or more users may include location information about the users.

Here, the display may further display a first object representing information about a distance of an object from the AR mobility, a second object representing information about a moving speed of the AR mobility, and a third object indicating information about a destination of the AR mobility, a fourth object representing a map, a fifth object representing information related to an object located within a certain distance from the AR mobility, a sixth object representing news information, and a seventh object representing the current time.

An AR mobility device control method and/or an AR mobility device according to embodiments may allow users to intuitively interact with an object outside the AR mobility. In addition, with such a configuration, the AR mobility device control method and/or the AR mobility device according to the embodiments may intuitively provide users with road travel related information or information about a destination.

With this configuration, the AR mobility device control method and/or the AR mobility device according to the embodiments may allow users to intuitively interact with an object present outside the AR mobility. In addition, with such a configuration, the AR mobility device control method and/or the AR mobility device according to the embodiments may intuitively provide users with road travel related information or information about a destination.

This configuration may allow the AR mobility device control method and/or the AR mobility device according to the embodiments to receive feedback information from users while operating self-driving. In addition, the AR mobility device according to the embodiments may allow a server to quickly correct wrong information, thereby quickly providing correct information (updated information) for users.

This configuration may allow the AR mobility device control method and/or the AR mobility control device according to the embodiments to provide information about external objects for users in real time while operating self-driving. That is, the AR mobility device according to the embodiments may intuitively provide road travel related information or information about driving.

In addition, this configuration may allow the AR mobility device according to the embodiments to maximize stability of self-driving by providing detailed information about self-driving for users and enabling the users to interact with self-driving.

FIG. 34 illustrates a procedure of displaying an AR object for an object on a display by an AR mobility control device according to embodiments.

Method for Exclusive Display Calibration:

The position of the GPS sensor of the mobility and the relative location of each seat may be used.

Sensors may be attached to the seats to recognize more accurate eye positions of the passengers.

FIG. 34(A) illustrates a case where the AR mobility control device according to the embodiments displays an AR object for an object (POI) on an exclusive display of the display according to the embodiments. In the example of FIG. 34(A), when the passenger on the lower right side uses the right display as an exclusive display, the display displays an exclusive component for the POI.

The POI 3400 refers to an object that is present outside the AR mobility according to the embodiments. FIG. illustrates that an exclusive AR object (or exclusive component) related to the object is displayed on the right display (i.e., exclusive display) for the passenger on the lower right side. The AR mobility control device according to the embodiments may receive information about the location of the object, information related to the shape of the object, and the like by the communicator.

The vehicle GPS sensor 3401 may represent a position sensor according to embodiments present in the AR mobility control device according to the embodiments. The vehicle GPS sensor may indicate an actual location of the AR mobility control device (or AR mobility).

The user location 3402 on the lower right side (or the seat location on the lower right side) may represent a reference point for displaying an exclusive AR object for the object on the right display (i.e., the exclusive display). Since the exclusive display refers to a display area or a display for one (or predetermined) user (or seat), the exclusive AR object may be displayed on the right display based on the one (or predetermined) user (or seat).

An exclusive AR object display area 3403 may include an area (a first area) in which the POI is projected onto the right display (i.e., the exclusive display) based on the location of the user on the lower right side (or the seat location on the lower right side). The exclusive AR object display area may further include a separate area (a second area) for representing the first area and/or a separate area (a third area) present in the vicinity of the exclusive AR object display area.

FIG. 34(B) illustrates a method of extracting location information about a user related to an exclusive AR object in order to display the exclusive AR object on an exclusive display. Initially, the AR mobility control device according to the embodiments may calculate a seat location of the user related to the aforementioned exclusive AR object within the AR mobility. When the seat location is calculated, the eye position of the passenger may be calculated based on the seat location. For example, the relative position of the eyes of the passenger may be represented by values of (X, Y, Z). Herein, when the passenger is sitting on the seat in the top view of FIG. 34(B), the value of X may represent the distance from the leftmost (or rightmost) end of the seat to the user's eyes (or the middle position of both eyes). The value of Y may represent the distance from the top of the user (i.e., the highest position of the user, etc.) to the shoulder of the user (or the middle position of the eyes of the user, etc.), or the distance from the bottom of the seat to the user's shoulder or the middle position of both eyes of the user. In the top view, the value of Z may represent the distance from an end of the seat toward the seat back (e.g. the seat back position) to the user's eyes or head.

FIG. 34(C) illustrates a method of extracting location information about one or more users in AR mobility to display an exclusive AR object on an exclusive display or to display a shared AR object on a shared display.

Initially, in vehicle coordinate system transformation 3403a, the location (i.e., absolute location) of the AR mobility device may be extracted using the position sensor (or vehicle GPS sensor) according to the embodiments.

In seat coordinate system transformation 3403b, the location of the AR mobility device extracted in the vehicle coordinate system transformation according to embodiments may be corrected to indicate the locations of one or more users present in the AR mobility. That is, fine correction of the relative locations of one or more passengers may be performed through the seat coordinate system transformation.

Then, in passenger coordinate system transformation, the relative position of the passenger's eyes according to FIG. 34(B) may be extracted to accurately extract the position of the passenger's eyes after the above-described seat coordinate system transformation.

Accordingly, an AR mobility control device according to embodiments may include a camera configured to photograph one or more users to generate image data, a controller configured to extract information about one or more users from the image data, a calibrator configured to calculate a reference point for projection of an AR object based on location information about the users, and a display configured to display the AR object based on the calculated reference point. Here, the information about one or more users may include location information about the users.

In addition, a method of controlling an AR mobility device according to embodiments may include photographing one or more users by a camera and generating image data, extracting information about one or more users from the image data, calculating a reference point for projection of an AR object based on location information about the users, and displaying the AR object on a display based on the calculated reference point. Here, the information about one or more users may include location information about the users.

Here, information about the location of a first user may be determined based on at least one of the operations of calculating a location of the AR mobility using the vehicle coordinate system, calculating a location of a seat inside the AR mobility using the seat coordinate system, and/or calculating a location of the first user on the seat using the passenger coordinate system.

In addition, the AR mobility device (and/or method of controlling the AR mobility device) according to embodiments of the present invention may further include generating location information about the AR mobility by a GPS sensor, transmitting the location information about the AR mobility to a server by a communicator, and receiving, by the communicator, information indicated by first to fifth objects generated according to the location information from the server.

With this configuration, the AR mobility device control method and/or AR mobility device according to the embodiments may effectively provide a customized service for each user. In addition, due to such a configuration, the AR mobility device control method and/or AR mobility device according to the embodiments provide an environment allowing users to easily interact with an external object (or thing) by calibrating an AR object based on accurate view position information and viewing direction information about each user.

With this configuration, the AR mobility device control method and/or the AR mobility device according to the embodiments may allow users to intuitively interact with an object present outside the AR mobility. In addition, with such a configuration, the AR mobility device control method and/or the AR mobility device according to the embodiments may intuitively provide users with road travel related information or information about a destination.

Figure 35:
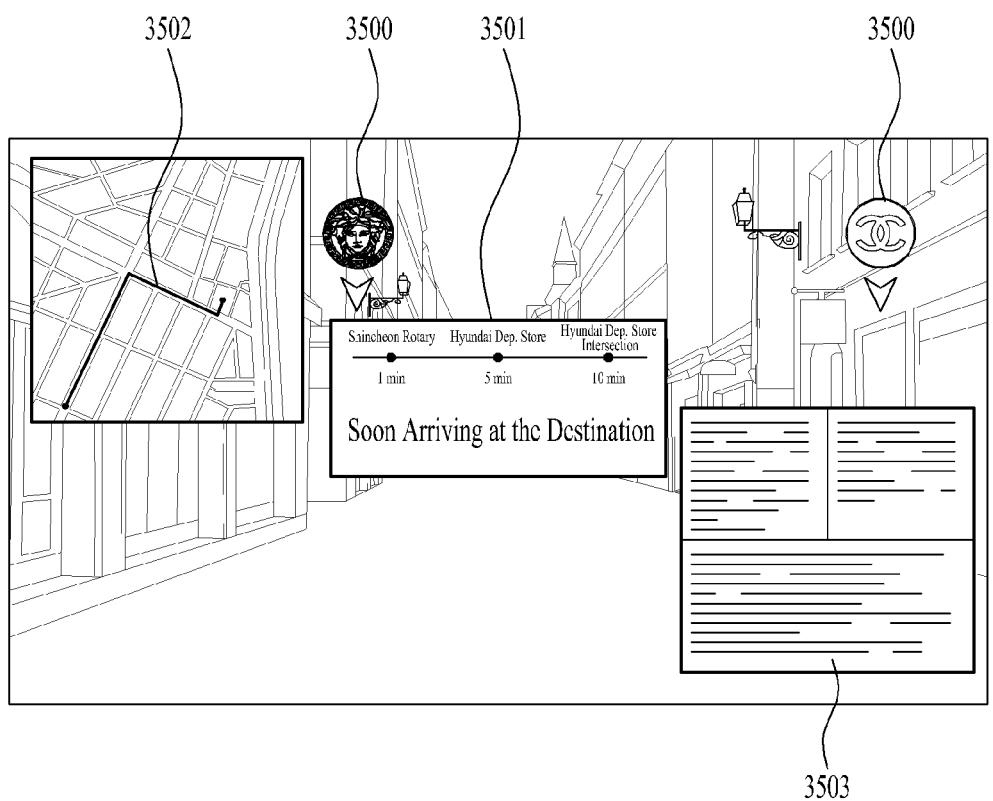
FIG. 35 illustrates objects displayed on a display of an AR mobility control device (or an AR mobility device) according to embodiments.

FIG. 35 illustrates objects displayed on a display of an AR mobility control device (or an AR mobility device) according to embodiments.

Specifically, FIG. 35 illustrates an exclusive AR object displayed on an exclusive display of a display according to embodiments.

Exclusive AR objects (or exclusive components) displayed on the exclusive display according to the embodiments may include an object/distance object 3500, a destination notification object 3501, a destination guide object 3502, and/or a news related information object 3503.

The object/distance object 3500 may be an AR object (or component) that indicates information about an object present outside the AR mobility according to the embodiments. For example, when the object present outside the AR mobility is a particular restaurant, the object/distance object may include an icon (or the trademark and/or name of the restaurant) representing the restaurant. The object/distance object may further include distance information indicating the distance between the AR mobility and the restaurant.

The destination notification object 3501 may be an AR object (or component) indicating information about the user's destination related to the exclusive AR object and/or information about whether the AR mobility device approaches the destination. For example, when the destination that the user targets is Magog-dong-ro Intersection Stop, the destination notification object may indicate information about whether the AR mobility device approaches Magog-dong-ro Intersection Stop, information about the next stop, and the time required to reach Magog-dong-ro Intersection Stop.

The destination guide object 3502 may be an AR object (or component) that indicates, along with a related map, information about the user's destination related to the exclusive AR object and/or information about whether the AR mobility device approaches the destination.

The news-related information object 3503 may indicate information about news that the user is interested in. The news-related information object may indicate news information about the destination of the user. Further, the news-related information object according to embodiments may include a news-related information object representing related news articles and/or videos.

The AR mobility device (or AR mobility control device) according to the embodiments may be a vehicle capable of self-driving according to embodiments. That is, the AR mobility device according to the embodiments may be a vehicle configured to perform self-driving using a communicator (communication unit), a position sensor, and the like according to embodiments.

Here, the AR mobility device according to the embodiments may further display an AR object that may enable self-driving related feedback or interaction from users. The AR mobility device according to the embodiments may receive feedback information for updated information related to an external POI from users. The AR mobility device according to the embodiments may transmit the received feedback information to the server, using the communicator.

For example, while the AR mobility device according to the embodiments operates self-driving, the AR mobility device may receive information about an object from a server. In this case, the AR mobility device according to the embodiments may receive incorrect information about the object or may receive information with a part missing. For example, the AR mobility device according to the embodiments may fail to receive information about a newly created pavement. In this case, the users may provide feedback information through AR objects (or components) related to feedback.

For example, the AR mobility device according to the embodiments may receive wrong information while operating self-driving. For example, the AR mobility device according to the embodiments may receive shop operation time information about a shop that has already been closed down. In this case, the users may provide the latest feedback information through AR objects (or components) related to feedback.

Accordingly, the AR mobility control device according to the embodiments may transmit information related to feedback received from the users to the server, thereby causing the server to update the existing information with the modified information in real time.

The AR mobility control device according to the embodiments may receive and display AR objects (or the aforementioned objects) for objects present outside the AR mobility in real time while performing self-driving. The AR mobility device may further display an AR object related to self-driving on a display by performing self-driving. The AR mobility device according to the embodiments may also provide in real time information about the state of self-driving and the destination of self-driving.

In summary, the exclusive display may display the following content:

Get-off alarm when approaching a target stop;
Route guidance from the target stop to the destination:
   After getting off, continuous guidance on a personal device;
Output of AR graphics for nearby facilities:
   Detailed information according to user input (touch, gaze, etc.); and
Certain areas on the user's personal device or secondary monitor.
Such content is freely available.

Accordingly, the AR mobility control device according to the embodiments may include a camera configured to photograph one or more users to generate image data, a controller configured to extract information about one or more users from the image data, a calibrator configured to calculate a reference point for projection of an AR object based on location information about the users, and a display configured to display the AR object based on the calculated reference point. Here, the information about one or more users may include location information about the users.

In addition, a method of controlling an AR mobility device according to embodiments may include photographing one or more users by a camera and generating image data, extracting information about one or more users from the image data, calculating a reference point for projection of an AR object based on location information about the users, and displaying the AR object on a display based on the calculated reference point. Here, the information about one or more users may include location information about the users.

Here, the display may further display a first object representing information about a distance of an object from the AR mobility, a second object representing information about a moving speed of the AR mobility, and a third object indicating information about a destination of the AR mobility, a fourth object representing a map, a fifth object representing information related to an object located within a certain distance from the AR mobility, a sixth object representing news information, and a seventh object representing the current time.

With this configuration, the AR mobility device control method and/or the AR mobility device according to the embodiments may allow users to intuitively interact with an object present outside the AR mobility. In addition, with such a configuration, the AR mobility device control method and/or the AR mobility device according to the embodiments may intuitively provide users with road travel related information or information about a destination.

In addition, with this configuration, the AR mobility device control method and/or the AR mobility device according to the embodiments may allow users to intuitively interact with an object present outside the AR mobility. In addition, with such a configuration, the AR mobility device control method and/or the AR mobility device according to the embodiments may intuitively provide users with road travel related information or information about a destination.

This configuration may allow the AR mobility device control method and/or the AR mobility device according to the embodiments to receive feedback information from users while operating self-driving. In addition, the AR mobility device according to the embodiments may allow a server to quickly correct wrong information, thereby quickly providing correct information (updated information) for users.

This configuration may allow the AR mobility device control method and/or the AR mobility control device according to the embodiments to provide information about external objects for users in real time while operating self-driving. That is, the AR mobility device according to the embodiments may intuitively provide road travel related information or information about driving.

In addition, this configuration may allow the AR mobility device according to the embodiments to maximize stability of self-driving by providing detailed information about self-driving for users and enabling the users to interact with self-driving.

Figure 36:
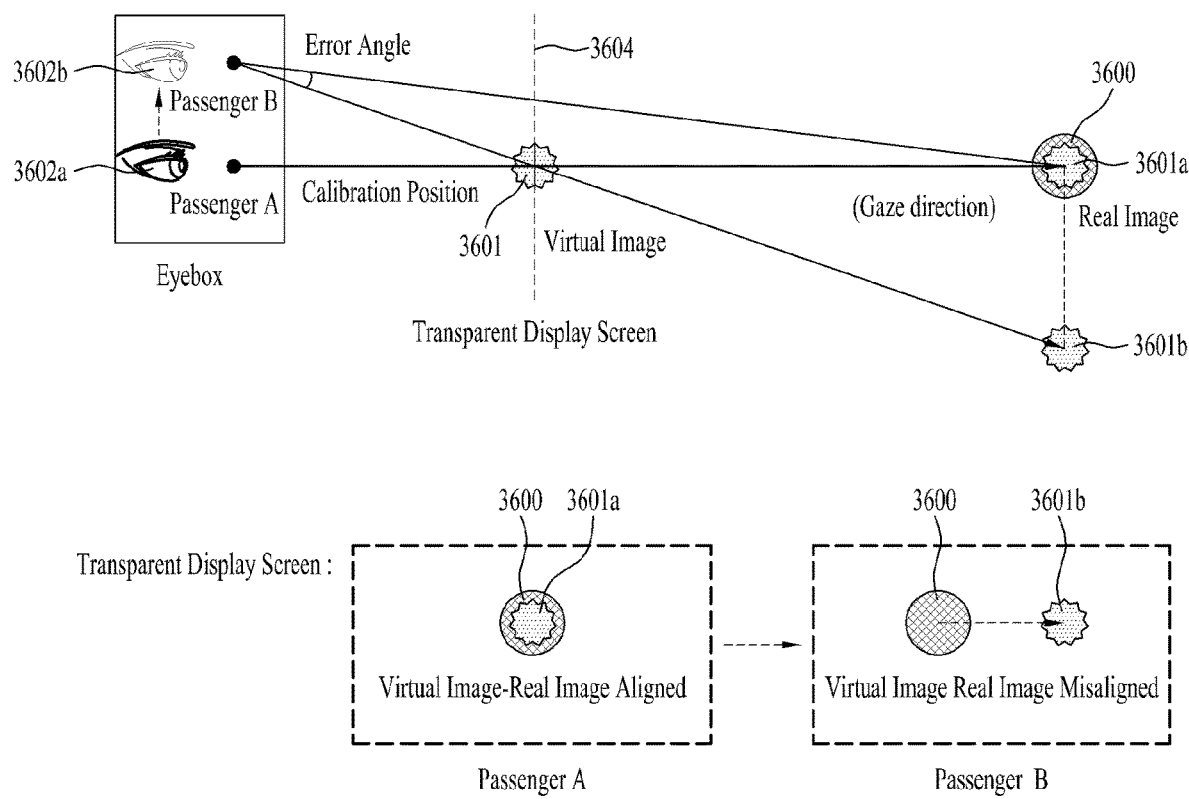
FIG. 36 illustrates matching between an AR object and an object outside AR mobility on a transparent display of a display and a matching error according to embodiments.

FIG. 36 illustrates matching between an AR object and an object outside AR mobility on a transparent display of a display and a matching error according to embodiments.

FIG. 36 illustrates an error in matching between AN AR graphic and a real image on a transparent display. When AR matching calibration is performed at the location of passenger A, a matching error may occur at the location of the passenger B.

Specifically, FIG. 36(A) illustrates a case where passengers A and B in the AR mobility gaze at an object 3600 present outside the AR mobility at different locations.

A transparent display screen 3604 may be a display according to embodiments. The transparent display screen 3604 may display an AR object (or AR component) 3601 according to embodiments. The AR object 3601 according to the embodiments may refer to an AR object viewed by passenger A and/or passenger B. The transparent display screen may be a transparent display according to embodiments. In FIG. 36, the left side of the dashed line, which represents the transparent display screen, may represent the inside of the AR mobility according to the embodiments, and the right side of the dashed line may represent the outside of the AR mobility. Thus, FIG. 36 shows passenger A 3602a and/or passenger B 3602b on the left side of the dashed line. An object (POI) 3600 present outside the AR mobility is shown on the right side of the dotted line.

The POI 3600 may refer to an object, a person, and/or a building present outside the AR mobility according to the embodiments. The object may be the POI or object according to the embodiments described with reference to FIGS. 23 to 36.

An AR object virtual image 3601 may represent an AR object displayed on a display (a shared display and/or an exclusive display) according to embodiments. Specifically, FIG. 36(A) illustrates that the display displays the AR object virtual image in an area in which the above-described object is projected on the display according to the embodiments, based on passenger A 3602a.

Passenger A 3602a may be one of one or more passengers present in the AR mobility according to the embodiments. FIG. 36 illustrates calculating a calibration position based on passenger A. Calibration may refer to displaying a display component (e.g., an AR object) on a display. A calibration position may mean that the display determines a reference point inside the AR mobility to display the AR object according to the embodiments.

Passenger B 3602b may be one of one or more passengers present in the AR mobility according to the embodiments. FIG. 36 illustrates calculating a calibration position based on passenger A. Thus, to passenger B, the AR object virtual image 3601 according to the embodiments may be seen to be present a place 361b other than a position where the real object is located. That is, when the AR object virtual image according to the embodiments is calibrated based on passenger A, there may be an error angle between an angle at which passenger B views the object and an angle at which passenger B views the AR object virtual image according to the embodiments.

Accordingly, in this case, in view of passenger A, the AR object and the object may be seen in an overlapping manner (3601a). That is, the display according to the embodiments may display the AR object such that the object and the AR object are seen to overlap each other. On the other hand, in view of passenger B, the AR object and the object may not be seen in an overlapping manner (3602b). That is, when the AR mobility control device according to the embodiments calibrates the AR object according to the embodiments based on the location of passenger A, the object may be seen to be at a position 3601b other than the actual position of the object in view of passenger B. Therefore, the AR mobility control device according to the embodiments may determine the calibration position (i.e., the reference point) by the controller and/or the passenger location calibrator. The method of determining the calibration position has been described in detail above.

FIG. 36 (B) shows a gaze (view) of each passenger when passenger A and passenger B in the AR mobility look at the object 3600 present outside the AR mobility at different locations.

As described above, the figure illustrates a case where an AR object is calibrated based on passenger A according to embodiments. In view of passenger A, the AR object 3601a calibrated by the display and the real object 3600 may be seen to overlap each other. However, in this case, the AR object 3601a calibrated by the display and the real object 3600 may be seen to be spaced apart from each other in view of passenger B. Accordingly, the AR mobility control device according to the embodiments may determine a calibration position (i.e., a reference point) by the controller and/or the passenger location calibrator. The method of determining the calibration position has been described in detail above.

Accordingly, the AR mobility control device according to the embodiments may include a camera configured to photograph one or more users to generate image data, a controller configured to extract information about one or more users from the image data, a calibrator configured to calculate a reference point for projection of an AR object based on location information about the users, and a display configured to display the AR object based on the calculated reference point. Here, the information about one or more users may include location information about the users.

In addition, a method of controlling an AR mobility device according to embodiments may include photographing one or more users by a camera and generating image data, extracting information about one or more users from the image data, calculating a reference point for projection of an AR object based on location information about the users, and displaying the AR object on a display based on the calculated reference point. Here, the information about one or more users may include location information about the users.

Accordingly, the gaze direction information according to the embodiments may be one of a forward direction, a rearward direction, a leftward direction, and a rightward direction, and the users may include a first user and a second user who have the same gaze direction information. A display corresponding to the gaze direction information about the first user and the second user among the front display, the rear display, the left display, and the right display of the AR mobility may be used, and the reference point may be determined based on the information about the location of the first user and the information about the location of the second user. The AR object may be displayed in an area of the first display in which the object is projected on the display, based on the reference point.

Figure 37:
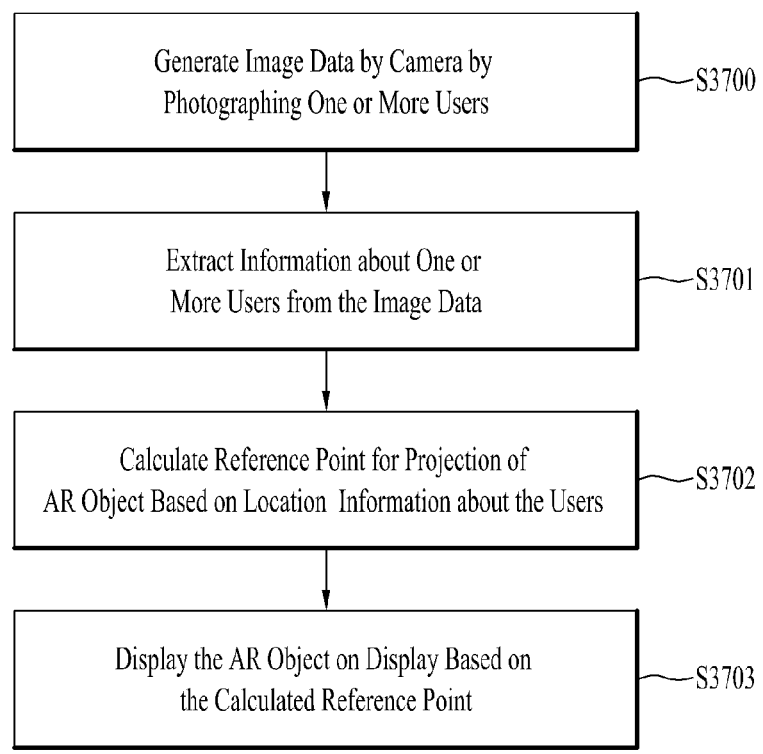
FIG. 37 is a flowchart illustrating a method of controlling AR mobility according to embodiments.

FIG. 37 is a flowchart illustrating a method of controlling AR mobility according to embodiments.

A AR mobility control method according to embodiments may include generating, by a camera, image data by photographing an inside of AR mobility according to embodiments (S3700), extracting information about one or more users from the image data acquired by the camera (S3701), calculating a reference point for projecting an AR object based on location information about the users (S3702), and/or displaying the AR object on the display based on the calculated reference point (S3703). Here, projecting an AR object may mean displaying the AR object on the display. In addition, projecting an AR object based on the reference point may mean displaying the AR object in a display area in which an object POI present outside the AR mobility device is projected on the display according to the embodiments (or an area related to the display area for the projection), based on the reference point described above.

An AR mobility control device according to embodiments may generate image data by photographing the inside of the AR mobility according to the embodiments by the camera (S3700). The camera according to the embodiments may be a 360-degree RGB camera. The camera may photograph one or more passengers (or occupants or users) inside the AR mobility according to the embodiments, and transfer the captured images to the controller and/or the calibrator according to the embodiments. Alternatively, the camera may recognize passengers (users) from the image data captured by the camera, and transmit related information to the controller and/or the calibrator. Here, the 360-degree RGB camera may be referred to as a 360-degree camera.

The AR mobility control device according to the embodiments may extract information about one or more users from the image data acquired by the camera (S3701). Here, the information about the one or more users may include location information about the users and/or gaze direction information about the users. Here, the gaze direction information about the users may refer to directions in which the users are actually looking, or directions in which seats related to the users are positioned (for example, a direction for each of the seats where the users are sitting). The operation of extracting the information about one or more users from the image data acquired by the camera may be performed by the controller and/or the passenger location calibrator (or the calibrator) according to the embodiments. The operation of extracting the information about one or more users from the image data acquired by the camera may include an operation (or operations) for performing the operations of FIGS. 25, 36, and/or 38.

The AR mobility control device according to the embodiments may calculate a reference point for projection of an AR object based on location information about the users (S3702). The reference point may refer to a calibration position. Accordingly, the AR object may be displayed in an area in which an object is projected on the display based on the reference point or may be displayed in a second area of the display, which is an area for displaying information related to the first area. The operation of calculating the reference point for projection of the AR object may be performed by the controller and/or the passenger location calibrator (or the calibrator) according to the embodiments. The operation of calculating the reference point for projection of the AR object based on the location information about the users may include an operation (or operations) for performing the operations of FIGS. 25, 36 and/or 38.

The AR mobility control device according to the embodiments may display the AR object on the display based on the calculated reference point (S3703). Here, the display may be classified into an exclusive display and/or a shared display according to embodiments based on the role of the display and/or whether the displayed AR object is an exclusive AR object or a shared AR object. The display according to the embodiments may be a transparent display. The AR object according to the embodiments may include the object described with reference to FIGS. 33 and/or 35. The operation of displaying the AR object on the display based on the calculated reference point may include an operation (or operations) for performing the operations of FIGS. 25, 36, and/or 38.

The AR mobility control method (or device) according to the embodiments may be performed in real time by the AR mobility control device or all or part of the components according to the embodiments.

For example, the AR mobility control device according to the embodiments may perform the following operations (or operations). That is, the AR mobility control method according to the embodiments may include the following operations.

[A Method of Calculating and Applying AR Matching Calibration Data for Each Seat]

1. In a mobility vehicle assembly operation, AR matching calibration values may be calculated and stored in the internal storage for each real seat location and each virtual seat location.

Number of data combinations=(Number of real seats+Number of virtual seats)*(Number of classification stages for estimated passenger eye level)

2. The AR matching calibration values in the internal storage may be dynamically updated using the real-time data from the sensors installed on the real seats.

3. During driving, the matching calibration data of a virtual seat closest to the center of mass of the passenger distribution may be read and interpolated with the center of mass.

[A Method of Checking the Distribution of Passengers in the Vehicle and Selecting a Reference Seat for Calibration]

1. The 360-degree camera on the ceiling may detect the distribution of passengers using a feature point recognition technique.

2. In the case where all passengers are seated, the locations of the seats in use may be obtained from the sensors installed on the seat.

3. After grouping the distribution based on the gazes of the passengers, the center of mass in the space may be calculated for each group.

4. The calculated center of mass may be set as the transparent display calibration reference point.

[A Calibration Method for Each Exclusive Display and UX for Switching between the Shared Display Mode and the Exclusive Display Mode]

1. An exclusive display mode may be enabled for each passenger by detecting the gaze of each passenger.

2. An exclusive display calibration calculation may be performed based on the gazes and seat locations of the passengers using the information from the passenger gaze detection sensor (camera).

3. Information may be moved from a display to an exclusive display and a specialized UX may be applied according to the role of the display.

Figure 38:
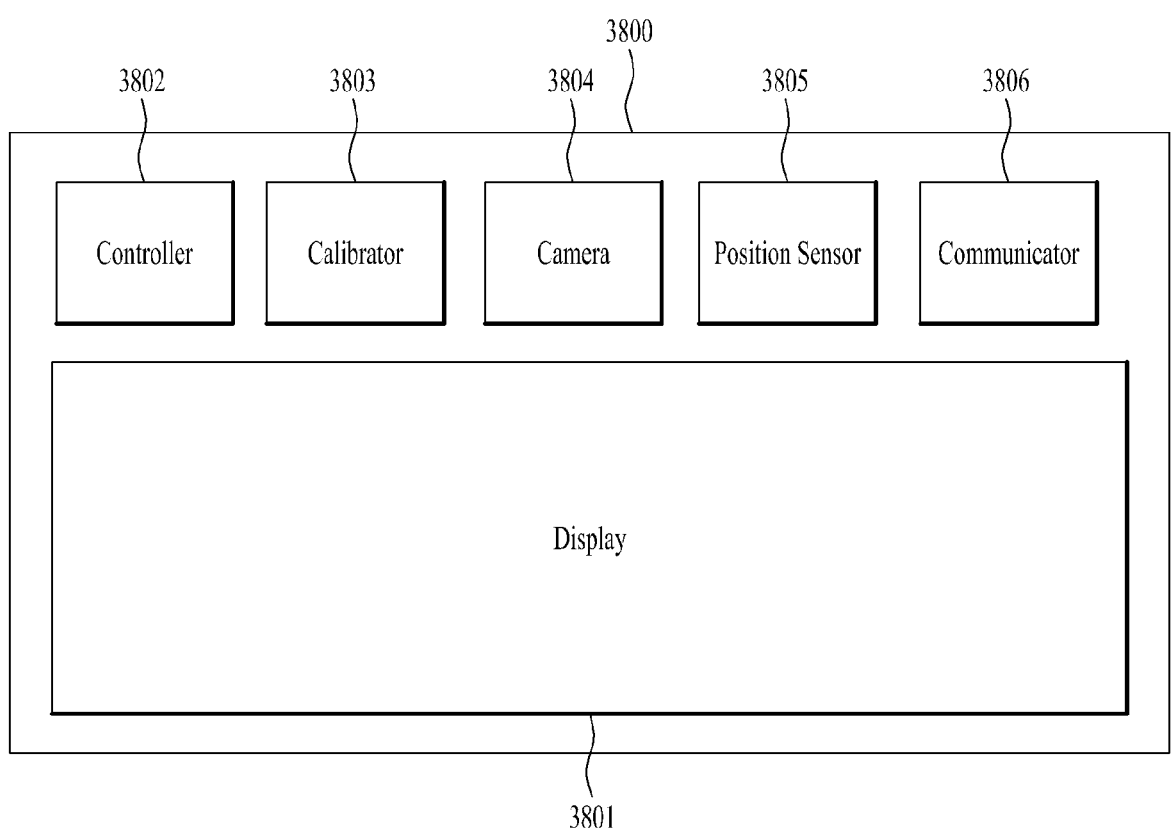
FIG. 38 is a block diagram illustrating an AR mobility control device according to embodiments.

FIG. 38 is a block diagram illustrating an AR mobility control device according to embodiments.

An AR mobility control device (and/or AR mobility) according to the embodiments may include a display 3801, a controller 3802, a calibrator 3803, a camera 3804, a position sensor 3805 and/or a communicator 3806. The AR mobility control device according to the embodiments may include other sensors as well.

The display 3801 may display an AR object and/or other components (such as an icon) according to the embodiments. The display may refer to the display according to the embodiments described with reference to FIGS. 23 to 37. According to embodiments, the display may include a front display, a rear display, a left display, and/or a right display, or may be configured as one display. In addition, the display may be divided into a shared display and/or an exclusive display according to the above-described embodiments. The display according to the embodiments may perform the operations of the display described with reference to FIGS. 24 to 37. In addition, the display according to the embodiments may perform the operation of the transparent display 2705 described with reference to FIG. 27.

The controller 3802 may extract location information and/or gaze direction information about each of one or more users based on the image data and/or video data about the inside of the AR mobility captured by the camera according to the embodiments. The controller 3802 may classify the one or more users into one or more groups based on the location information and/or gaze direction information about each of the one or more users. In addition, the controller may activate a display corresponding to each of the classified one or more groups. Here, the gaze direction information about the users may refer to directions in which the users are actually looking, or directions in which seats related to the users are positioned (for example, a direction for each of the seats where the users are sitting). The controller according to the embodiments may perform the operations of the controller described with reference to FIGS. 24 to 37. In addition, the controller according to the embodiments may further perform some or all of the operations of the calibrator (or the passenger location calibrator) described with reference to FIGS. 24 to 37. In addition, the controller according to the embodiments may include the AR engine 2704 described with reference to FIG. 27.

The calibrator 3803 may receive the location information and/or gaze direction information about each of one or more users according to the embodiments, and calculate a reference point (or calibration position) for displaying the AR object according to the embodiments. Here, the reference point (or calibration position) may be calculated as a plurality of reference points corresponding to the respective groups described above. The calibrator may display the AR object on the display for each group based on the reference points corresponding to the respective groups. The calibrator according to the embodiments may perform the operation of the passenger location calibrator (or the calibrator) described with reference to FIGS. 24 to 37. In addition, the calibrator according to the embodiments may further perform some or all of the operations of the controller described with reference to FIGS. 24 to 37. In addition, the calibrator according to the embodiments may include the AR engine 2704 described with reference to FIG. 27.

Here, projecting an AR object may mean displaying the AR object on the display. In addition, projecting an AR object based on the reference point may mean displaying the AR object in a display area in which an object POI present outside the AR mobility device is projected on the display according to the embodiments (or an area related to the display area for the projection), based on the reference point described above.

The camera 3804 may photograph the inside of the AR mobility according to the embodiments. The camera may photograph the inside of the AR mobility according to the embodiments and transmit image data (or video data) to the controller and/or the calibrator. The camera may be a 360-degree RGB camera according to an embodiment, or may include a wide angle camera according to an embodiment. The camera according to the embodiments may refer to the camera according to the embodiments described with reference to FIGS. 24 to 37. The camera may be or include the 360-degree RGB camera 2701 described with reference to FIG. 27.

The position sensor 3805 may extract location information about the AR mobility control device (or AR mobility) according to the embodiments. The position sensor may refer to the sensor and/or the GPS sensor 2702 in FIG. 27 and/or other drawings.

The communicator 3806 may receive an AR object and/or related information according to embodiments from a server. The communicator may receive, from the server, an AR object (e.g., a component, an icon, etc.) and/or information related to the AR object (e.g., information related to a nearby subway station, information indicating the current time, information about restaurants in a nearby building, etc.) to be displayed on the shared display and/or the exclusive display. The communicator may transmit the location information extracted from the position sensor to the server, and the server may transmit the above-described AR object and the information related to the AR object based on the location information. The communicator may perform the operation of the communicator according to the embodiments described with reference to FIGS. 24 to 37. That is, the communicator may communicate with the server according to the embodiments.

Each part, module, or unit described above may be a software, processor, or hardware part that executes successive procedures stored in a memory (or storage unit). Each of the steps described in the above embodiments may be performed by a processor, software, or hardware parts. Each module/block/unit described in the above embodiments may operate as a processor, software, hardware, API (or firmware). In addition, the methods presented by the embodiments may be executed as code. This code may be written on a processor readable storage medium and thus read by a processor provided by an apparatus.

Regarding interpretation of the terminology according to the embodiments, the first, second, etc. may be used to describe various elements. These terms do not limit the interpretation of the elements of the embodiments. These terms may be used to distinguish between the elements.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term or should be interpreted to indicate and/or. For instance, the expression A or B may comprise 1) only A, 2) only B, and/or 3) both A and B. In other words, the term or in this document should be interpreted to indicate additionally or alternatively.

Various elements of the apparatuses in this disclosure may be implemented by hardware, software, firmware or a combination thereof. Various elements in the embodiments may be implemented by a single chip, such as a hardware circuit. According to embodiments, various elements may optionally be implemented by individual chips. According to embodiments, elements may be implemented by one or more processors capable of executing one or more programs to perform operations according to the embodiments.

The terminology used in connection with the description of the embodiments should be construed in all aspects as illustrative and not restrictive. Regarding singular and plural representations, the singular representation is intended to be interpreted as a plural representation, and "and/or" is also intended to include all possible combinations. Terms such as "includes" or "has" are intended to further include/combine various features, numbers, method steps, operations, and elements in addition to the elements included.

Although embodiments have been explained with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may fall within the scope of the appended claims and their equivalents.

The apparatuses and methods according to the embodiments may not be limited by the configurations and methods of the embodiments described above. The embodiments described above may be configured by being selectively combined with one another entirely or in part to enable various modifications.

In addition, the method proposed in the embodiments may be implemented with processor-readable code in a processor-readable recording medium provided to a network device. The processor-readable medium may include all kinds of recording devices capable of storing data readable by a processor. The processor-readable medium may include one of ROM, RAM, CD-ROM, magnetic tapes, floppy disks, optical data storage devices, and the like and also include carrier-wave type implementation such as a transmission via Internet. Furthermore, as the processor-readable recording medium is distributed to a computer system connected via a network, processor-readable code may be saved and executed in a distributed manner.

Although the disclosure has been described with reference to exemplary embodiments, those skilled in the art will appreciate that various modifications and variations can be made in the embodiments without departing from the spirit or scope of the invention described in the appended claims. Such modifications are not to be understood individually from the technical idea or perspective of the embodiments.

It will be appreciated by those skilled in the art that various modifications and variations can be made in the embodiments without departing from the scope of the inventions. Thus, it is intended that the present invention cover the modifications and variations of the embodiments provided they come within the scope of the appended claims and their equivalents.

Both apparatus and method inventions are described in this specification and descriptions of both the apparatus and method inventions are complementarily applicable.

Conditional expressions such as "if" and "when" are not limited to an optional case and are intended to be interpreted, when a specific condition is satisfied, to perform the related operation or interpret the related definition according to the specific condition.

As apparent from the above description, the present disclosure has effects as follows.

With an AR mobility device control method and/or an AR mobility device according to embodiments, a mismatch between an AR object and an external object may be effectively eliminated while an AR object is displayed on a display for users.

An AR mobility device control method and/or an AR mobility device according to embodiments may prevent a mismatch between an AR object presented by a display and an external object using the gaze information about each of the users (or seats) even when the gazes of the user are changed or the viewing directions of the users are different from each other.

With an AR mobility device control method and/or an AR mobility device according to embodiments, the amount of computation required to display (or calibrate) an AR object on the display may be reduced by determining a representative value as a reference point based on information about the locations of one or more users.

With an AR mobility device control method and/or an AR mobility device according to embodiments, a reference point for reducing mismatch may be quickly calculated by pre-storing pre-calibration positions.

An AR mobility device control method and/or an AR mobility device according to embodiments may allow users to intuitively interact with an object outside the AR mobility. In addition, with such a configuration, the AR mobility device control method and/or the AR mobility device according to the embodiments may intuitively provide users with road travel related information or information about a destination.

An AR mobility device control method and/or an AR mobility device according to embodiments may effectively provide a customized service for each user. In addition, due to such a configuration, the AR mobility device control method and/or AR mobility device according to the embodiments provide an environment allowing users to easily interact with an external object (or thing) by calibrating an AR object based on accurate view position information and viewing direction information about each user.

An AR mobility device control method and/or an AR mobility control device according to embodiments may receive feedback information from users while operating self-driving. In addition, the AR mobility device according to the embodiments may allow a server to quickly correct wrong information, thereby quickly providing correct information (updated information) for users.

An AR mobility device control method and/or an AR mobility control device according to embodiments may provide information about external objects for users in real time while operating self-driving. That is, the AR mobility device according to the embodiments may intuitively provide road travel related information or information about driving.

An AR mobility device according to embodiments may maximize stability of self-driving by providing detailed information about self-driving for users and enabling the users to interact with self-driving.

It will be apparent to those skilled in the art that various modifications and variations can be made in the present disclosure without departing from the spirit and scope of the disclosure. Thus, it is intended that the present disclosure cover the modifications and variations of this disclosure provided they come within the scope of the appended claims and their equivalents.

What is claimed is:

1. A method of controlling augmented reality (AR) mobility, comprising:
    generating, by a camera, image data by photographing a plurality of users;
    extracting information about the plurality of users from the image data, wherein the information about the plurality of users comprises at least location information about the plurality of users;
    determining a reference point for an AR object to be displayed in connection with a real object located outside the AR mobility based on the location information about the plurality of users; and
    displaying the AR object at a specific position on a display, wherein the specific position corresponds to a position of the real object located outside the AR mobility with respect to the determined reference point.

2. The method of claim 1, wherein the camera corresponds to a 360-degree camera,
wherein the reference point is a representative value determined based on coordinate values for the plurality of users included in the location information about the plurality of users.

3. The method of claim 1, wherein the information about the plurality of users further comprises gaze direction information about each of the plurality of users, and
the method further comprising:
grouping the plurality of users into at least one group according to the gaze direction information about the plurality of users before determining the reference point,
wherein the reference point is determined based on the location information about at least one user included in the at least one group.

4. The method of claim 3, wherein the gaze direction information is one of a forward direction, a rearward direction, a leftward direction, or a rightward direction,
wherein the plurality of users comprise a first user and a second user having a same gaze direction information,
wherein the display displays information corresponding to the gaze direction information about the first user and the second user on at least a front display, rear display, left display, or right display of the AR mobility,
wherein the reference point is determined based on location information of the first user and location information of the second users.

5. The method of claim 1, wherein the displaying comprises:
displaying an exclusive object indicating information related to a first user of the plurality of users based on location information of the first user.

6. The method of claim 1, wherein location information of a first user is determined based on at least one of:
determining a location of the AR mobility based on a vehicle coordinate system;
determining a location of a seat in the AR mobility based on a seat coordinate system; or
determining a location of the first user present on the seat based on a passenger coordinate system.

7. The method of claim 1, wherein the displaying comprises:
displaying, on the display, a first object indicating information about a distance from the AR mobility to an object, a second object indicating information about a moving speed of the AR mobility, a third object indicating information about a destination of the AR mobility, and a fourth object indicating a map, a fifth object indicating information related to an object located within a predetermined distance from the AR mobility, a sixth object indicating news information, and a seventh object indicating a current time,
wherein the display comprises a transparent display.

8. The method of claim 7, further comprising:
generating location information about the AR mobility by a global positioning system (GPS) sensor;
transmitting the location information about the AR mobility to a server; and
receiving information indicated by the first to fifth objects generated according to the location information from the server.

9. The method of claim 1, wherein the AR object comprises information related to self-driving of the AR mobility.

10. An apparatus for controlling augmented reality (AR) mobility, comprising:
a display;
a camera configured to generate image data by photographing a plurality of users; and
a controller configured to:
extract information about the plurality of users from the image data, wherein the information about the plurality of users comprises location information about the plurality of users,
determine a reference point for an AR object to be displayed in connection with a real object located outside the AR mobility based on the location information about the plurality of users, and
cause the display to display the AR object at a specific position on the display, wherein the specific position corresponds to a position of the real object located outside the AR mobility with respect to the determined reference point.

11. The apparatus of claim 10, wherein the camera corresponds a 360-degree camera,
wherein the reference point is a representative value determined based on coordinate values for the plurality of users included in the location information about the plurality of users.

12. The apparatus of claim 10, wherein the information about the plurality of users further comprises gaze direction information about the plurality of users, and
wherein the controller is further configured to group the plurality of users into at least one group according to the gaze direction information about the plurality of users before determining the reference point,
wherein the reference point is determined based on the location information about at least one user included in the at least one group.

13. The apparatus of claim 12, wherein the gaze direction information is one of a forward direction, a rearward direction, a leftward direction, or a rightward direction,
wherein the plurality of users comprise a first user and a second user having a same gaze direction information,
wherein the display displays information corresponding to the gaze direction information about the first user and the second user on at least a front display, rear display, left display, or right display of the AR mobility,
wherein the reference point is determined based on location information of the first user and location information of the second user.

14. The apparatus of claim 10, wherein the controller is further configured to cause the display to display an exclusive object indicating information related to a first user of the plurality of users based on location information of the first user.

15. The apparatus of claim 10, wherein the controller is further configured to determine information about a location of a first user based on at least one of:
determining a location of the AR mobility based on a vehicle coordinate system;
determining a location of a seat in the AR mobility based on a seat coordinate system; or
determining a location of the first user present on the seat based on a passenger coordinate system.

16. The apparatus of claim 10, wherein the controller is further configured to cause the display to display a first object indicating information about a distance from the AR mobility to an object, a second object indicating information about a moving speed of the AR mobility, a third object indicating information about a destination of the AR mobility, and a fourth object indicating a map, a fifth object indicating information related to an object located within a predetermined distance from the AR mobility, a sixth object indicating news information, and a seventh object indicating a current time, wherein the display comprises a transparent display.

17. The apparatus of claim 16, further comprising:
a global positioning system (GPS) sensor configured to generate location information about the AR mobility; and
a communicator configured to:
transmit the location information about the AR mobility to a server; and
receive information indicated by the first to fifth objects generated according to the location information from the server.

18. The apparatus of claim 10, wherein the AR object comprises information related to self-driving of the apparatus.

* * * * *